United States Patent
Matsumoto et al.

(10) Patent No.: US 10,436,670 B2
(45) Date of Patent: Oct. 8, 2019

(54) OSCILLATING DEVICE, ELECTRODYNAMIC ACTUATOR, CROSS GUIDEWAY, LINEAR GUIDEWAY AND VIBRATING TABLE

(71) Applicant: KOKUSAI KEISOKUKI KABUSHIKI KAISHA, Tokyo (JP)

(72) Inventors: Sigeru Matsumoto, Tokyo (JP); Hiroshi Miyashita, Tokyo (JP); Kazuhiro Murauchi, Tokyo (JP); Minoru Endo, Tokyo (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/354,113

(22) Filed: Mar. 14, 2019

(65) Prior Publication Data

US 2019/0212225 A1    Jul. 11, 2019

Related U.S. Application Data

(63) Continuation of application No. 15/418,970, filed on Jan. 30, 2017, now Pat. No. 10,281,356, which is a
(Continued)

(30) Foreign Application Priority Data

Jul. 30, 2014 (JP) .................................. 2014-155172
Jun. 16, 2015 (JP) .................................. 2015-121585

(51) Int. Cl.
*G01M 7/06* (2006.01)
*G01M 7/00* (2006.01)
(Continued)

(52) U.S. Cl.
CPC .................................. *G01M 7/06* (2013.01)

(58) Field of Classification Search
CPC .......... G01M 7/00; G01M 7/02; G01M 7/022; G01M 7/027; G01M 7/04; G01M 7/06; G01M 7/08; F16C 11/06; G21C 17/001
(Continued)

(56) References Cited

U.S. PATENT DOCUMENTS

| 5,549,005 A | 8/1996 | Aoki |
| 2011/0239771 A1 | 10/2011 | Wu |
| 2014/0049122 A1* | 2/2014 | Matsumoto ........... G01M 7/027 310/12.16 |

FOREIGN PATENT DOCUMENTS

| JP | 54-062855 | 5/1979 |
| JP | 55-142232 | 11/1980 |

(Continued)

OTHER PUBLICATIONS

International Search Report issued in PCT/JP2015/071623 dated Oct. 20, 2015, along with English-language translation thereof (6 pages).
(Continued)

*Primary Examiner* — Natalie Huls
*Assistant Examiner* — Suman K Nath
(74) *Attorney, Agent, or Firm* — McCarter & English, LLP

(57) ABSTRACT

An oscillating device comprising: a vibrating table; an X-axis oscillating unit configured to oscillate the vibrating table in an X-axis direction; a Y-axis oscillating unit configured to oscillate the vibrating table in a Y-axis direction; a Z-axis oscillating unit configured to oscillate the vibrating table in a Z-axis direction; a first linear guideway configured to couple the vibrating table and the Z-axis oscillating unit slidably in the X-axis direction; and a second linear guideway configured to couple the vibrating table and the Z-axis oscillating unit slidably in the Y-axis direction, wherein the first linear guideway comprises: a first rail extending in the
(Continued)

X-axis direction; and a first carriage configured to engage with the first rail slidably in the X-axis direction, wherein the second linear guideway comprises: a second rail extending in the Y-axis direction; and a second carriage configured to engage with the second rail slidably in the Y-axis direction, wherein the first carriage is provided with first carriage attachment holes being drilled holes, wherein the second carriage is provided with second carriage attachment holes being tapped holes, and wherein the first carriage is directly fixed to the second carriage by bolts being inserted to the first carriage attachment holes and screwed in the second carriage attachment holes.

21 Claims, 31 Drawing Sheets

Related U.S. Application Data continuation-in-part of application No. PCT/JP2015/071623, filed on Jul. 30, 2015.

(51) Int. Cl.
*G01M 7/02* (2006.01)
*G01M 7/04* (2006.01)
*G01M 7/08* (2006.01)
*F16C 11/06* (2006.01)

(58) Field of Classification Search
USPC .................................................. 73/662–669
See application file for complete search history.

(56) References Cited

FOREIGN PATENT DOCUMENTS

| | | |
|---|---|---|
| JP | 56-090232 | 7/1981 |
| JP | 10-239149 | 9/1998 |
| JP | 2001-108570 | 4/2001 |
| JP | 2005-233843 | 9/2005 |
| JP | 2012-237736 | 12/2012 |
| WO | 2009/011433 | 1/2009 |
| WO | 2009/130818 | 10/2009 |
| WO | 2009/130953 | 10/2009 |

OTHER PUBLICATIONS

International Preliminary Report on Patentability issued in PCT/JP2015/071623 dated Feb. 2, 2017, along with English-language translation thereof (35 pages).

* cited by examiner

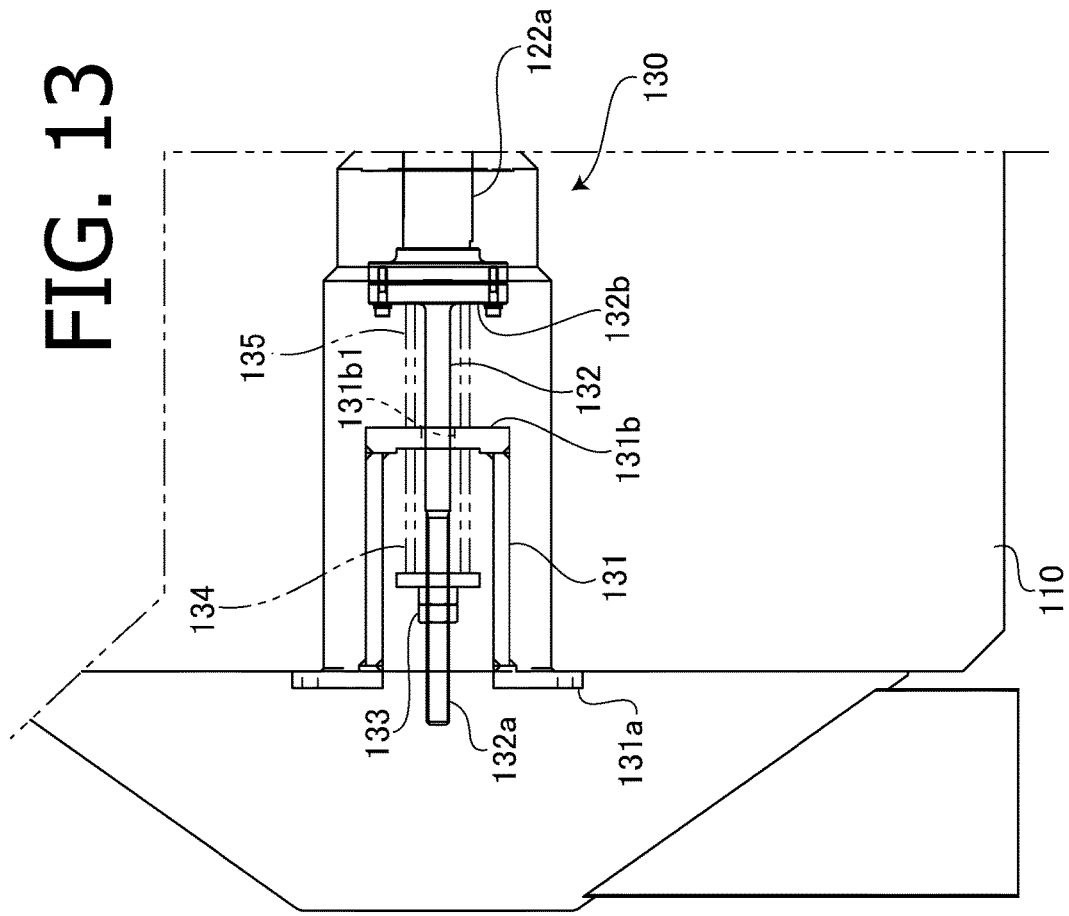
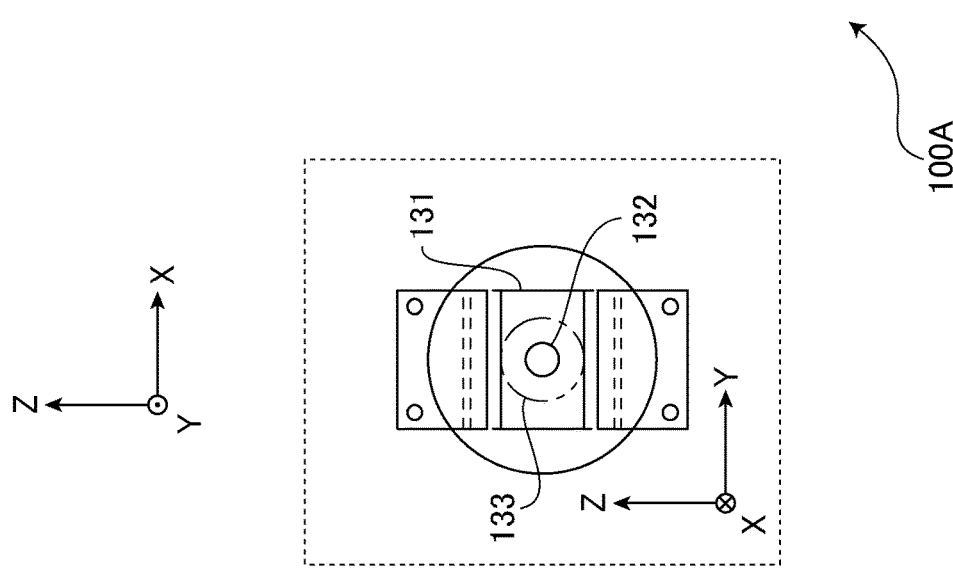
FIG. 13

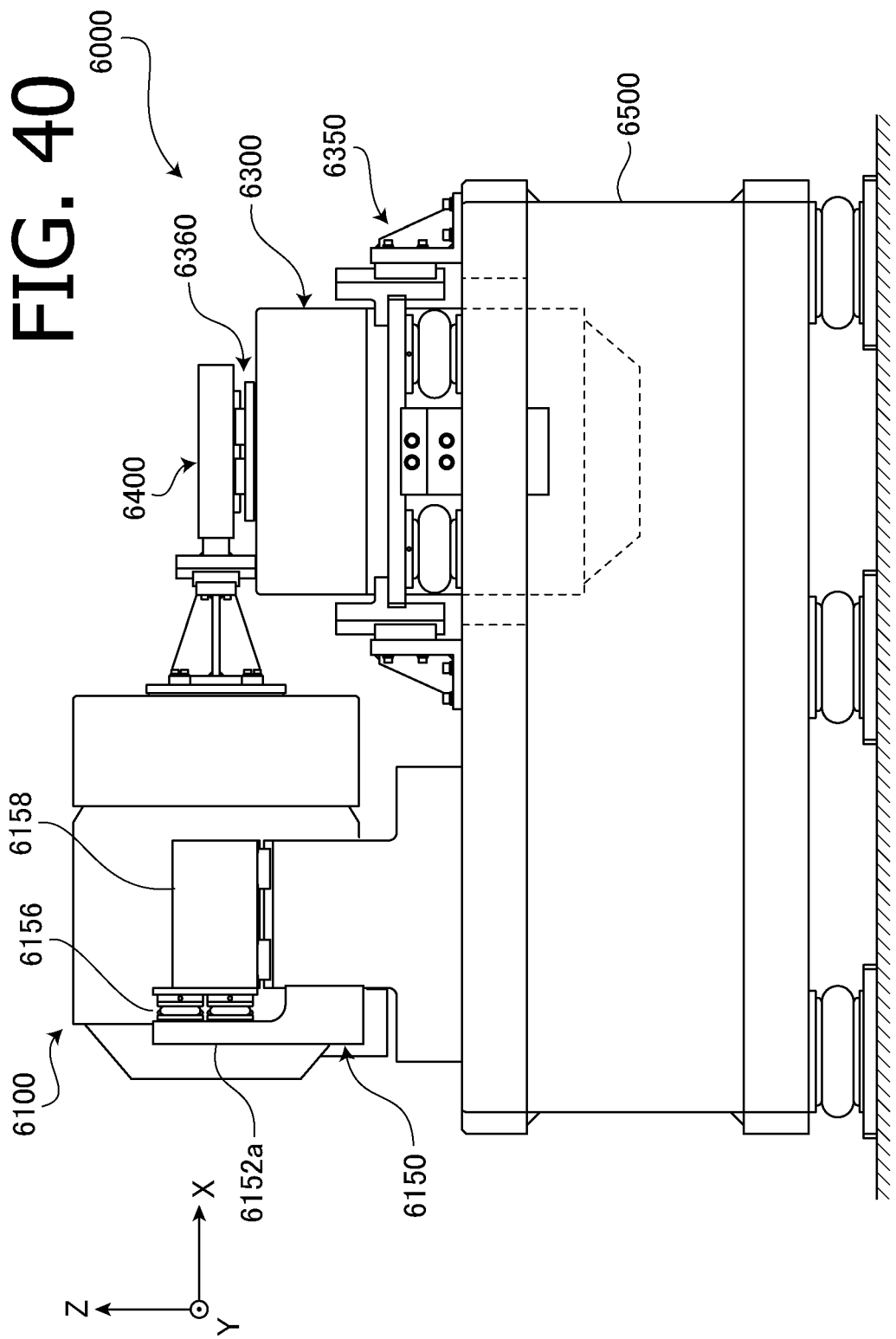

OSCILLATING DEVICE, ELECTRODYNAMIC ACTUATOR, CROSS GUIDEWAY, LINEAR GUIDEWAY AND VIBRATING TABLE

CROSS-REFERENCE TO RELATED APPLICATION

This application is a Continuation of U.S. application Ser. No. 15/418,970 filed on Jan. 30, 2017, which is a Continuation-in-Part of International Application No. PCT/JP2015/071623 filed on Jul. 30, 2015, which claims priority from Japanese Patent Application No. 2014-155172 filed on Jul. 30, 2014 and Japanese Patent Application No. 2015-121585 filed on Jun. 16, 2015. The entire disclosure of the prior applications is incorporated herein by reference.

TECHNICAL FIELD

The present invention relates to oscillating devices, electrodynamic actuators, cross guideways, linear guideways and vibrating tables for vibration tests and the like.

BACKGROUND

A triaxial oscillating device that oscillates a vibrating table in three orthogonal axis directions is known. International Publication No. 2009/011433 discloses an oscillating device that enabled oscillation at a high frequency range by the use of a rolling guide type linear guideway (Hereinafter simply referred to as "linear guide.") comprising rolling bodies.

To oscillate in three orthogonal axis directions (X-axis direction, Y-axis direction and Z-axis direction), for example, a vibrating table and a Z-axis actuator for oscillating the vibrating table in the Z-axis direction need to be coupled slidably in the X-axis direction and the Y-axis direction with a biaxial slider. In the oscillating device described in International Publication No. 2009/011433, an XY slider being a biaxial slider is configured with a cross guideway (Hereinafter simply referred to as "cross guide.") in which carriages of linear guides in two orthogonal axes (X-axis and Y-axis) are coupled with each other via an intermediary stage (coupling plate).

SUMMARY

However, since the configuration of the cross guide of International Publication No. 2009/011433 uses an intermediary stage, the number of components becomes large and this makes the cross guide heavy. And this lowers the performance of the oscillating device especially in high frequency ranges. Specifically, since the movable part of the oscillating device becomes heavy, greater electrical power becomes necessary for driving, and the heavy movable part lowers the upper limit of oscillation frequency. Furthermore, since a resonance frequency of the movable part of the oscillating device is lowered, vibration noises in test frequency ranges increase.

Aspects of the present disclosure are advantageous to provide one or more improved techniques which make it possible to improve frequency characteristics of an oscillating device.

According to an aspect of the present invention, there is provided an oscillating device, comprising: a vibrating table; an X-axis oscillating unit configured to oscillate the vibrating table in an X-axis direction; a Y-axis oscillating unit configured to oscillate the vibrating table in a Y-axis direction; a Z-axis oscillating unit configured to oscillate the vibrating table in a Z-axis direction; a first linear guideway configured to couple the vibrating table and the Z-axis oscillating unit slidably in the X-axis direction; and a second linear guideway configured to couple the vibrating table and the Z-axis oscillating unit slidably in the Y-axis direction, wherein the first linear guideway comprises: a first rail extending in the X-axis direction; and a first carriage configured to engage with the first rail slidably in the X-axis direction, wherein the second linear guideway comprises: a second rail extending in the Y-axis direction; and a second carriage configured to engage with the second rail slidably in the Y-axis direction, wherein the X-axis carriage is directly fixed to the Y-axis carriage, wherein the first carriage is provided with first carriage attachment holes being drilled holes, wherein the second carriage is provided with second carriage attachment holes being tapped holes, and wherein the first carriage is directly fixed to the second carriage by the bolts being inserted to the first carriage attachment holes and screwed in the second carriage attachment holes.

In at least one aspect, the first carriage may be provided with four first carriage attachment holes extending in the Z-axis direction and the second carriage may be provided with four second carriage attachment holes extending in the Z-axis direction, center lines of the four first carriage attachment holes and center lines of the four second carriage attachment holes touching respective corners of a predetermined square on the XY plane.

In at least one aspect, U-shaped notches being notches that have U-shapes when viewed from the Z-axis direction (vertical direction) may be formed at a center in the X-axis direction (linear motion direction) of both sides in the Y-axis direction (lateral direction) of the first carriage.

In at least one aspect, L-shaped notches being notches that have L-shapes when viewed from the Z-axis direction may be formed at both ends in the X-axis direction of both sides in the Y-axis direction of the first carriage.

By providing the above U-shaped notches and L-shaped notches, downsizing and weight reduction of the X-axis carriage become possible.

In at least one aspect, the first carriage may have flange portions between the U-shaped notches and the L-shaped notches on both sides in the Y-axis direction, and the first carriage attachment holes may be formed on the flange portions.

In at least one aspect, the first carriage may comprise: a first portion which has a substantially rectangular shape with side faces being perpendicular to the X-axis, the Y-axis and the Z-axis, respectively, and to which a first groove extending in the X-axis direction and configured to engage with the first rail is formed on one of the side faces perpendicular to the Z-axis; and a second portion which has a substantially rectangular plate-like shape with edges being parallel to the X-axis and the Y-axis and is fixed to the other of the side faces perpendicular to the Z-axis of the first portion. Both end portions of the second portion in the Y-axis direction may protrude more outward in the Y-axis direction than both side faces of the first portion in the Y-axis direction to form the flange portions. Both end portions of the first portion in the X-axis direction may protrude more outward in the X-axis direction than both side faces of the second portion in the X-axis direction. The U-shaped notches may be formed on the second portion. The L-shaped notches may be formed by the flange portions and the end portions of the first portion protruding outward in the X-axis direction.

In at least one aspect, the first linear guideway may comprise rollers being rolling bodies nipped between the first rail and the first carriage.

According to the above configuration, rigidity of the X-axis linear guideway improves and thereby load resistance (impact resistance) and a resonance frequency of the X-axis linear guideway improves, and thus vibration noises caused by the X-axis linear guideway reduce. The vibration noise reduction effect becomes especially noticeable when oscillated with frequencies equal to or more than 500 Hz.

In at least one aspect, second U-shaped notches being notches that have U-shapes when viewed from the Z-axis direction may be formed at a center in the Y-axis direction of both sides in the X-axis direction of the second carriage, and second L-shaped notches being notches that have L-shapes when viewed from the Z-axis direction may be formed at both ends in the Y-axis direction of both sides in the X-axis direction of the second carriage The second carriage may have second flange portions between the second U-shaped notches and the second L-shaped notches, and the second carriage attachment holes may be formed on the second flange portions. The second carriage may comprise: a third portion which has a substantially rectangular shape with side faces being perpendicular to the X-axis, Y-axis and Z-axis, respectively, and to which a second groove extending in the Y-axis direction and configured to engage with the second rail is formed on one of the side faces perpendicular to the Z-axis; and a fourth portion which has a substantially rectangular plate-like shape with edges being parallel to the X-axis and the Y-axis and is fixed to the other of the side faces perpendicular to the Z-axis of the third portion. Both end portions of the fourth portion in the X-axis direction may protrude more outward in the X-axis direction than both side faces of the third portion in the X-axis direction to form the second flange portions. Both end portions of the third portion in the Y-axis direction may protrude more outward in the Y-axis direction than both side faces of the fourth portion in the Y-axis direction. The second U-shaped notches may be formed to the fourth portion. The second L-shaped notches may be formed by the second flange portions and the end portions of the third portion protruding outward in the Y-axis direction. The second linear guideway may comprise rollers being rolling bodies nipped between the second rail and the second carriage.

In at least one aspect, the X-axis direction and the Y-axis direction may be horizontal directions that are perpendicular to each other, and the Z-axis direction may be a vertical direction.

Also, according to an aspect of the present invention, there is provided an electrodynamic actuator, comprising: a fixing part having a substantially tubular shape; a movable part which at least a portion thereof is accommodated in a hollow portion of the fixing part and configured to be reciprocated in an axial direction of the fixing part; and a spring mechanism configured to elastically couple the fixing part and the movable part together, wherein the spring mechanism is a neutral spring mechanism configured to elastically support the movable part with respect to the fixing part at a neutral position in the axial direction and comprises: a rod fixed to the movable part; an elastic component supporting plate fixed to the fixing part; and first and second elastic components interposed between the rod and the elastic component supporting plate, and a through hole to which the rod is to be inserted may be provided to the elastic component supporting plate, wherein the rod comprises: a first flange portion; and a second flange portion provided at a side opposite the first flange portion across the elastic component supporting plate, wherein the first elastic component is interposed between the first flange portion and the elastic component supporting plate, wherein the second elastic component is interposed between the second flange portion and the elastic component supporting plate, and wherein at least one of the first and second elastic components includes a coil spring.

By using a coil spring, control of relatively large displacements becomes possible.

In at least one aspect, at least one of the first and second elastic components may include a rubber or a resin.

By using elastic components formed of materials having high shock-absorbing properties such as rubbery elastic bodies or viscoelastic bodies, such as, for instance, anti-vibration rubbers or resin plates, small spring mechanism can be realized.

Also, according to an aspect of the present invention, there is provided an oscillating device, comprising: a vibrating table; a vertical actuator configured to drive the vibrating table in a vertical direction; and a horizontal actuator configured to drive the vibrating table in a horizontal direction, wherein the horizontal actuator is any of the above electrodynamic actuators.

In at least one aspect, the vertical actuator may comprise: a fixing part having a substantially tubular shape; a movable part which at least a portion thereof is accommodated in a hollow portion of the fixing part and configured to be reciprocated in an axial direction of the fixing part; and an air spring configured to support the movable part with respect to the fixing part from below.

Also, according to an aspect of the present invention, there is provided a linear guideway, comprising: a rail; and a carriage configured to slidably engage with the rail, wherein four first carriage attachment holes touching respective corners of a square are provided to a carriage top face of the carriage, and wherein the first carriage attachment hole is a drilled hole.

Also, according to an aspect of the present invention, there is provided a linear guideway, comprising: a rail; and a carriage configured to slidably engage with the rail, wherein four second carriage attachment holes touching respective corners of a square are provided to a carriage top face of the carriage, and wherein the second carriage attachment hole is a tapped hole.

In at least one aspect, the linear guideway may comprise rolling bodies being interposed between the rail and the carriage and configured to roll on raceway surfaces of the rail and the carriage as the carriage slides.

In at least one aspect, the rolling bodies may be rollers.

In at least one aspect, the rolling bodies may be balls.

Also, according to an aspect of the present invention, there is provided a cross guideway, comprising: any of the above first linear guideway; any of the above second linear guideway; and bolts for fixing a carriage of the first linear guideway to a carriage of the second linear guideway, wherein the carriage of the first linear guideway is directly fixed to the carriage of the second linear guideway by the bolts being inserted to first carriage attachment holes of the first linear guideway and screwed in second carriage attachment holes of the second linear guideway.

In at least one aspect, the carriage of the first linear guideway may be combined with the carriage of the second linear guideway while shifting their sliding directions to each other by 90 degrees.

Also, according to an aspect of the present invention, there is provided an oscillating device, comprising: a vibrating table; a Y-axis actuator configured to drive the vibrating table in a Y-axis direction being a horizontal direction; a Z-axis actuator configured to drive the vibrating table in a Z-axis direction being a vertical direction; a first slider configured to couple the vibrating table with the Z-axis actuator slidably in the Y-axis direction; and a second slider configured to couple the vibrating table with the Y-axis actuator slidably in the Z-axis direction, wherein the first slider comprises Y-axis linear guideways each having: a Y-axis rail extending in the Y-axis direction; and a Y-axis carriage configured to engage with the Y-axis rail slidably in the Y-axis direction, wherein the second slider comprises Z-axis linear guideways each having: a Z-axis rail extending in the Z-axis direction; and a Z-axis carriage configured to engage with the Z-axis rail slidably in the Z-axis direction, wherein the Y-axis rails of the first slider and the Z-axis rails of the second slider are fixed to the vibrating table, and wherein one of the Y-axis rails of the first slider and one of the Z-axis rails of the second slider are arranged substantially on a same plane.

In the oscillating device disclosed in International Publication No. 2009/011433, oscillation accuracies were limited due to vibration noises that occur intensely at high frequency ranges. There are various possible causes of such vibration noises, but the causes had not been identified.

In the process of research of the causes of the vibration noises, inventors of the present invention found that the levels of the vibration noises at high frequency ranges decrease when the configuration in which the rails of the Z-axis linear guides of the second slider are fixed to the vibrating table (Configuration A) and when the configuration in which the rails of the X-axis linear guides of the first slider and the rails of the Z-axis linear guides of the second slider are arranged on the same plane (ZX plane) (Configuration B) is adopted. Furthermore, it was proved that, when these two configurations are combined, the levels of the vibration noises decrease drastically and practical high oscillation accuracies at high frequency ranges can be achieved.

If Configuration A (the rails of the Z-axis linear guides of the second slider being fixed to the vibrating table) is adopted, when the vibrating table is oscillated in the Z-axis direction, only the rails of the Z-axis linear guides of the second slider oscillate in the Z-axis direction along with the vibrating table, and the carriages of the Z-axis linear guides of the second slider do not oscillate in the Z-axis direction. Since the carriage of the linear guide has complex structures and is heavy as compared to the rail, the carriage of the linear guide is more prone to generate vibration noises when oscillated. Therefore, it can be considered that the avoidance of oscillation of the carriages of the Z-axis linear guides in the Z-axis direction is a factor of the noise reduction.

Also, if Configuration B (the rails of the X-axis linear guides of the first slider and the rails of the Z-axis linear guides of the second slider being arranged on the same plane) is adopted, torques around the Z-axis are not applied to the carriages of the X-axis linear guides of the first slider even when oscillating force in the X-axis direction is applied to the vibration table via the rails of the Z-axis linear guides of the second slider. Also, in this case, torques around the Z-axis are not applied to the carriages of the Z-axis linear guides of the second slider neither. The carriage of the X-axis linear guide has especially high rigidity against translation forces in the Z-axis direction, but has relatively low rigidity against the torques around the Z-axis. Also, the carriage of the Z-axis linear guide has especially high rigidity against translation forces in the X-axis direction, but has relatively low rigidity against the torques around the Z-axis. Therefore, it can be considered that the avoidance of the application of torques around the Z-axis direction to each of the carriages of the X-axis linear guides of the first slider and the Z-axis linear guides of the second slider by the adoption of Configuration B is a factor of the noise reduction.

In at least one aspect, the second slider may comprise three or more Z-axis linear guideways arranged in parallel.

By the adoption of Configuration A, advantages being the improvement in the oscillation accuracies due to the reinforcement in the rigidity outweigh disadvantages being decreases in the oscillation accuracies due to an increase in mass to be oscillated in the vertical direction accompanied by the increase in the number of the second sliders. Therefore, a further improvement in the oscillating accuracies becomes possible by adopting the configuration in which the second slider comprises three or more Z-axis linear guideways arranged in parallel.

In at least one aspect, intervals between the adjacent Z-axis linear guideways may be narrower than a width of the Z-axis carriage.

In at least one aspect, intervals between the adjacent Z-axis linear guideways may be narrower than a width of the Z-axis rail.

In at least one aspect, the oscillating device may comprise: an X-axis actuator configured to oscillate the vibrating table in an X-axis direction being a direction that is perpendicular to both the Z-axis direction and the Y-axis direction; and a third slider configured to couple the vibrating table with the X-axis actuator slidably in both the Z-axis direction and the Y-axis direction. Each of the first slider and the second slider may comprise X-axis linear guideways each having: an X-axis rail extending in the X-axis direction; and an X-axis carriage configured to engage with the X-axis rail slidably in the X-axis direction. The third slider may comprise: Y-axis linear guideways each having: a Y-axis rail extending in the Y-axis direction; and a Y-axis carriage configured to engage with the Y-axis rail slidably in the Y-axis direction, and Z-axis linear guideways each having: a Z-axis rail extending in the Z-axis direction; and a Z-axis carriage configured to engage with the Z-axis rail slidably in The Z-axis direction. The Z-axis rails of the third slider may be fixed to the vibrating table, and one of the X-axis rails of the first slider and one of the Z-axis rails of the third slider may be arranged substantially on a same plane.

In at least one aspect, the third slider may comprise three or more Z-axis linear guideways arranged in parallel.

In at least one aspect, at least one of the first slider, the second slider and the third slider may be a roller bearing mechanism comprising rollers as rolling bodies.

In at least one aspect, the X-axis actuator, the Y-axis actuator and the Z-axis actuator may be electrodynamic actuators, and the electrodynamic actuator may comprise: a fixing part having a substantially tubular shape; a movable part which at least a portion thereof is accommodated in a hollow portion of the fixing part and configured to be reciprocated in an axial direction of the fixing part; and a plurality of movable part support mechanisms configured to support the movable part from sides thereof reciprocally in the axial direction of the fixing part. The movable part support mechanism may comprise: a rail fixed to a side face of the movable part and extending in the axial direction of the fixing part; and a carriage fixed to the fixing part and configured to engage with the rail slidably in the axial direction. The movable part support mechanisms may be arranged around an axis line of the fixing part at substantially regular intervals.

In at least one aspect, the movable part may comprise: a cylindrical part arranged coaxially in a hollow portion of the fixing part; and a top plate attached to an upper end of the cylindrical part and having a substantially rectangular shape of which one side is oriented in the Y-axis direction. A length of the top plate in the Y-axis direction may be longer than an outer diameter of the cylindrical part and may be equal to or more than a length of the vibrating table in the Y-axis direction.

In at least one aspect, the oscillating device may comprise two pairs of the movable part support mechanisms, and the movable part may be nipped by the two pair of the movable part support mechanisms from both sides in two orthogonal directions.

In at least one aspect, the movable part may comprise a rod that protrudes from one end of the movable part and extends on an axis line of the fixing part, and the fixing part may comprise a bearing configured to support the rod movably in the axial direction of the fixing part.

In at least one aspect, the oscillating device may comprise a base, and the electrodynamic actuator may comprise a fixing part support mechanism configured to support the fixing part. The fixing part support mechanism may comprise: a movable block attached to the fixing part; a linear guideway configured to couple the movable block and the base together slidably in the axial direction of the fixing part; and a cushion part arranged between the base and the movable block and configured to prevent transmission of vibrations in the axial direction.

In at least one aspect, the cushion part may be an air spring.

In at least one aspect, the fixing part support mechanism may comprise a fixing block fixed to the base, and at least one of the linear guideway and the cushion part of the fixing part support mechanism may be fixed to the base via the fixing block.

Also, according to an aspect of the present invention, there is provided an electrodynamic actuator, comprising: a fixing part support mechanism attached to the base; a fixing part having a substantially tubular shape and supported by the fixing part support mechanism; and a movable part which at least a portion thereof is accommodated in a hollow portion of the fixing part and configured to be reciprocated in an axial direction of the fixing part, wherein the fixing part support mechanism comprises: a movable block attached to the fixing part; a fixing block fixed to the base; a linear guideway configured to couple the fixing block and the movable block together slidably in the axial direction of the fixing part; and a spring mechanism configured to elastically couple the fixing block and the movable block together, wherein the spring mechanism is a neutral spring mechanism configured to elastically support the movable block with respect to the fixing block at a neutral position in the axial direction and comprises: a rod fixed to the movable block; an elastic component supporting plate fixed to the fixing block; and first and second elastic components interposed between the rod and the elastic component supporting plate, wherein a through hole to which the rod is to be inserted is provided to the elastic component supporting plate, wherein the rod comprises: a first flange portion; and a second flange portion provided at a side opposite to the first flange portion across the elastic component supporting plate, wherein the first elastic component is interposed between the first flange portion and the elastic component supporting plate, and wherein the second elastic component is interposed between the second flange portion and the elastic component supporting plate.

In at least one aspect, the electrodynamic actuator may comprise a pair of the movable blocks, and the movable blocks of the pair may be attached on both side faces of the fixing part with an axis line of the fixing part therebetween.

According to an aspect of the present invention, there is provided an oscillating device, comprising: any of the above electrodynamic actuator; and a vibrating table configured to be oscillated in the axial direction by the electrodynamic actuator.

BRIEF DESCRIPTION OF THE DRAWINGS

FIG. 13 is an enlarged longitudinal section view around a neutral spring mechanism of a horizontal drive electromagnetic actuator according to the embodiment of the present invention.

FIG. 40 is a side view of the oscillating device according to the sixth embodiment of the present invention.

DETAILED DESCRIPTION OF EMBODIMENTS

Hereinafter, embodiments according to the present invention are described with reference to the accompanying drawings.

The same or corresponding numerals are assigned to the same or corresponding components in each of the drawings, and redundant descriptions are herein omitted.

First Embodiment

Figure 1:
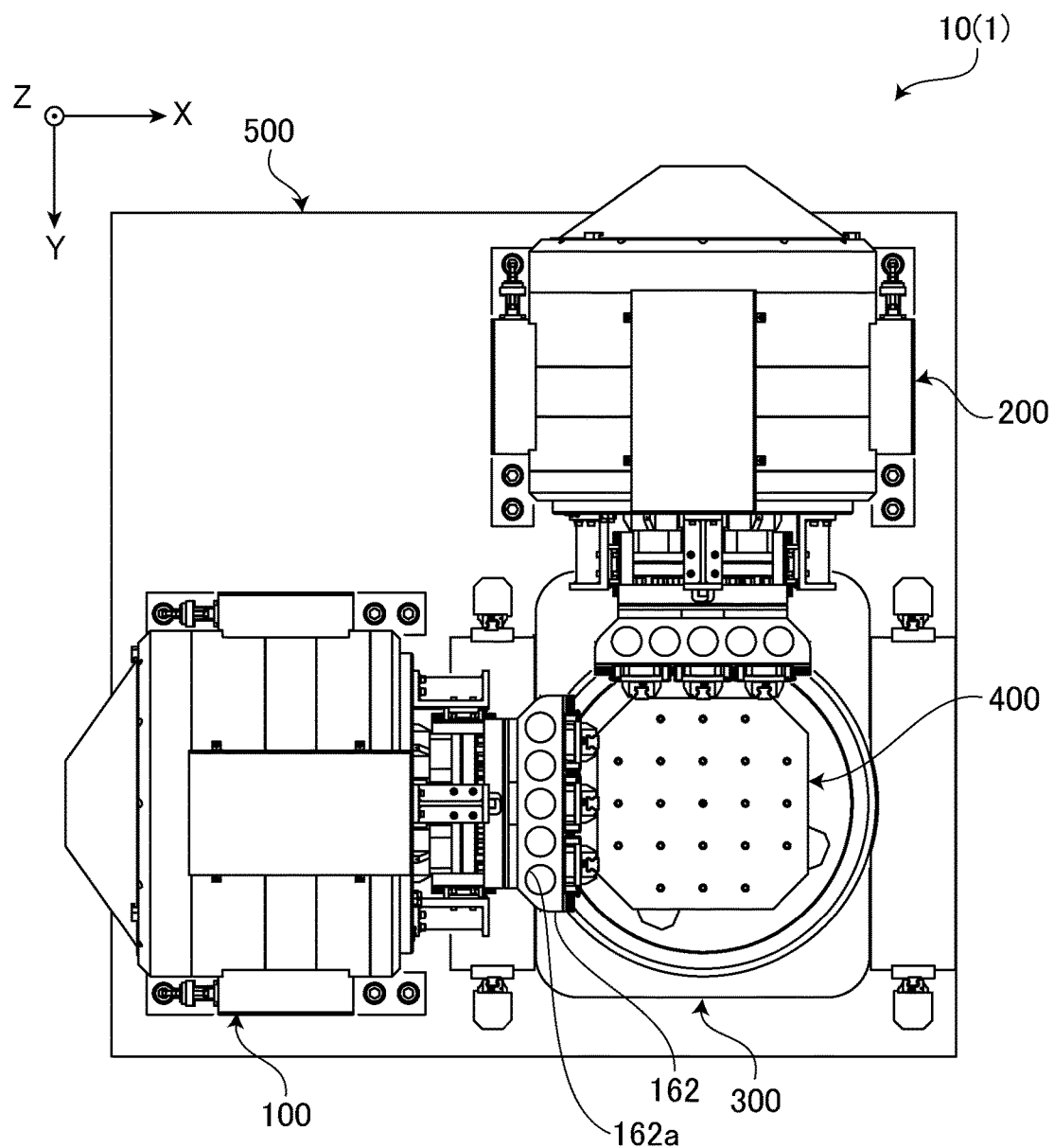
FIG. 1 is a plan view of an oscillating device according to an embodiment of the present invention.
Figure 2:
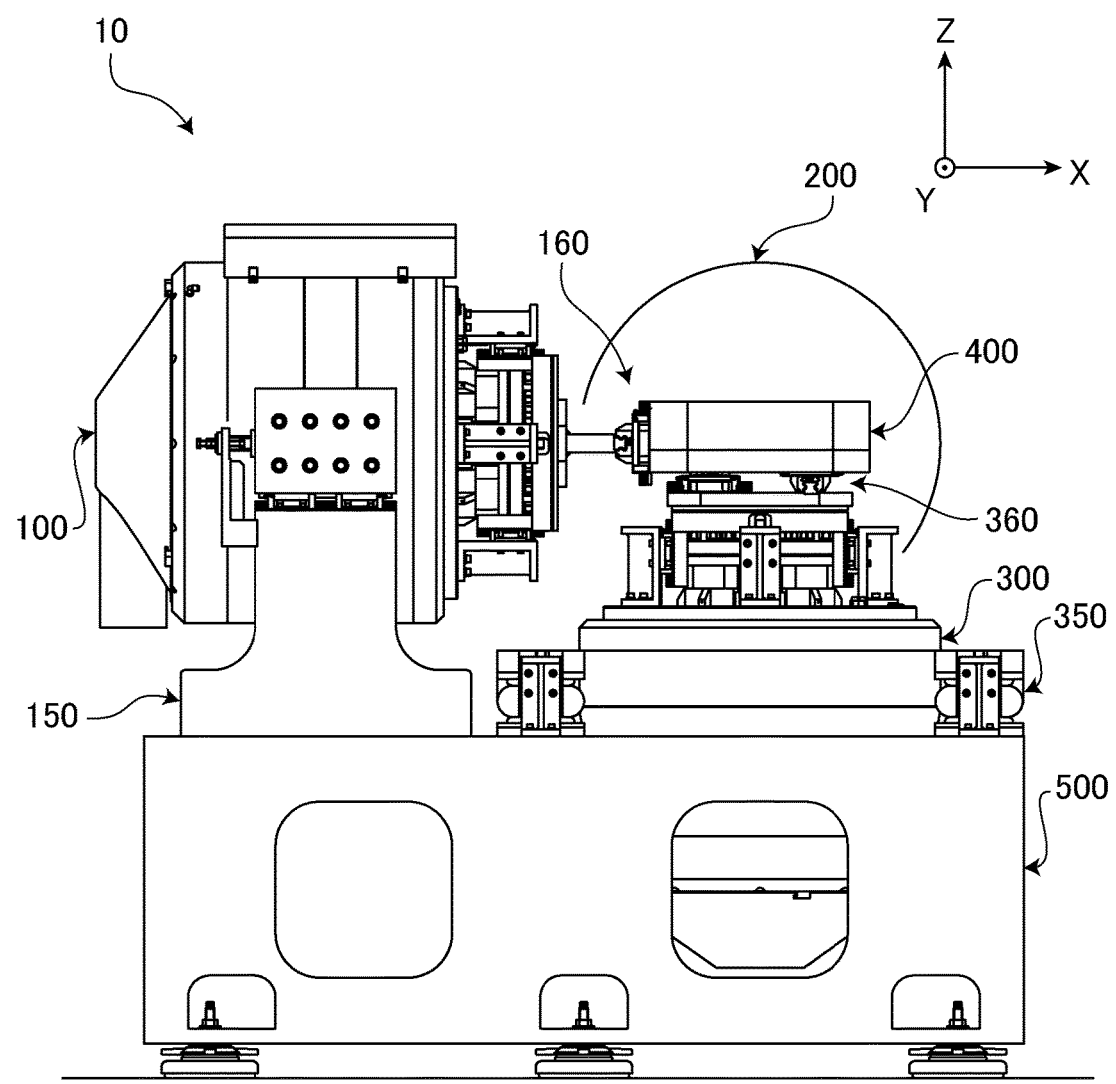
FIG. 2 is a side view of the oscillating device according to the embodiment of the present invention.
Figure 3:
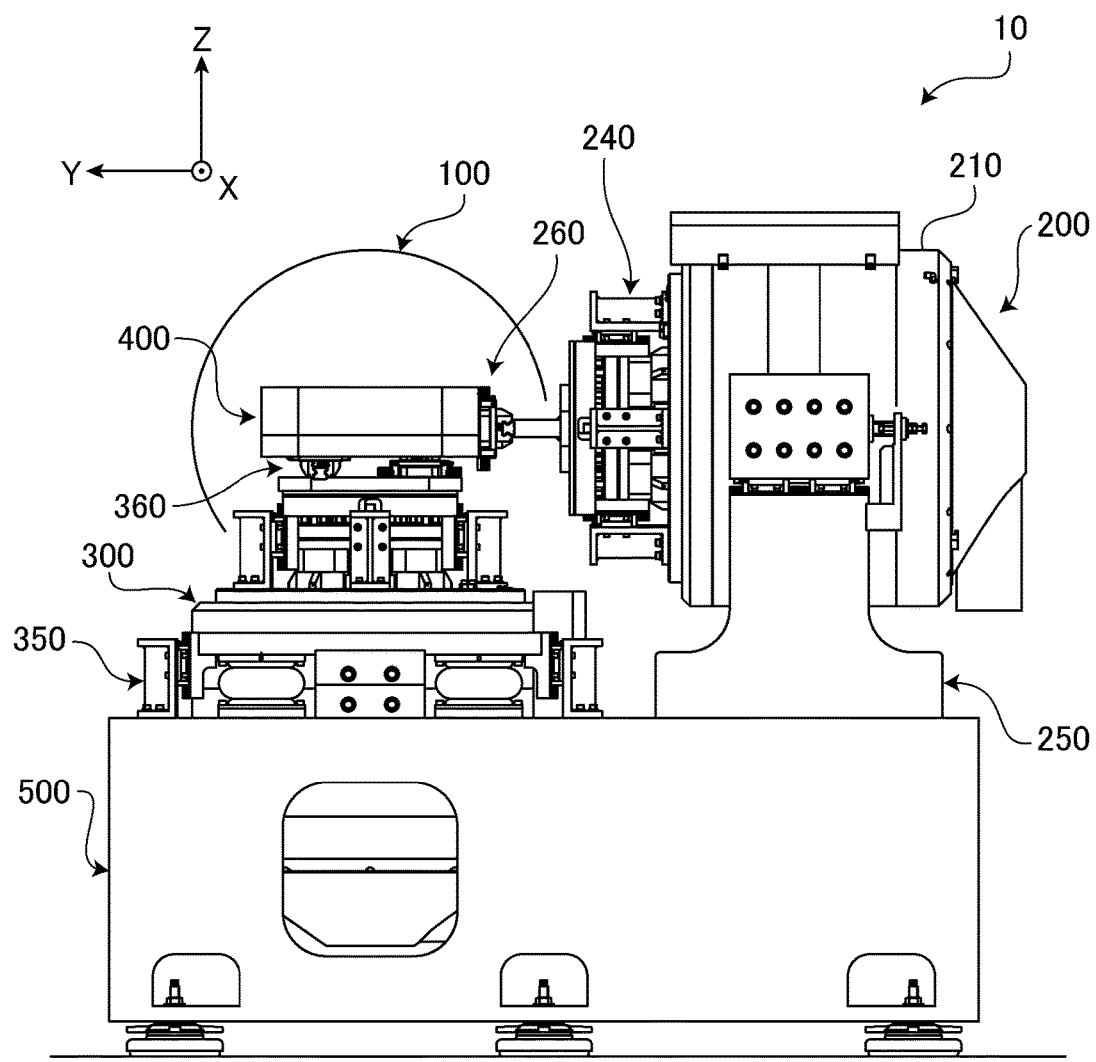
FIG. 3 is a side view of the oscillating device according to the embodiment of the present invention.

FIG. 1 is a plane view of a mechanism part 10 of an electrodynamic triaxial oscillating device 1 (Hereinafter abbreviated to "oscillating device 1.") according to the first embodiment of the present invention. In the following description, a lateral direction in FIG. 1 is referred to as X-axis direction (with the right direction as X-axis positive direction), a vertical direction in FIG. 1 is referred to as Y-axis direction (with the downward direction as Y-axis positive direction), and a direction perpendicular to the paper in FIG. 1 is referred to as Z-axis direction (with a direction going from the backside to the front side of the paper as Z-axis positive direction). It is noted that the Z-axis direction is vertical, and the X-axis direction and the Y-axis direction are horizontal. FIG. 2 and FIG. 3 are side views of the oscillating device 1. It is noted that FIG. 2 is a diagram showing the oscillating device 1 viewed toward the Y-axis negative direction (viewed toward the top in FIG. 1), and FIG. 3 is a diagram showing the oscillating device 1 viewed toward the X-axis negative direction (toward the left in FIG. 1).

As shown in FIG. 1, the mechanism part 10 of the oscillating device 1 comprises a vibrating table 400 to which a test specimen (not shown) is to be fixed on its top face, three oscillating units (X-axis oscillating unit 100, Y-axis oscillating unit 200 and Z-axis oscillating unit 300) which oscillate the vibrating table 400 in the X-axis direction, the Y-axis direction and the Z-axis direction, respectively, and a device base 500 to which the oscillating units 100, 200 and 300 are attached.

Figure 4:
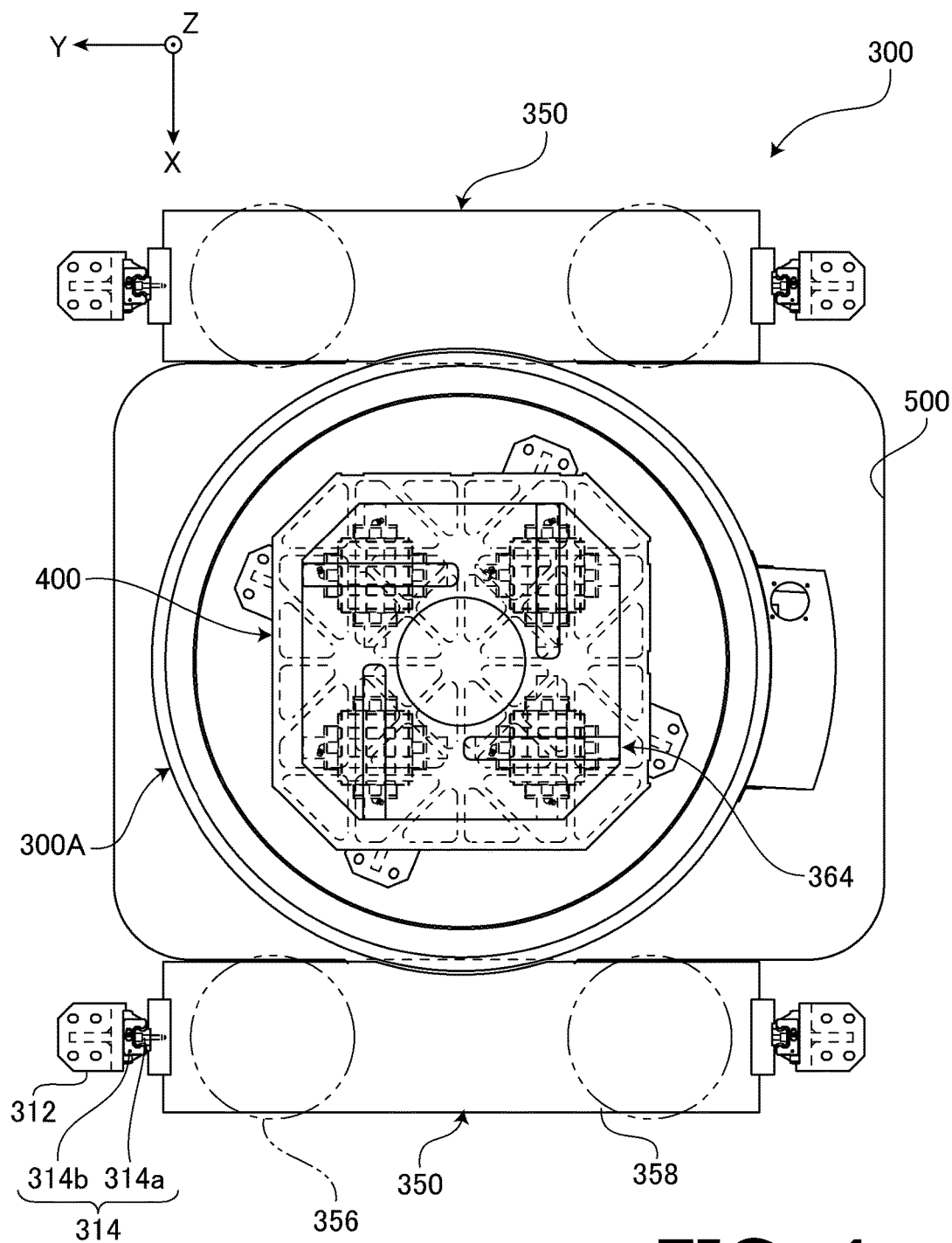
FIG. 4 is a plan view of a Z-axis oscillating unit according to the embodiment of the present invention.
Figure 5:
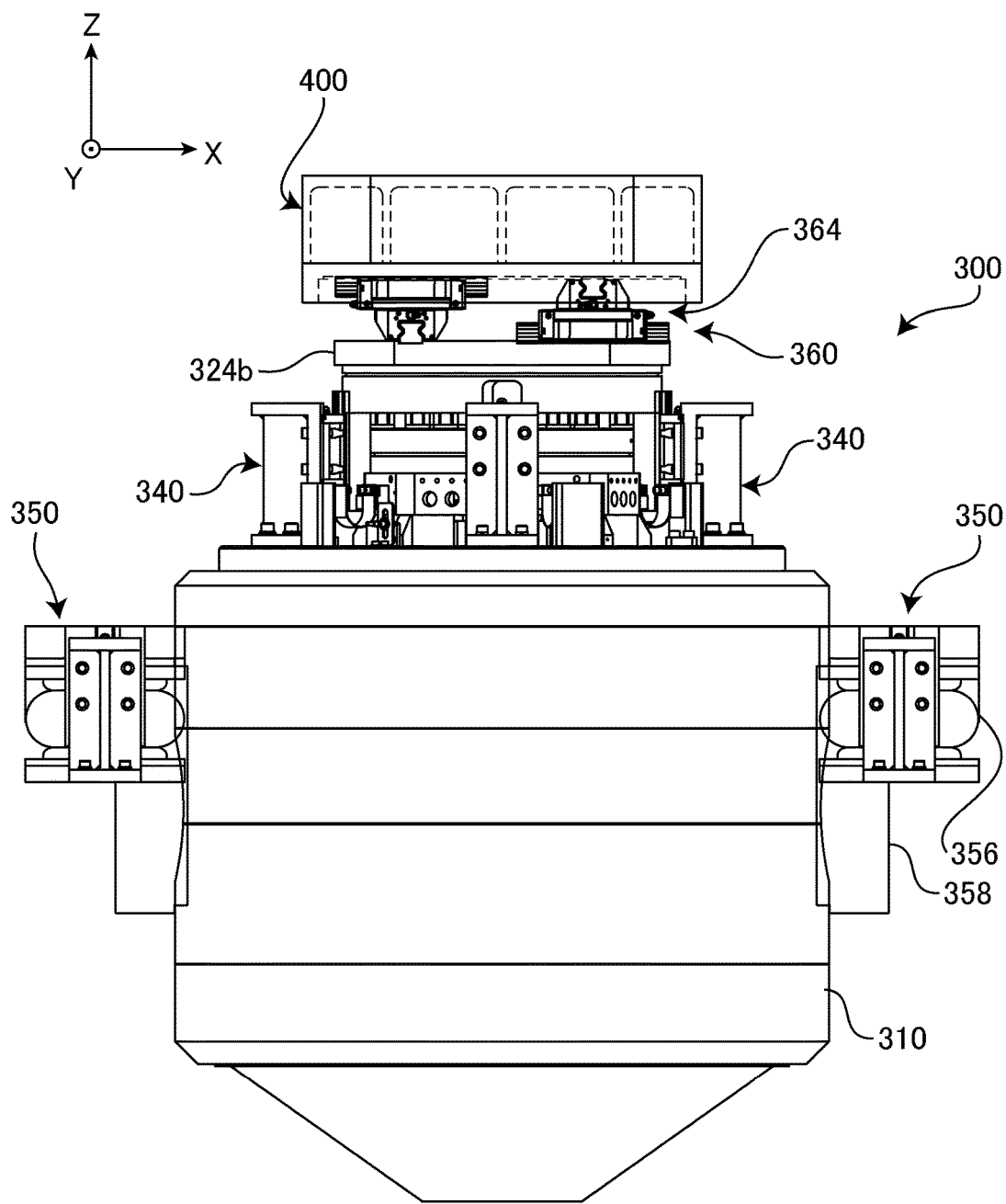
FIG. 5 is a side view of the Z-axis oscillating unit according to the embodiment of the present invention.
Figure 6:
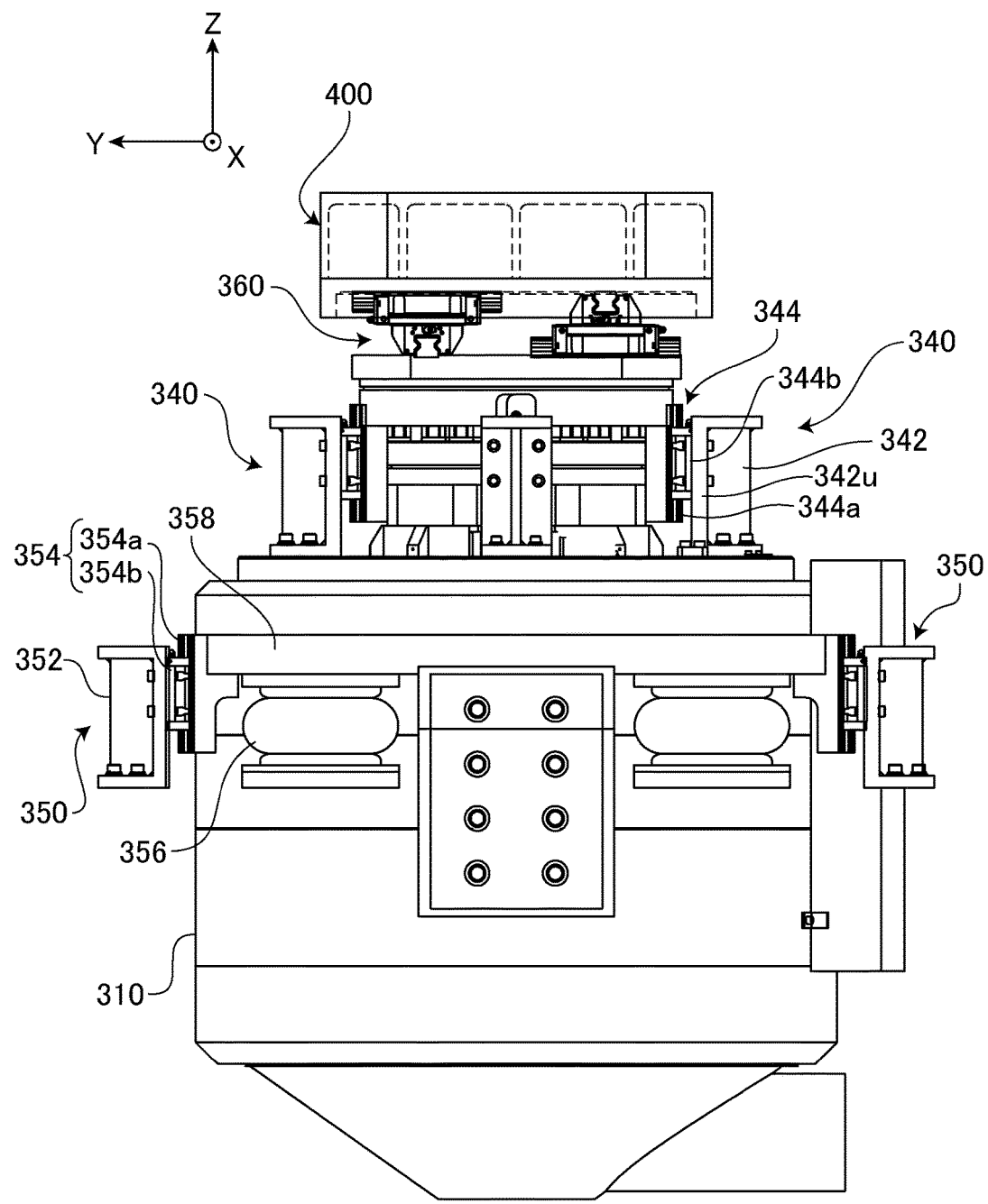
FIG. 6 is a side view of the Z-axis oscillating unit according to the embodiment of the present invention.

FIG. 4 is a plane view of the Z-axis oscillating unit 300, and FIG. 5 and FIG. 6 are side views of the Z-axis oscillating unit 300. It is noted that FIG. 5 is a diagram showing the Z-axis oscillating unit 300 viewed toward the Y-axis negative direction, and FIG. 6 is a diagram showing the Z-axis oscillating unit 300 viewed toward the X-axis negative direction.

Figure 7:
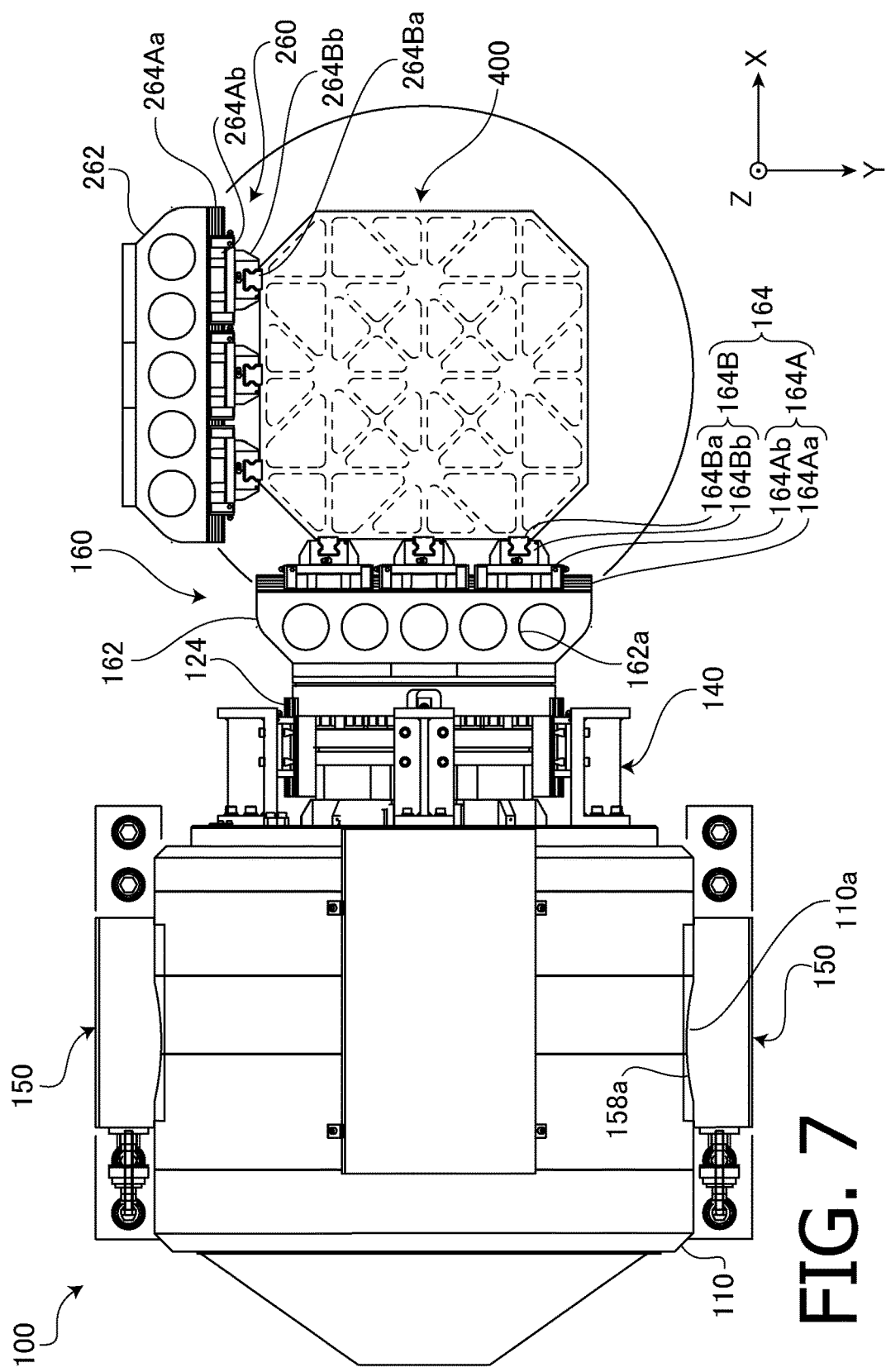
FIG. 7 is a plan view of an X-axis oscillating unit according to the embodiment of the present invention.
Figure 8:
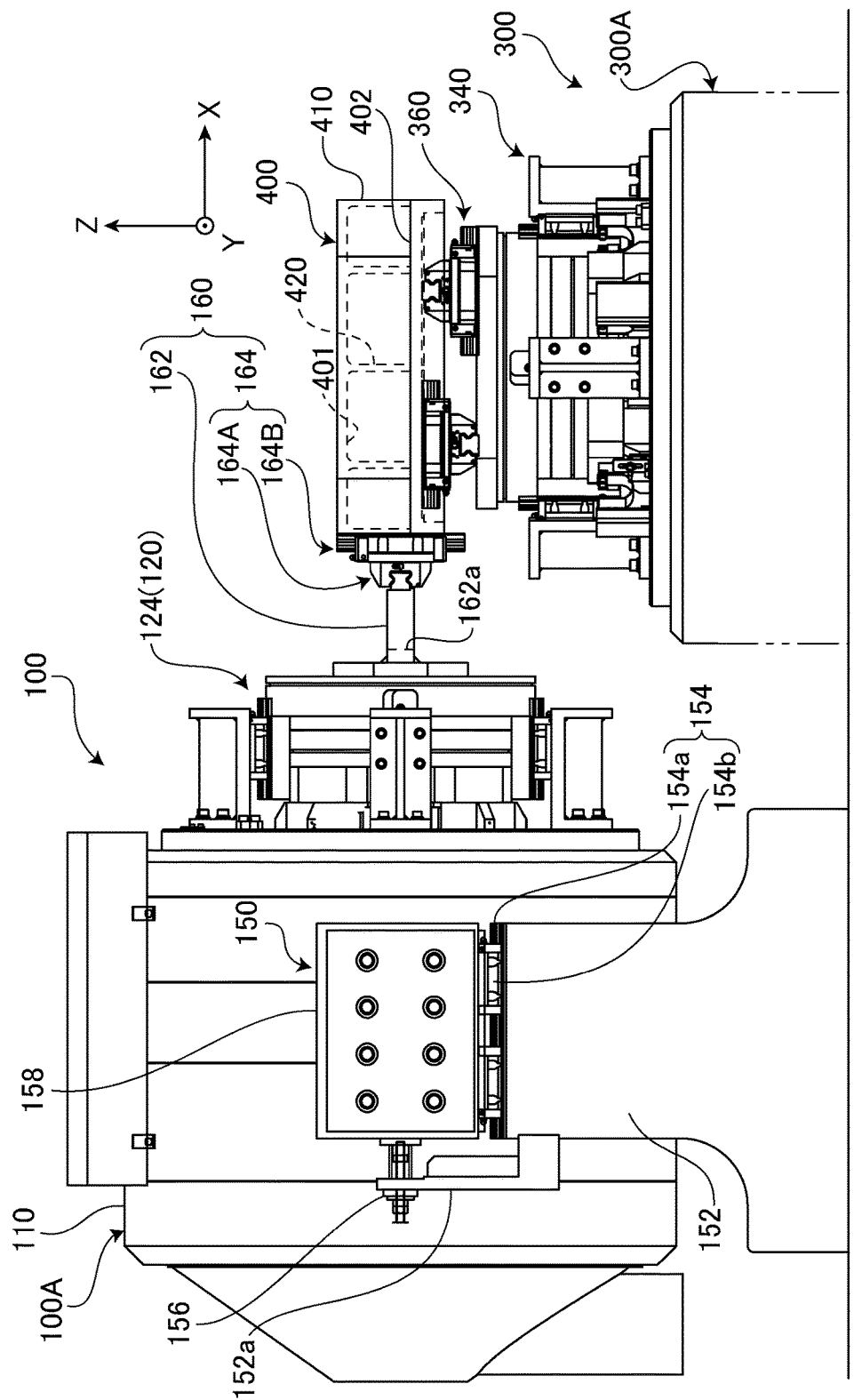
FIG. 8 is a side view of the X-axis oscillating unit according to the embodiment of the present invention.
Figure 9:
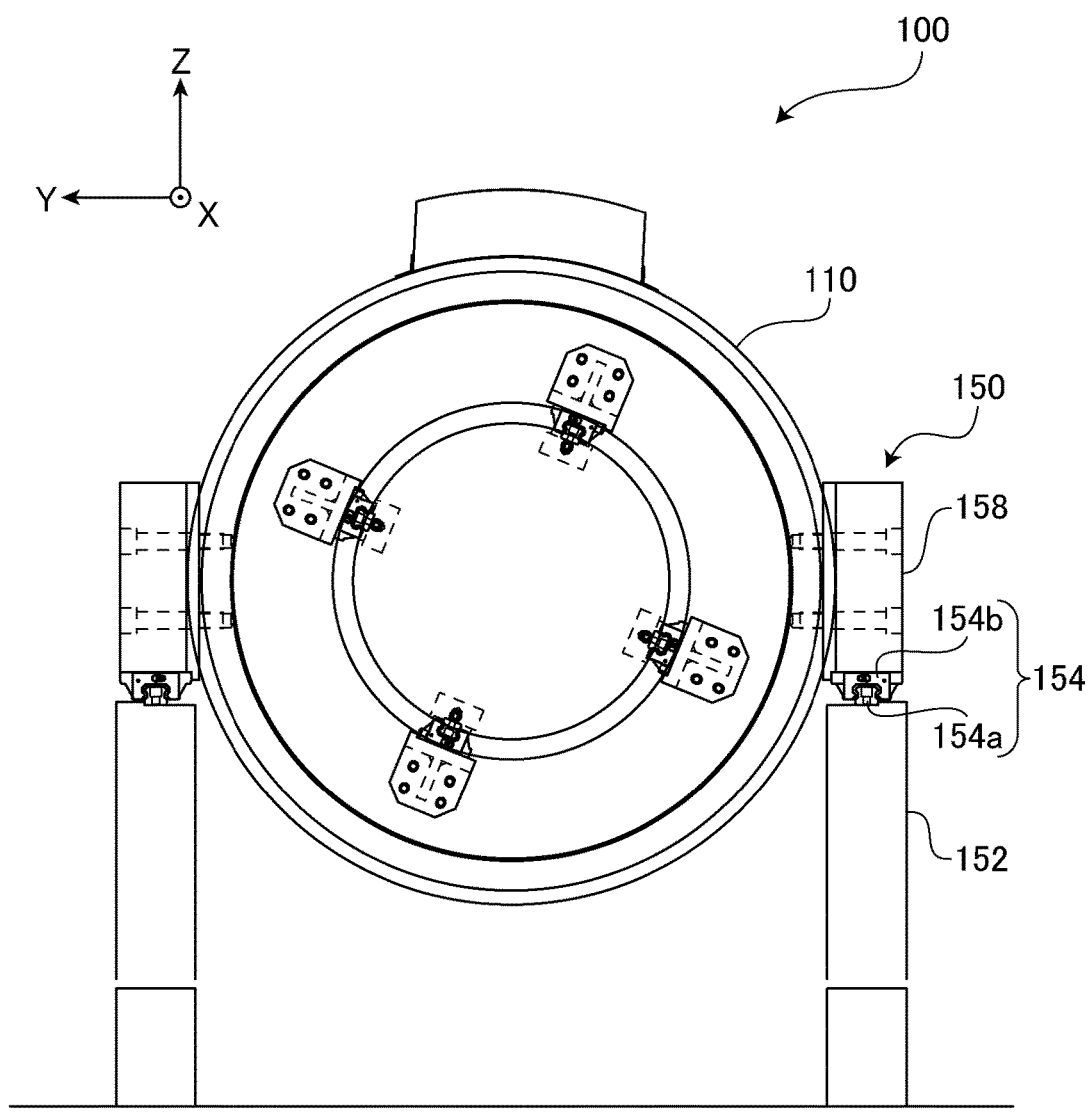
FIG. 9 is a front view of the X-axis oscillating unit according to the embodiment of the present invention.

Also, FIG. 7, FIG. 8 and FIG. 9 are a plane view, a side view and a front view of the X-axis oscillating unit, respectively. It is noted that FIG. 7, FIG. 8 and FIG. 9 are diagrams showing the X-axis oscillating unit 100 viewed toward the Z-axis negative direction, the Y-axis negative direction and the X-axis negative direction, respectively.

The oscillating units 100, 200 and 300 are linear motion oscillating units each comprising an electrodynamic actuator (voice coil motor). The vibrating table 400 and the oscillating units 100, 200 and 300 are coupled with each other via respective biaxial sliders (YZ slider 160, ZX slider 260 and XY slider 360) being slide coupling mechanisms. The oscillating device 1 oscillates the vibrating table 400 and a test specimen fixed on the vibrating table 400 in the three orthogonal axis directions with the oscillating units 100, 200 and 300.

Figure 27:
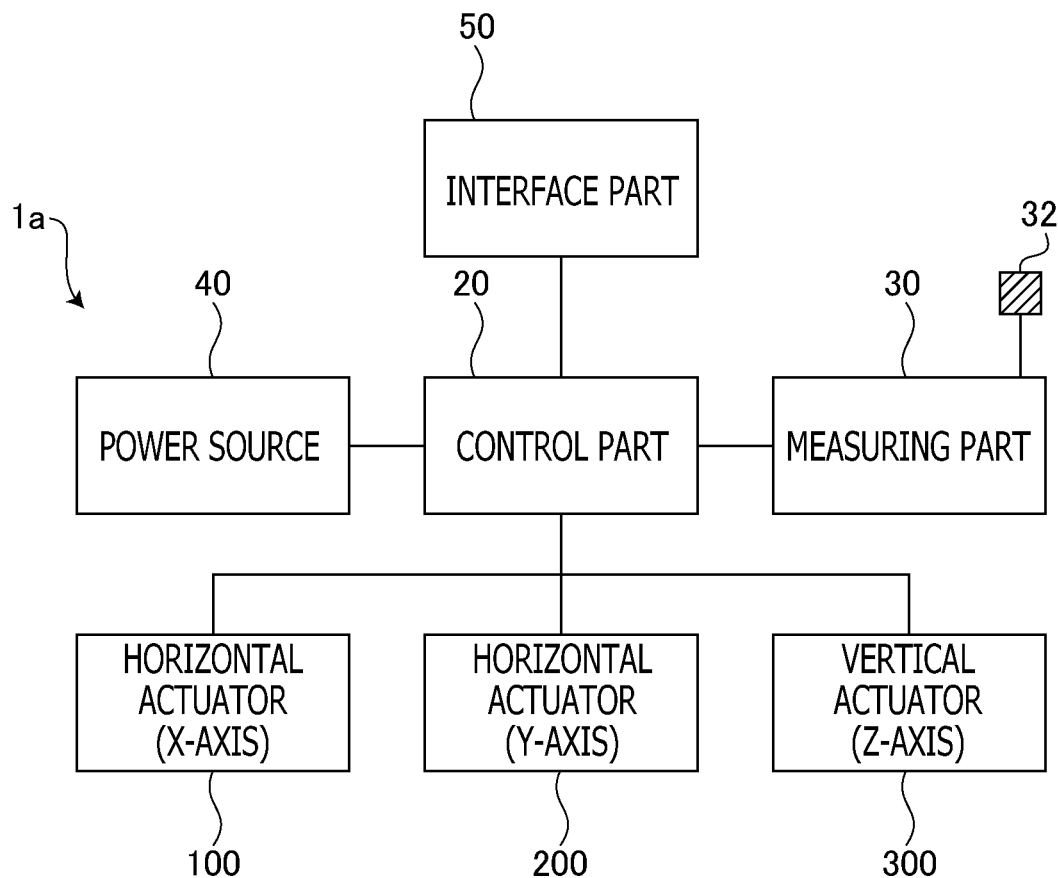
FIG. 27 is a block diagram of a drive control system of the oscillating device according to the embodiment of the present invention.

FIG. 27 is a block diagram showing a brief configuration of a drive control system 1a of the oscillating device 1. The drive control system 1a comprises a control part 20 for controlling the whole operations of the device, a measuring part 30 for measuring vibration of the vibration table 400, a power source 40 for supplying electrical power to the control part 20, and an interface part 50 for performing input from and output to the outside.

The interface part 50 comprises, for example, one or more of user interfaces that perform input from and output to a user, a network interface for connecting with every kind of networks such as a LAN (Local Area Network), and every kind of communication interfaces such as a USB (Universal Serial Bus) or a GPIB (General Purpose Interface Bus) for connecting with outside devices. Also, the user interfaces include, for example, one or more of every kind of manipulation switches, indicators, every kind of display devices such as an LCD (Liquid Crystal Display), every kinds of pointing devices such as a mouse or a touch-pad, and every kind of input and output devices such as touch screens, video cameras, printers, scanners, buzzers, speakers, microphones and memory card readers and writers.

The measuring part 30 comprises a triaxial vibration sensor (triaxial vibration pickup) attached to the vibrating table 400, and performs amplification and digital conversion to signals outputted by the triaxial vibration sensor 32 (e.g., velocity signals or acceleration signals) and sends them to the control part 20. It is noted that the triaxial vibration sensor 32 detects vibrations in the X-axis direction, the Y-axis direction and the Z axis direction independently. Also, the measuring part 30 calculates every kind of parameters indicating a vibrating state of the vibration table 400

(e.g., velocity, acceleration, amplitude, power spectral density and the like) on the basis of the signals from the triaxial vibration sensor 32 and sends them to the control part 20. The control part 20 can oscillate the vibrating table 400 in desired amplitudes and frequencies by controlling magnitudes and frequencies of alternating currents to be inputted to a drive coil of each of the oscillating units 100, 200 and 300 (which will be described later) on the basis of oscillation waveforms input via the interface part 50 and the signals from the measuring part 30.

Hereinafter, structures of each of the oscillating units 100, 200 and 300 will be described. As will be described later, the X-axis oscillating unit 100 and the Y-axis oscillating unit 200 comprise horizontal drive electrodynamic actuators (Hereinafter simply referred to as "horizontal actuator.") 100A and 200A, respectively. On the other hand, the Z-axis oscillating unit 300 comprises a vertical drive electrodynamic actuator (Hereinafter simply referred to as "vertical actuator.") 300A.

The vertical actuator 300A comprises an air spring 330 (which will be described later) for supporting weights (static loads) of the test specimen and the vibration table. On the other hand, the horizontal actuators 100A and 200A comprise neutral spring mechanisms 130 and 230 (which will be described later), respectively, that apply restoring forces for bringing the vibrating table back to a neutral position (origin, reference position). Since the configurations of the X-axis oscillating unit 100 and the Y-axis oscillating unit 200 are identical to the Z-axis oscillating unit 300 apart from comprising the neutral spring mechanisms 130 and 230 instead of the air spring 330, the detailed configuration of the Z-axis oscillating unit 300 will be described on behalf of each of the oscillating units.

Figure 10:
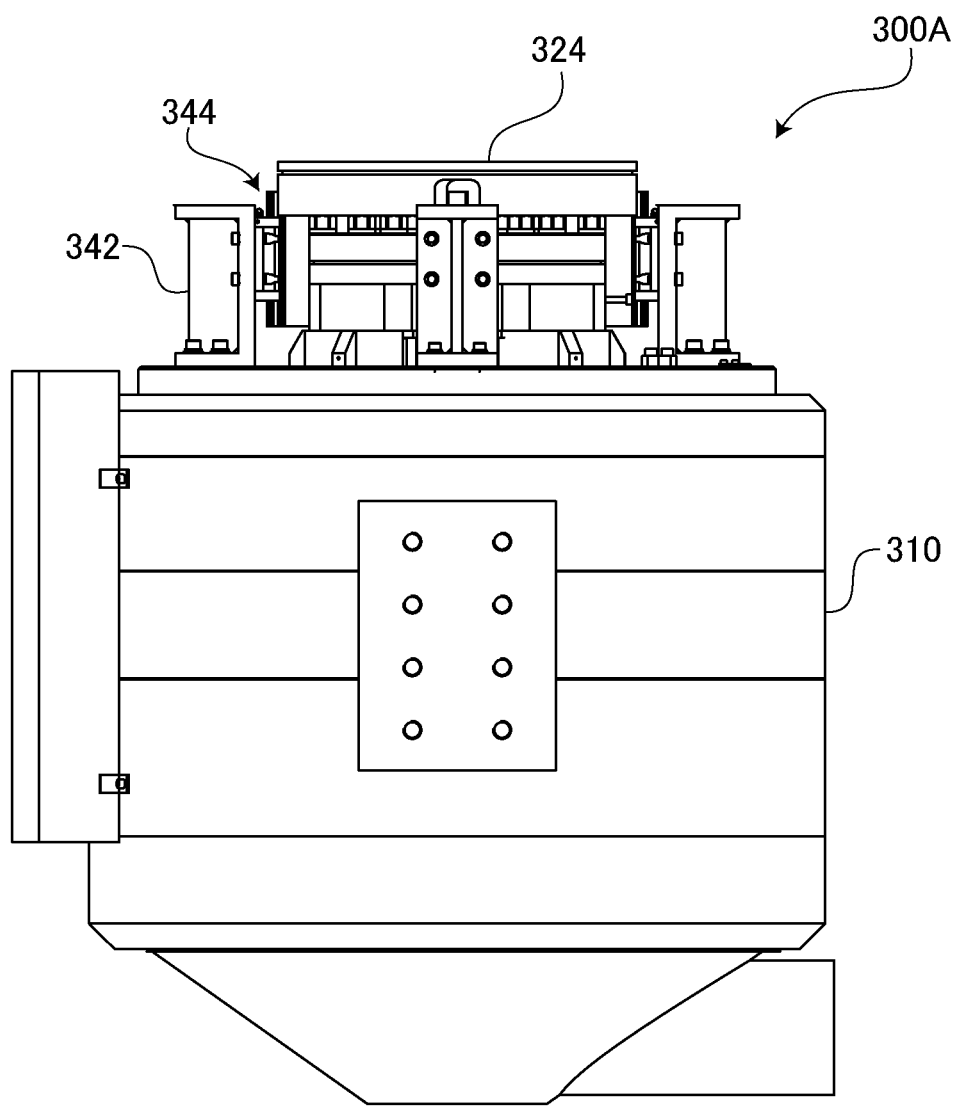
FIG. 10 is a side view of a vertical drive electrodynamic actuator according to the embodiment of the present invention.
Figure 11:
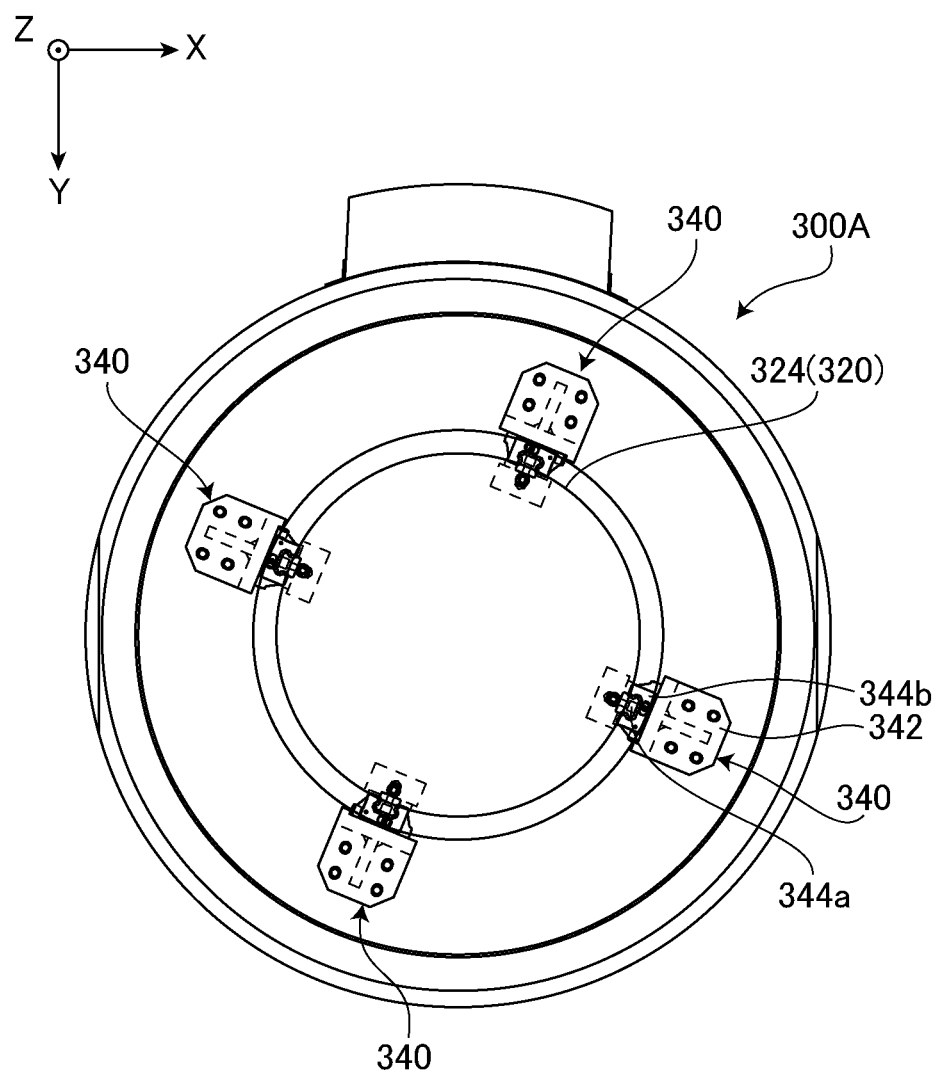
FIG. 11 is a front view of a vertical drive electrodynamic actuator according to the embodiment of the present invention.
Figure 12:
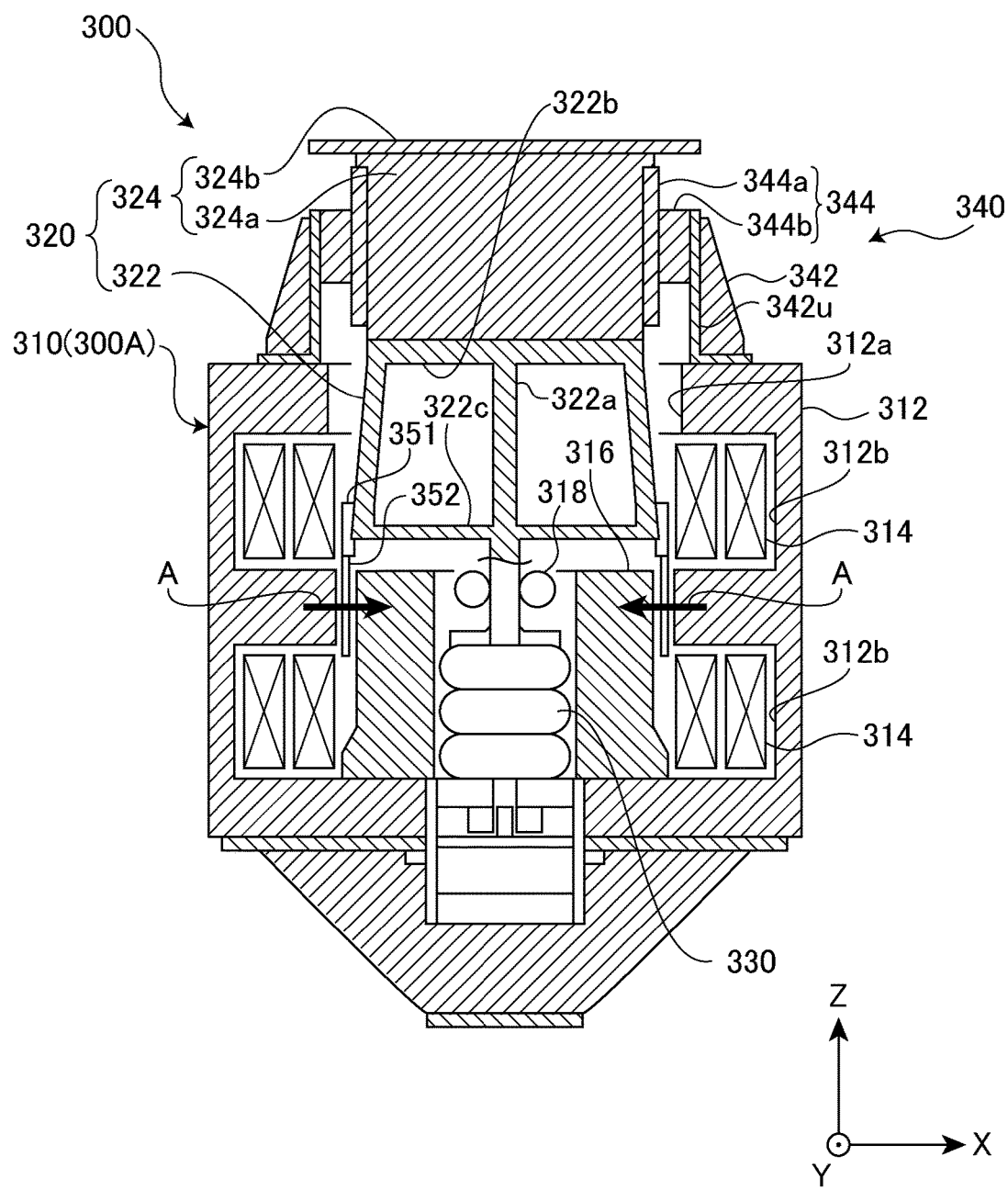
FIG. 12 is a longitudinal section view of a vertical drive electrodynamic actuator according to the embodiment of the present invention.

FIG. 10 is a side view of the vertical actuator 300A, and FIG. 11 is a front view thereof. Also, FIG. 12 is a longitudinal section view of the Z-axis oscillating unit 300 (vertical actuator 300A). The vertical actuator 300A comprises a fixing part 310 having a tubular body 312 and a movable part 320 accommodated inside the tube of the fixing part 310. The movable part 320 can move in the vertical direction (Z-axis direction) with respect to the fixing part 310. The movable part 320 comprises a main frame 322 having a substantially cylindrical shape and a drive coil 352 coaxially attached to a lower end portion of the main frame 322. Also, a junction frame 324 having a diameter substantially equal to a diameter of the main frame 322 is attached to an upper end of the main frame 322.

The drive coil 352 is attached to the lower end of the main frame 322 via a drive coil retaining member 351. The main frame 322 is formed to have a truncated cone shape with the side face gently inclined to have larger outer diameter at the lower side. Also, the main frame 322 has a rod 322a that extends on a central axis, and a top plate 322b and a base plate 322c arranged perpendicular to the central axis. The top plate 322b and the base plate 322c are coupled with each other by the rod 322a. The rod 322a penetrates through the base plate 322c and further elongates downward. Furthermore, the junction frame 324 is attached to the top plate 322b.

Also, an inner magnetic pole 316 having a substantially cylindrical shape and arranged coaxially with the tubular member 312 of the fixing part is fixed inside the tubular member 312. The tubular member 312 and the inner magnetic pole 316 are both made of magnetic substances. An outer diameter of the inner magnetic pole 316 is smaller than the inner diameter of the drive coil 352, and the drive coil 352 is arranged in a gap between an outer peripheral surface of the inner magnetic pole 316 and an inner peripheral surface of the tubular member 312. Also, a bearing 318 that supports the rod 322a movably only in the Z-axis direction is fixed inside a tube of the inner magnetic pole 316.

A plurality of recesses 312b are formed on an inner peripheral surface 312a of the tubular member 312, and an excitation coil 314 is accommodated in each of the recesses 312b. When a direct current (excitation current) is supplied to the excitation coils 314, magnetic fields in radial directions of the tubular member 312 such as shown in arrows A are generated at a portion where the inner peripheral surface 312a of the tubular member 312 is adjacent to and opposes the outer peripheral surface of the inner magnetic pole 316. If a drive current is supplied to the drive coil 352 in this state, the Lorentz force in an axis direction of the drive coil 352, that is, in the Z-axis direction, is generated, and the movable part 320 is driven in the Z-axis direction.

Also, the air spring 330 is accommodated in the tube of the inner magnetic pole 316. A lower end of the air spring 330 is fixed to the fixing part 310, and the rod 322a is fixed to the upper end of the air spring 330. The air spring 330 supports the main frame 322 from below via the rod 322a. That is, weights (static loads) of the movable part 320 and the XY slider 360, the vibrating table 400 and the specimen supported by the movable part 320 are supported by the air spring 330. Therefore, the need to support the weights (static loads) of the movable parts 320, the vibrating table 400 and the like by the drive force (Lorentz force) of the Z-axis oscillating unit 300 is eliminated by providing the air spring 330 to the Z-axis oscillating unit 300 and only dynamic load for oscillating the movable part 320 and the like needs to be supplied, and thus drive current to be supplied to the Z-axis oscillating unit 300 (i.e., power consumption) is reduced. Also, since the drive coil 352 can be downsized due to the reduction of the necessary drive force, the weight of the movable part 320 can be reduced and thus the Z-axis oscillating unit 300 can be driven in a higher frequency. Furthermore, since the need to supply a large direct current component for supporting the weights of the movable part 320, the vibration table 400 and the like is eliminated, a power source having a smaller and simpler configuration can be adopted as the power source 40.

Also, when the movable part 320 of the Z-axis oscillating unit 300 is driven, the fixing part 310 also receives a strong reaction force (oscillating force) in the drive axis (Z-axis) direction. The oscillating force transmitted from the movable part 320 to the fixing part 310 is alleviated by providing the air spring 330 between the movable part 320 and the fixing part 310. Therefore, for instance, vibration of the movable part 320 is prevented from being transmitted to the vibrating table 400 via the fixing part 310, the device base 500 and the oscillating units 100 and 200 as noise components.

Hereinafter, a configuration of the horizontal actuator 100A (FIG. 8) will be described. As mentioned above, the horizontal actuator 100A differs from the vertical actuator 300A in that the horizontal actuator 100A comprises the neutral spring mechanism 130 (FIG. 13) instead of the air spring 330 (FIG. 12), but other basic configurations are in common. Also, the horizontal actuator 200A has the same configuration as the horizontal actuator 100A described below. The neutral spring mechanism 130 elastically couples a fixing part 110 and a movable part 120 of the horizontal actuator 100A.

FIG. 13 is an enlarged longitudinal section view around the neutral spring mechanism 130 of the horizontal actuator 100A. Inside a broken line frame is a back view of the neutral spring mechanism 130 viewed toward the X-axis positive direction.

The neutral spring mechanism 130 comprises a protruding bracket 131, a rod 132, a nut 133 and a pair of coil springs (compression coil springs) 134 and 135. The protruding bracket 131 is fixed to the bottom portion of the fixing part 110 at a flange portion 131a. Also, at the center of a top plate 131b of the protruding bracket 131, a through hole 131b1 through which the rod 132 penetrates is provided.

A flange portion 132b is provided at an end (right edge in FIG. 13) of the rod 132 extending in the X-axis direction, and the rod 132 is coupled to a tip (left edge in FIG. 13) of the rod 122a of the movable part 120 via the flange portion 132b. Also, a male screw portion 132a that engages with the nut 133 is formed on the other end portion (left edge in FIG. 13) of the rod 132.

The pair of the coil springs 134 and 135 are put on the rod 132. One coil spring 134 is retained by nipping it between a flange portion of the nut 133 and the top plate 131b (coil (elastic component) supporting plate) of the protruding bracket 131. The other coil spring 135 is retained by nipping it between the top plate 131b and the flange portion 132b of the rod 132. A preload is applied to the pair of the coil springs 134 and 135 by the tightening of the nut 133. A position where restoring forces of the two coil springs 134 and 135 balance is a neutral position (or origin or reference position) of the movable part 120 of the horizontal actuator 100A. When the movable part 120 moves away from the neutral position, a restoring force that moves the movable part 120 back to the neutral position is applied to the movable part 120 by the neutral spring mechanism 130 (directly by the pair of the coil springs 134 and 135). Accordingly, it becomes possible for the movable part 120 to reciprocate in the X-axis direction with the neutral position always at the center of the reciprocation, and thus a problem in which a position of the movable part 120 sways while driving is overcome.

Hereinafter, returning back to the description of the vertical actuator 300A, a configuration of a movable part support mechanism 340 supporting an upper portion of the movable part 320 from a side thereof slidably in the axial line direction will be described. As shown in FIG. 6 and FIG. 12, the movable part support mechanism 340 of the present embodiment comprises a guide frame 342 and a Z-axis linear guide 344. It is noted that, as the Z-axis linear guide 344, a linear guide having a configuration identical to an A-type linear guide 364A (FIGS. 17-19) which will be described later is used. The Z-axis linear guide 344 comprises a Z-axis rail 344a and a Z-axis carriage 344b. On a side face of a torso portion 324a of the junction frame 324, four Z-axis rails 344a extending in the Z-axis direction are attached at regular intervals in a circumferential direction. Specifically, the Z-axis rail 344a is provided to each of the X-axis ends and the Y-axis ends of the torso portion 324a.

Also, on a top face of the fixing part 310 (tubular member 312), four guide frames 342 are fixed at regular intervals (90 degree intervals) along the inner peripheral surface of the tubular member 312. The guide frame 342 is a fixing member having an L-shaped cross-section and reinforced with a rib (also referred to as angle rests, angles or L-shaped brackets). To a vertical portion 342u of each of the guide frames 342, the Z-axis carriage 344b that engages with the Z-axis rail 344a is fixed.

The Z-axis carriage 344b has a plurality of rotatable rollers 344c (which will be described later) as rolling bodies and configures the Z-axis linear guide 344, being a roller bearing mechanism, together with the Z-axis rail 344a. That is, the movable part 320 is supported, at the upper portion of the junction frame 324, from its side by four sets of supporting structures (movable part support mechanisms 340) each constituted of a pair of the guide frame 342 and the Z-axis linear guide 344 and is configured not to move in the X-axis direction and the Y-axis direction. Therefore, cross talks that occur due to vibrations of the movable part 320 in the X-axis direction and the Y-axis direction are prevented. Also, the movable part 320 can move smoothly in the Z-axis direction by the use of the Z-axis linear guide 344. Furthermore, since, as described above, the movable part 320 is also supported, at the lower portion, by the bearing 318 such that the movable part can only move in the Z-axis direction, rotations about the X axis, the Y axis and the Z axis are also restricted, and thus unnecessary vibrations (vibrations other than the controlled translation in the Z-axis direction) hardly occur.

Also, as a configuration for coupling the movable part 320 and the guide frame 342 with the Z-axis linear guide 344, a configuration in which the Z-axis rail 344a is attached to the guide frame 342 fixed to the fixing part 310 and the Z-axis carriage 344b attached to the movable part 320 is slidably supported by the Z-axis rail 344a is also possible. However, in the present embodiment, contrary to the above, the Z-axis rail 344a is attached to the movable part 320 and the Z-axis carriage 344b is attached to the guide frame 342. Unnecessary vibrations are suppressed by adopting this attachment structure. This is because, since the Z-axis rail 344a is lighter than the Z-axis carriage 344b, longer in length in the driving direction (Z-axis direction) (and therefore smaller in mass per unit length), and mass distribution is uniform in the driving direction, mass distribution change when the Z-axis oscillating unit 300 is driven is smaller if the Z-axis rail 344a is fixed to the movable part 320, and vibrations that occur due to the mass distribution change can be suppressed. Also, since a center of gravity of the Z-axis rail 344a is lower than that of the Z-axis carriage 344b (i.e., a distance between an installation surface and the center of gravity is shorter), an inertia moment becomes smaller if the Z-axis rail 344a is fixed to the movable side. Therefore, due to this configuration, it becomes easier to make a resonance frequency of the fixing part 310 sufficiently higher than oscillating frequency bands (e.g., 0-100 Hz), and thus a decrease in oscillating accuracy due to resonance is suppressed.

Hereinafter, a configuration of the XY slider 360 that couples the Z-axis oscillating unit 300 and the vibration table 400 together will be described. As shown in FIGS. 4-6, the XY slider 360 of the present embodiment comprises four sets of cross guideways (Hereinafter simply referred to as "cross guides.") 364.

Figure 14:
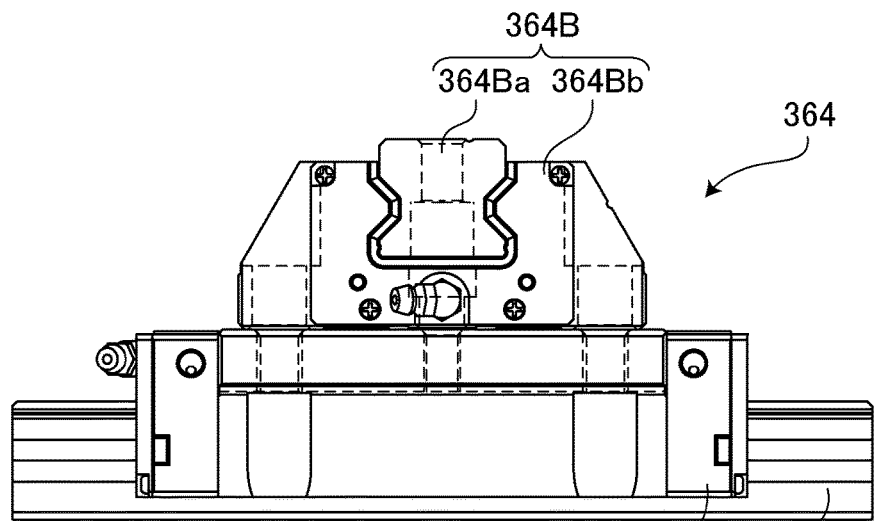
FIG. 14 is an external view of a cross guide according to the embodiment of the present invention.

FIG. 14 shows an external view of the cross guide 364. The cross guide 364 is a guide in which carriages of an A-type linear guide 364A and a B-type linear guide 364B which will be described later are overlapped with each other such that their movable directions bisect at right angles and fixed together.

Figure 15:
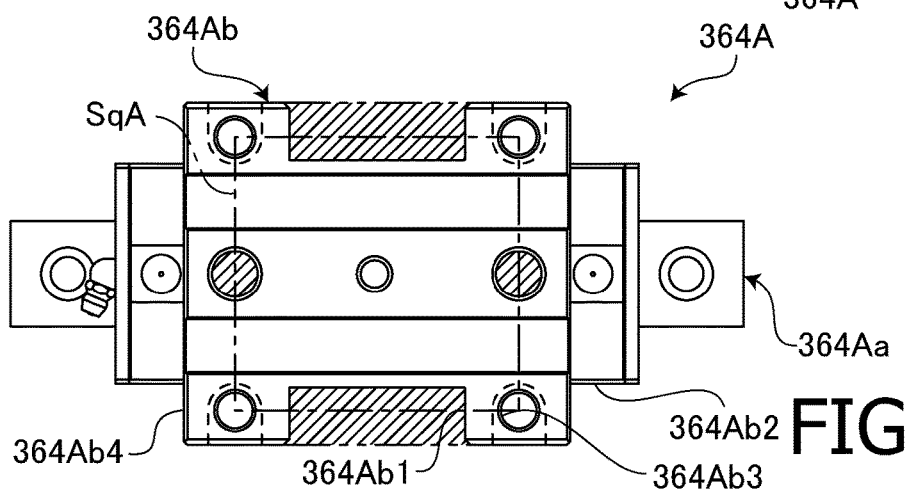
FIG. 15 is a plane view of an A-type linear guide according to the embodiment of the present invention.
Figure 16:
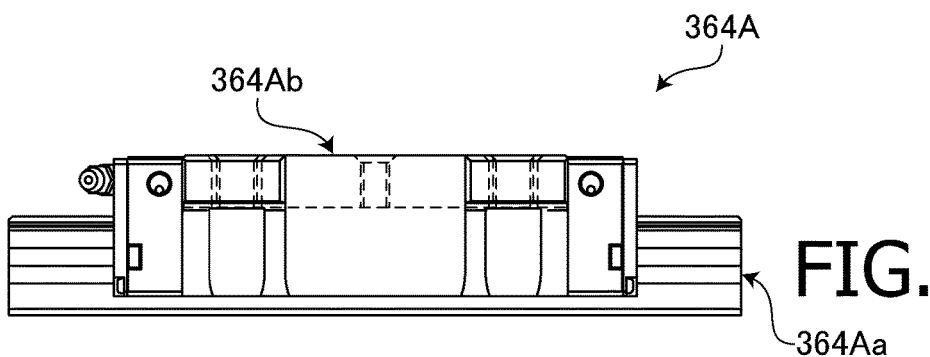
FIG. 16 is a side view of the A-type linear guide according to the embodiment of the present invention.
Figure 17:
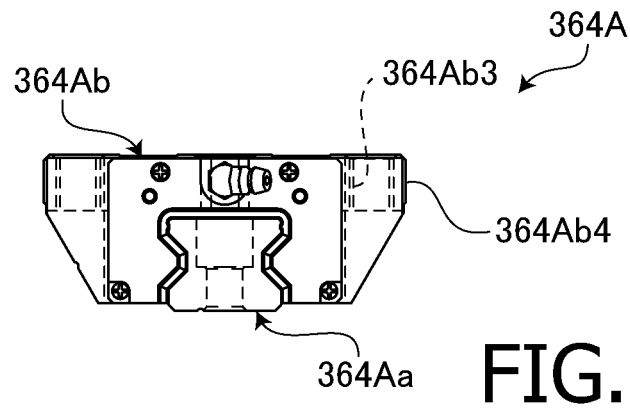
FIG. 17 is a front view of the A-type linear guide according to the embodiment of the present invention.

FIGS. 15-17 shows external views of the A-type linear guide 364A. FIG. 15, FIG. 16 and FIG. 17 are a plane view, a side view (viewed from blow in FIG. 15) and a front view (viewed from the left in FIG. 15) of the A-type linear guide 364A, respectively. The A-type linear guide 364A comprises a rail 364Aa and a carriage 364Ab.

Figure 18:
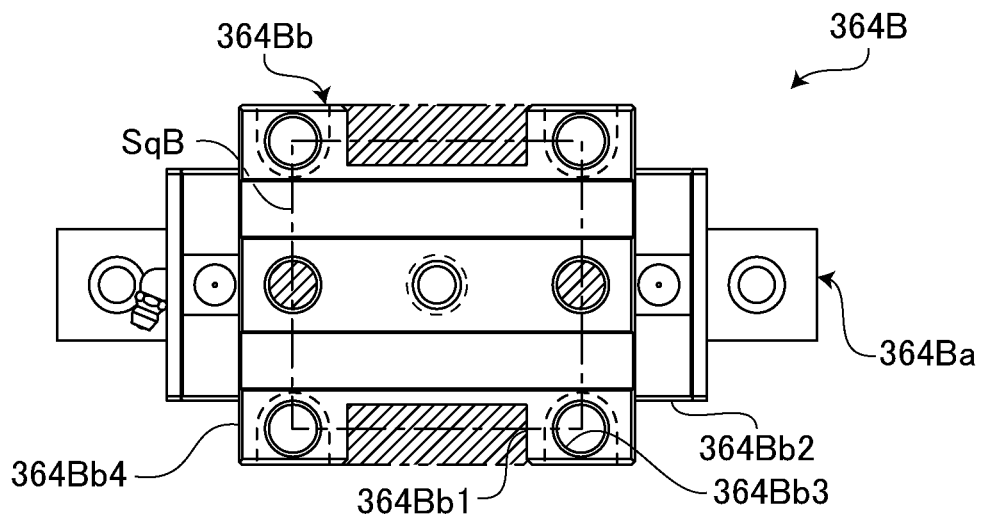
FIG. 18 is a plane view of a B-type linear guide according to the embodiment of the present invention.
Figure 19:
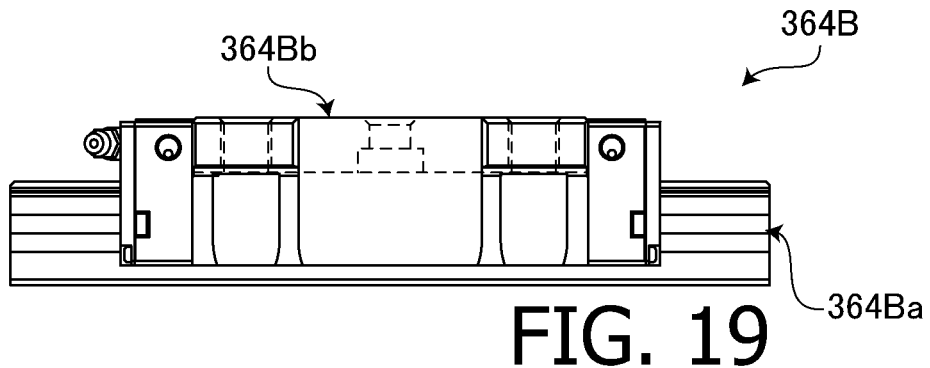
FIG. 19 is a side view of the B-type linear guide according to the embodiment of the present invention.
Figure 20:
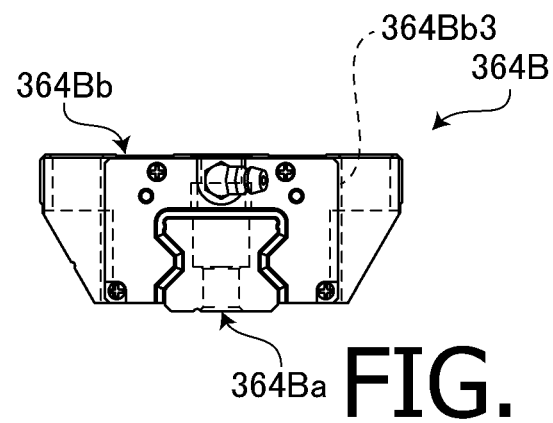
FIG. 20 is a front view of the B-type linear guide according to the embodiment of the present invention.

Also, FIGS. 18-20 shows external views of the B-type linear guide 364B. FIG. 18, FIG. 19 and FIG. 20 are a plane view, a side view (viewed from blow in FIG. 18) and a front view (viewed from the left in FIG. 18) of the B-type linear guide 364B, respectively. The B-type linear guide 364B comprises a rail 364Ba and a carriage 364Bb.

The A-type linear guide 364A is provided with four carriage attachment holes (Hereinafter simply referred to as "attachment holes.") 364Ab3, being tapped holes for fixing bolts, at four corners of a carriage top face of the carriage 364Ab. The four attachment holes 364Ab3 are formed such that their center lines touch respective corners of a square SqA (shown in a chain line in FIG. 15) on the carriage top face.

On the other hand, the B-type linear guide 364B is provided with four attachment holes 364Bb3, being drilled holes for fixing bolts, at four corners of a carriage top face of the carriage 364Bb. The four attachment holes 364Bb3 are formed such that their center lines touch respective corners of a square SqB (shown in a chain line in FIG. 18) on the carriage top face.

Also, distances between the attachment holes 364Bb3 (i.e., lengths of sides of the square SqB) coincide with distances between the attachment holes 364Ab3 of the A-type linear guide 364A (i.e., lengths of sides of the square SqA). Therefore, even if the A-type linear guide 364A and the B-type linear guide are overlapped with each other while shifting their movable directions to each other by 90 degrees, the positional relationships of the four attachment holes 364Bb3 and the four attachment holes 364Ab3 coincide with each other, and thus the carriage 364Bb and the carriage 364Ab can be coupled by 4 bolts. Also, since the attachment holes 364Ab3 of the carriage 364Ab are formed as tapped holes and the attachment holes 364Bb3 of the carriage 364Bb are formed as drilled holes, the carriage 364Ab and the carriage 364Bb can be coupled directly with each other without using a coupling plate. This makes it possible to downsize and reduce weight of the cross guide 364. Also, downsizing the cross guide 364 by eliminating a coupling plate makes rigidity of the cross guide 364 to increase (i.e., makes an eigenfrequency of the cross guide 364 to increase), and thus oscillating performance improves. Specifically, it becomes possible to oscillate up to a higher frequency with less vibration noises. Also, electrical power needed to oscillate the cross guide (i.e., to drive the mechanism part 10) is reduced.

Also, L-shaped notches 364Ab2 and 364Bb2 are formed at the four corners of the carriage top faces of the carriage 364Ab and the carriage 364Bb, respectively. Furthermore, U-shaped notches 364Ab1 and 364Bb1 (hatched portions) are formed on both sides in width directions (vertical directions in FIG. 15 and FIG. 18) and at centers in the movable directions of the carriage 364Ab and the carriage 364Bb, respectively. In other words, apart from four flange portions 364Ab4 and four flange portions 364Bb4 on which the attachment holes 364Ab3 and 364Bb3 are formed, both side edges of the carriage 364Ab and the carriage 364Bb in the width directions are cut off. By these configurations, weight reductions of the carriage 364Ab and the carriage 364Bb are realized.

Being configured with the small and lightweight A-type linear guide 364A and B-type linear guide 364B for cross guides, the cross guide 364 is small, lightweight and have a high rigidity. Therefore, a resonance frequency of the cross guide 364 is high, making it possible to realize XY sliders (slide coupling mechanism) with less vibration noises.

Also, apart from the attachment holes 364Bb3 and 364Ab3, the carriage 364Ab and the carriage 364Bb have the same structure. Furthermore, the rail 364Aa and the rail 364Ba have the same structure. Therefore, weight balance will not be lost even if the A-type linear guide 364A and the B-type linear guide 364B are used in combination.

Also, each of the carriage 364Ab and 364Bb has substantially two times rotation symmetry around an axis in a vertical direction (directions perpendicular to the paper in FIGS. 15 and 18) but does not have four times rotation symmetry. Therefore, response characteristics to external forces (i.e., vibration characteristics) in linear motion directions (lateral directions in FIGS. 15 and 18) and in lateral directions (vertical directions in FIGS. 15 and 18) are different. The carriage of the cross guide 364 (Hereinafter referred to as "cross carriage.") in which the carriage 364Ab and the carriage 364Bb, each having substantially two times rotation symmetry and their weight distributions being substantially equal, are rotated by 90 degrees about a vertical axis (two times rotation symmetry axis of each of the carriages 364Ab and 364Bb) and coupled with each other obtains substantially four times rotation symmetry and thus has response characteristics to external forces in two linear motion directions (X-axis directions and Y-axis directions) being more homogenous.

By coupling the movable part 320 of the Z-axis oscillating unit 300 and the vibrating table 400 together via the above-described cross guide 364, the vibrating table is coupled to the movable part 320 of the Z-axis oscillating unit 300 slidably in the X-axis direction and the Y-axis direction.

Figure 21:
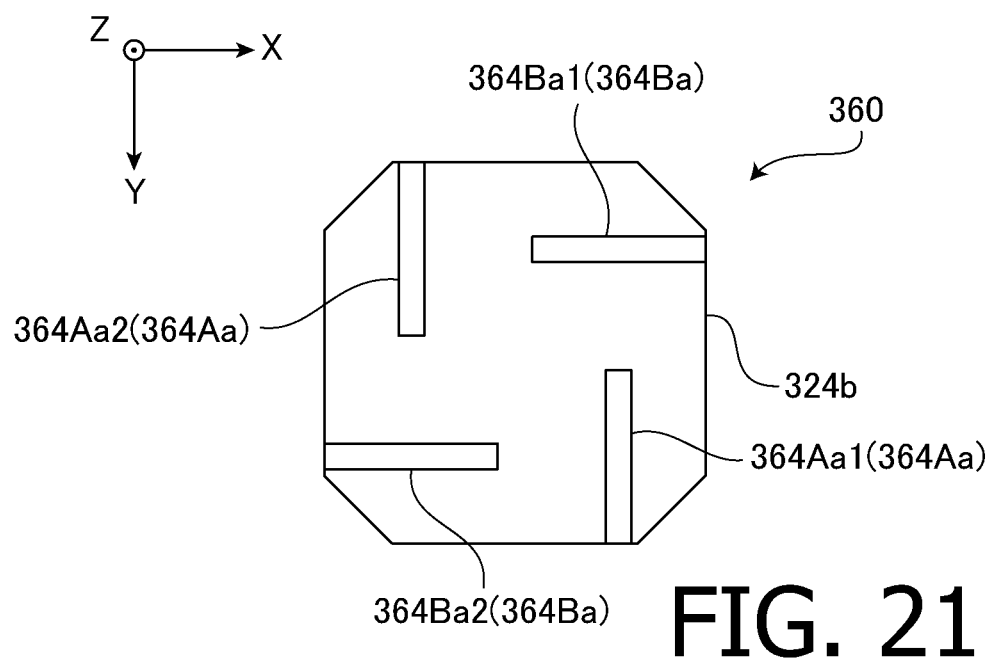
FIG. 21 is a diagram illustrating an arrangement of rails attached to a top board of a junction frame.

FIG. 21 is a top view for describing a positional relationship between the rails 364Aa and 364Ba of four cross guides 364 attached to a top plate 324b of the junction frame 324. In the XY slider 360 of the present embodiment, orientations of four rails (specifically, two rails 364Aa and two rails 364Ba) attached to the top plate 324b are alternately changed in the X-axis direction (lateral direction in FIG. 21) and in the Y-axis direction (vertical direction in FIG. 21). By this arrangement, an overall weight distribution of the four cross guides 364 are averaged, and thus vibration characteristics having less directionalities are realized.

Furthermore, as shown in FIG. 21, vertical positional relationships between the A-type linear guide 364A and the B-type linear guide 364B (i.e., the rails 364Aa and 364Ba fixed to the top plate 324b of the junction frame 324) are alternately changed by every cross guide 364. This averages a slight difference between the weight distributions of the A-type linear guide 364A and the B-type linear guide 364B, and thus vibration characteristics having less directionalities are realized.

By coupling the Z-axis oscillating unit 300 and the vibrating table 400 via the XY slider 360 capable of sliding in the X-axis direction and the Y-axis direction with small friction resistance as described above, vibration components of the vibrating table 400 in the X-axis direction and the Y-axis direction will not be transmitted to the Z-axis oscillating unit 300 even if the vibrating table 400 is vibrated in the X-axis direction and the Y-axis direction by the X-axis oscillating unit 100 and the Y-axis oscillating unit 200, respectively.

Also, forces acting on the vibrating table 400 in the X-axis direction and the Y-axis direction hardly change by the driving of the Z-axis oscillating unit 300. Therefore, oscillation with less crosstalk becomes possible.

Hereinafter, a configuration of the YZ slider 160 (FIG. 6 and FIG. 8) that couples the X-axis oscillating unit 100 and the vibrating table 400 will be described. The YZ slider 160 comprises a coupling arm 162 fixed to a tip face of the movable part 120 (junction frame 124) of the X-axis oscillating unit 100, a set of Y-axis linear guide 164A coupling the coupling arm 162 (X-axis oscillating unit 100) and the vibrating table 400 slidably in the Y-axis direction, and three sets of Z-axis linear guides 164B coupling the X-axis oscillating unit 100 and the vibrating table 400 slidably in the Z-axis direction. Also, the Y-axis linear guide 164A comprises one Y-axis rail 164Aa and three Y-axis carriages 164Ab. On the other hand, the Z-axis linear guide 164B comprises 1 Z-axis rail 164Ba and one Z-axis carriage 164Bb.

As shown in FIG. 7, at the X-axis oscillating unit 100 side, the coupling arm 162 is formed to have substantially the same size as a diameter of the movable part 120 (junction frame 124). Due to this configuration, oscillating force of the X-axis oscillating unit 100 is transmitted to the coupling arm 162 in good balance. Also, at the vibrating table 400 side, the coupling arm 162 is elongated to have substantially the same size as a length of the Y-axis rail 164Aa. This configuration makes it possible to support the Y-axis rail 164Aa being longer than a diameter of the junction frame 124 across the full length of the Y-axis rail 164Aa.

Also, to reduce weight, five circular holes 162$a$ penetrating through in the Z-axis direction are formed on the coupling arm 162 at regular intervals in the Y-axis direction. The number and the diameters of the circular holes 162$a$ formed on the coupling arm 162 and the distances between the circular holes 162$a$ are set in accordance with the size of the coupling arm 162, oscillating force to be applied to the coupling arm 162 and the like.

The Y-axis rail 164Aa extending in the Y-axis direction is fixed to the movable part 120 of the X-axis oscillating unit 100 via the coupling arm 162 and the junction frame 124. Also, thee Y-axis carriages 164Ab that slidably engage with the Y-axis rail 164Aa are mounted to the Y-axis rail 164Aa.

The three Z-axis rails 164Ba extending in the Z-axis direction are attached to a side face of the vibrating table 400 opposing the X-axis oscillating unit 100 at regular intervals in the Y-axis direction. Also, the Z-axis carriages 164Bb that slidably engage with the Z-axis rails 164Ba are mounted to each of the Z-axis rails 164Ba.

It is noted that, in the present embodiment, the Y-axis carriage 164Ab has a configuration identical to the carriage 364Ab of the A-type linear guide 364$a$ described above, and the Z-axis carriage 164Bb has a configuration identical to the carriage 364Bb of the B-type linear guide 364B described above. It is noted that the carriage 364Bb of the B-type linear guide 364B may be used as the Y-axis carriage 164Ab and the carriage 364Ab of the A-type linear guide 364$a$ may be used as the Z-axis carriage 164Bb.

The Y-axis carriage 164Ab and the Z-axis carriage 164Bb are coupled by four bolts to form a carriage (cross carriage) of the cross guide 164. That is, the Y-axis rail 164Aa is coupled to three Z-axis rails 164Ba via three cross carriages. By this configuration, the vibrating table 400 is coupled to the movable part 120 of the X-axis oscillating unit 100 slidably with respect to the movable part 120 in the Y-axis direction and the Z-axis direction.

By coupling the X-axis oscillating unit 100 and the vibrating table 400 via the YZ slider 160 capable of sliding in the Y-axis direction and the Z-axis direction with small friction resistance as described above, vibration components of the vibrating table 400 in the Y-axis direction and the Z-axis direction will not be transmitted to the X-axis oscillating unit 100 even if the vibrating table 400 is vibrated in the Y-axis direction and the Z-axis direction by the Y-axis oscillating unit 200 and the Z-axis oscillating unit 300, respectively.

Also, forces acting on the vibrating table 400 in the Y-axis direction and the Z-axis direction hardly change by the driving of the X-axis oscillating unit 100. Therefore, oscillation with less crosstalk becomes possible.

Also, the ZX slider 260 that couples the Y-axis oscillating unit 200 and the vibrating table 400 together has a configuration identical to that of the YZ slider 160, and the vibrating table 400 is coupled to a movable part of the Y-axis oscillating unit 200 slidably with respect to the movable part in the Z-axis direction and the X-axis direction. Therefore, vibration components of the vibrating table 400 in the Z-axis direction and the X-axis direction will not be transmitted to the Y-axis oscillating unit 200 even if the vibrating table 400 is vibrated in the Z-axis direction and the X-axis direction by the Z-axis oscillating unit 300 and the X-axis oscillating unit 100, respectively.

Also, forces acting on the vibrating table 400 in the Z-axis direction and the X-axis direction hardly change by the driving of the Y-axis oscillating unit 200. Therefore, oscillation with less crosstalk becomes possible.

As described above, each of the oscillating units 100, 200 and 300 can accurately oscillate the vibrating table 400 in respective drive axis directions without interfering with each other. Also, since the movable part of each of the oscillating units 100, 200 and 300 is supported to be movable only in the driving direction by the guide frame and the linear guide, vibrations in non-driving directions hardly occur on the oscillating units 100, 200 and 300. Therefore, vibrations in uncontrolled non-driving directions will not be applied to the vibrating table 400 from each of the oscillating units 100, 200 and 300. Therefore, vibration of the vibrating table 400 in each axis direction is controlled accurately by the driving of the respective one of the oscillating units 100, 200 and 300.

Hereinafter, an internal structure of the linear guide mechanism (rails and carriages) used in the movable part support mechanisms 140, 240 and 340, the YZ slider 160, the ZX slider 260, the XY slider 360 and the like will be described by exemplifying the Z-axis linear guide 344 (Z-axis carriage 344$b$ and Z-axis rail 344$a$) of the movable part support mechanism 340. It is noted that, as described above, the Z-axis linear guide 344 has a configuration identical to that of the A-type linear guide 364A. Also, an internal structure of the B-type linear guide 364B is configured similarly to the Z-axis linear guide 344 apart from the attachment holes 364Bb3. Furthermore, other linear guide mechanisms used in the mechanism part 10 of the oscillating device 1 are configured similarly to the Z-axis linear guide 344.

Figure 22:
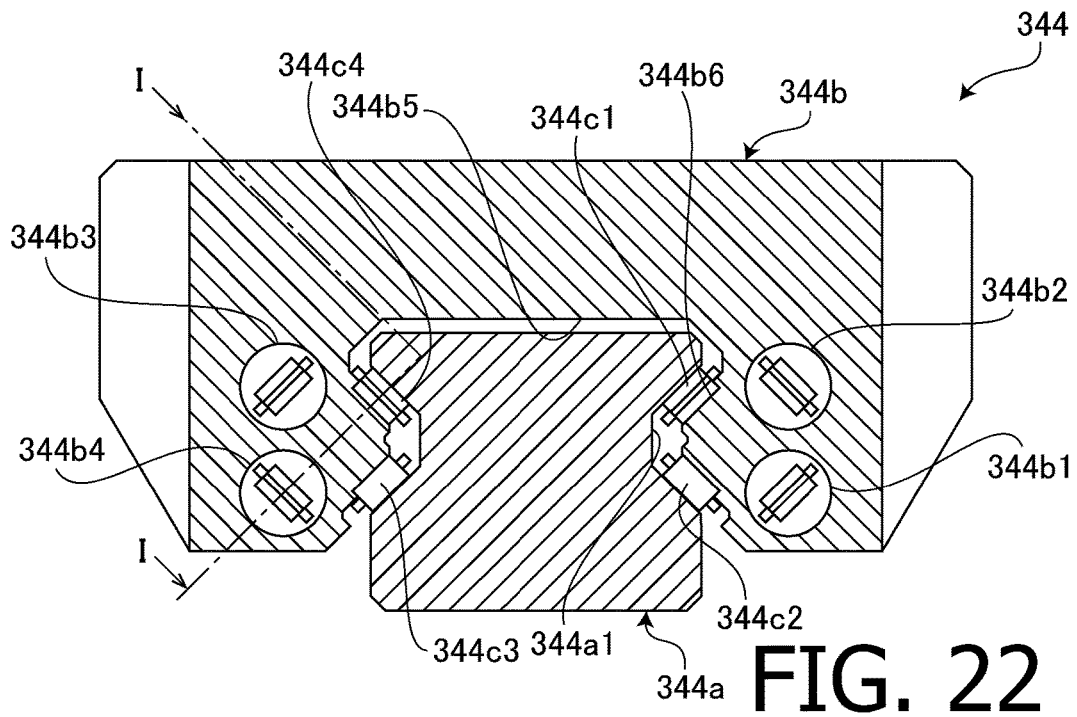
FIG. 22 is a cross sectional view of a roller bearing type linear guide.
Figure 23:
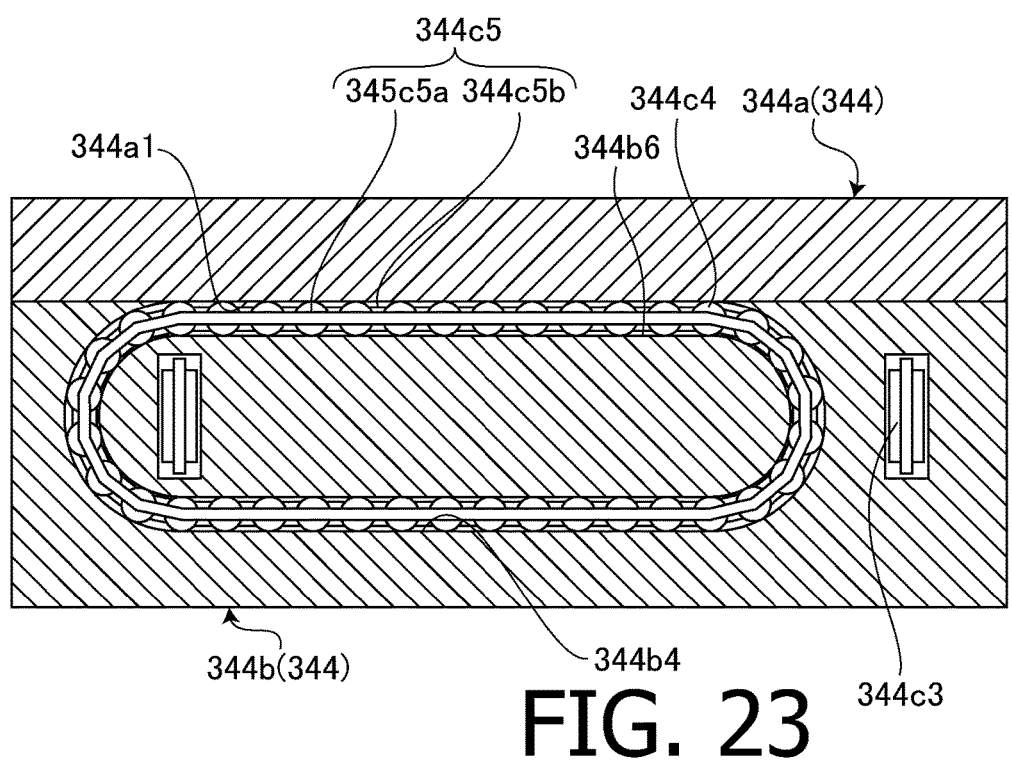
FIG. 23 is a sectional view in I-I of FIG. 22.

FIG. 22 is a cross sectional view of the Z-axis linear guide 344 (Z-axis rail 344$a$ and Z-axis carriage 344$b$) of the movable part support mechanism 340 cut along a plane perpendicular to a longitudinal axis of the Z-axis rail 344$a$ (i.e., XY plane). Also, FIG. 23 is a sectional view in I-I of FIG. 22. The Z-axis linear guide 344 of the present embodiment uses rollers as rolling bodies. A high positional accuracy and a high rigidity can be obtained by the use of the rollers.

A groove 344$a$1 having a trapezoidal sectional shape and extending in the Z-axis direction is formed on each of side faces of the Z-axis rail 344$a$ in the width direction in FIG. 22. Also, as shown in FIG. 22 and FIG. 23, a groove 344$b$5 extending in the Z-axis direction is formed on the Z-axis carriage 344$b$ such that the groove 344$b$5 surrounds the Z-axis rail 344$a$. On each of side walls of the groove 344$b$5, a protruding portion 344$b$6 extending along the groove 344$a$1 of the Z-axis rail 344$a$ is formed. On the protruding portion 344$b$6, a pair of inclined planes parallel to respective inclined planes of the trapezoidal groove 344$a$1 of the Z-axis rail 344*a* is formed. Between the four inclined planes on the pair of the grooves 344*a*1 of the Z-axis rail 344*a* and the four inclined planes on the protruding parts 344*b*6, respectively opposing to each other, respective gaps are formed. In the four gaps, a plurality of respective rollers 344*c*1, 344*c*2, 344*c*3 and 344*c*4 made of stainless steel and retainers 344*c*5 (FIG. 23) made of resin and configured to rotatably retain and couple the rollers are accommodated. Each of the rollers 344*c*1, 344*c*2, 344*c*3 and 344*c*4 is retained by being nipped between the inclined plane of the groove 344*a*1 and the inclined plane of the protruding part 344*b*6.

Also, inside the Z-axis carriage 344*b*, 4 roller escape passages 344*b*1, 344*b*2, 344*b*3 and 344*b*4, each being parallel to respective one of the four gaps described above, are formed. As shown in FIG. 23, the roller escape passages 344*b*1, 344*b*2, 344*b*3 and 344*b*4 are connected to respective gaps described above at both ends of the roller escape passages 344*b*1, 344*b*2, 344*b*3 and 344*b*4. These forms circulating passages for the rollers 344*c*1, 344*c*2, 344*c*3 and 344*c*4 and the retainer 344*c*5 to circulate.

As the Z-axis carriage 344*b* moves along the Z-axis rail 344*a* in the Z-axis direction, the plurality of rollers 344*c*1, 344*c*2, 344*c*3 and 344*c*4 circulate in the respective circulating passages 344*b*1, 344*b*2, 344*b*3 and 344*b*4 along with the retainer 344*c*5. The Z-axis carriage 344*b* is supported by the plurality of rollers 344*c*1, 344*c*2, 344*c*3 and 344*c*4. Also, a resistance in the Z-axis direction is maintained low by the rolling of the plurality of rollers 344*c*1, 344*c*2, 344*c*3 and 344*c*4. As a result, the Z-axis carriage 344*b* can move smoothly along the Z-axis rail 344*a* even if large loads in directions different from the Z-axis direction act on the Z-axis linear guide 344.

Figure 24:
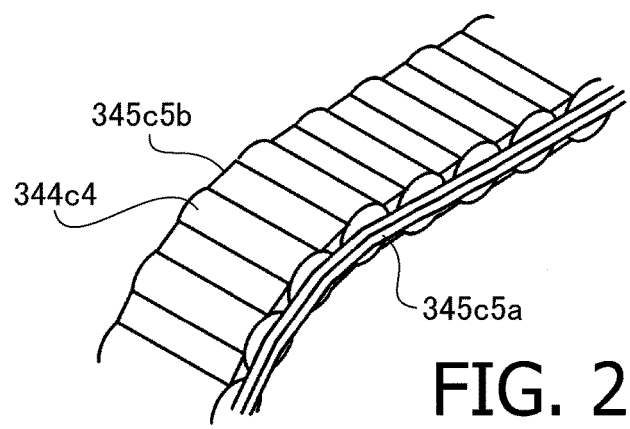
FIG. 24 is a diagram showing an arrangement relation between rollers and retainers of the linear guide.

FIG. 24 is a diagram showing a positional relationship between the rollers and the retainer 344*c*5. As shown in FIG. 24, the retainer 344*c*5 that couples a plurality of rollers (e.g., rollers 344*c*4) has a plurality of spacer parts 344*c*5*b* positioned between the rollers 344*c*4 and a pair of bands 344*c*5*a* that couples the plurality of spacer parts 344*cb*. Both ends of each spacer part 344*c*5*b* are fixed to the pair of bands 344*c*5*a* to form the ladder-like retainer 344*c*5. Each roller 344*c*4 is retained in a space surrounded by a pair of adjacent spacer parts 344*c*5*b* and the pair of bands 344*c*5*a*.

Also, by interposing the spacer parts 344*c*5*b* of the retainer 344*c*5 having low hardness between the rollers 344*c*4, oil film shortage and/or abrasion due to direct contacts between the rollers 344*c*4 with narrow contact surface area are prevented, friction resistance decreases and thus the product life is drastically extended.

The X-axis oscillating unit 100 and the Y-axis oscillating unit 200 also comprise the movable part support mechanisms 140 and 240. The movable part 120 (junction frame 124) of the X-axis oscillating unit 100 is supported by guide frames via X-axis linear guides from both sides in two directions (Y-axis direction and Z-axis direction) perpendicular to a drive direction (X-axis). Similarly, a movable part (junction frame) of the Y-axis oscillating unit 200 is supported by guide frames via Y-axis linear guides from both sides in two directions (Z-axis direction and X-axis direction) perpendicular to a drive direction (Y-axis). The X-axis oscillating unit 100 and the Y-axis oscillating unit 200 are both arranged such that axis directions of their movable parts are oriented in horizontal directions. Therefore, in a conventional oscillating unit that does not have the movable part support mechanism, a movable part is supported only with a rod in a cantilever manner and thus a tip side of the movable part (vibrating table 400 side) hangs down due to its own weight, and this causes frictions during driving and increases of unnecessary vibrations. In the present embodiment, since the X-axis oscillating unit 100 and the movable part of the Y-axis oscillating unit 200 are supported from below by the guide frames, such problems are solved.

Hereinafter, a configuration of the vibrating table 400 will be described. The vibrating table 400 (FIG. 8) comprises a top plate 401, a frame part 410 extending downwardly from a periphery of the top plate 401, a bottom part 402 to which the XY slider 360 is to be attached on a lower face thereof, and a honeycomb core part 420 interposed between the top plate 401, the frame part 410 and the bottom part 402, and has a honeycomb structure.

Figure 25:
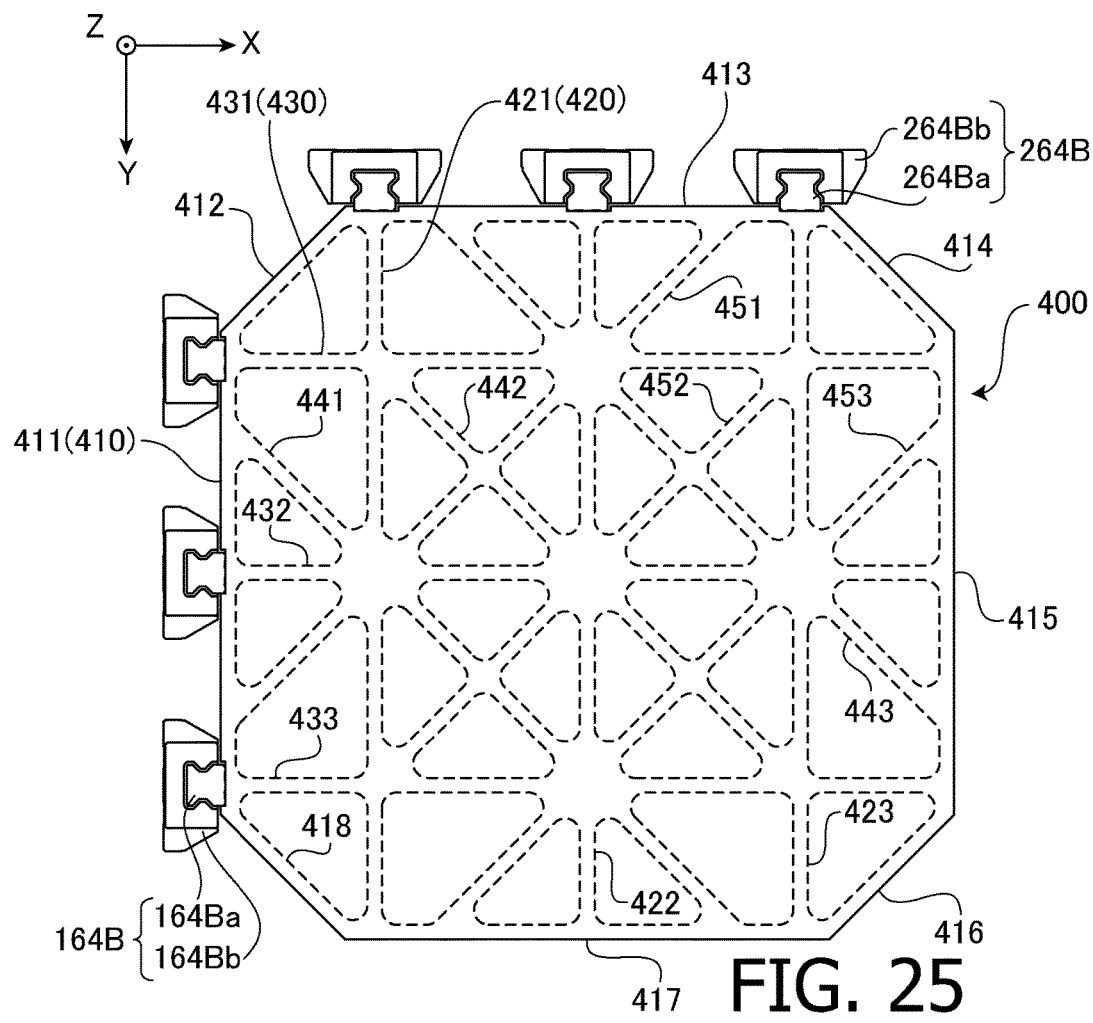
FIG. 25 is an enlarged plane view around a vibrating table.

FIG. 25 is an enlarged plane view around the vibrating table. As shown in FIG. 25, the top plate 401 is a plate member having a shape obtained by cutting four corners of a square off (a substantially hexagonal shape). The frame part 410 is a frame-like member formed by joining plate members to also have a shape obtained by cutting four corners of a square off. The frame part 410 has a pair of Y wall portions 411 and 415 extending in the Y-axis direction, a pair of X wall portions 413 and 417 extending in the X-axis direction, and four cut-off wall portions 412, 414, 416 and 418. The cut-off wall portion 412 couples an end of the Y wall portion 411 and an end of the X wall portion 413 together, the cut-off wall portion 414 couples the other end of the X wall portion 413 and an end of the Y wall portion 415 together, the cut-off wall portion 416 couples the other end of the Y wall portion 415 and an end of the X wall portion 417 together, and the cut-off wall portion 418 couples the other end of the X wall portion 417 and the other end of the Y wall portion 411 together.

Also, the vibrating table 400 comprises a plurality of ribs (421, 422, 423, 431, 432, 433, 441, 442, 443, 451, 452, 453) extending downwardly from a lower face of the top plate 401. The plurality of ribs are joined to have a honeycomb structure and configure the core part 420.

The pair of Y wall part 411 and 415 are coupled with each other by the three ribs 431, 432 and 433 extending in the X-axis direction. The rib 431 couples an end of the Y wall part 411 and an end of the Y wall part 415 together, the rib 433 couples the other end of the Y wall part 411 and the other end of the Y wall part 415 together, and the rib 432 couples a central portion of the Y wall part 411 and a central portion of the Y wall part 415 in the Y-axis direction together.

The pair of X wall part 413 and 417 are coupled with each other by the three ribs 421, 422 and 423 extending in the Y-axis direction. The rib 421 couples an end of the X wall part 413 and the other end of the X wall part 417 together, the rib 423 couples the other end of the X wall part 413 and one end of the X wall part 417 together, and the rib 422 couples a central portion of the X wall part 413 and a central portion of the X wall part 417 in the X-axis direction together.

Each of the ribs 441, 442 and 443 is arranged parallel to the cut-off wall portions 414 and 418 (i.e., by inclining 45 degrees with respect to the X-axis and the Y-axis). The rib 441 couples the Y wall part 413 and the X wall part 415 together, and the rib 443 couples the Y wall part 411 and the X wall part 417 together. Also, the rib 442 couples the coupling portion between the rib 421 and the rib 431 and the coupling portion between the rib 423 and the rib 433 together.

Each of the rib 451, 452 and 453 is arranged parallel to the cut-off wall portions 412 and 416 (i.e., by inclining 45 degrees with respect to the X-axis and the Y-axis). The rib 451 couples the Y wall part 411 and the X wall part 413 together, and the rib 453 couples the Y wall part 415 and the X wall part 417 together. Also, the rib 452 couples the coupling portion between the rib 421 and the rib 433 and the coupling portion between the rib 423 and the rib 431 together.

Due to the adoption of the honeycomb structure described above, the vibrating table 400 has high rigidity while being light in weight and thereby has a high resonance frequency, making it possible to be oscillated at high frequencies.

Also, as shown in FIG. 25, the vibrating table 400 has four times rotation symmetry. Therefore, vibration characteristic having less directionality is realized.

Also, as described above, the vibrating table 400 is formed in a shape obtained by cutting four corners of a square off. Due to the cutting off of the four corners that will not be used, weight reduction is realized. Also, due to the cutting off of the four corners that have relatively low rigidities and low resonance frequencies, increase in the rigidity and improvement in the resonance frequency is realized.

Also, as shown in FIG. 7 and FIG. 25, the three Z-axis rails 164Ba are fixed on planes extended from the ribs 431, 432 and 433 extending in the X-axis direction (specifically, at ends of the ribs 431, 432 and 433), respectively. Therefore, the three Z-axis rails 164Ba are supported with high rigidities in the X-axis direction in which the vibrating table 400 is to be oscillated.

Similarly, the three Z-axis rails 264Ba are fixed on planes extended from the ribs 421, 422 and 423 extending in the Y-axis direction (specifically, at ends of the ribs 421, 422 and 423), respectively. Therefore, the three Z-axis rails 264Ba are supported with high rigidities in the Y-axis direction in which the vibrating table 400 is to be oscillated.

As described above, the Z-axis rails 164Ba and 264Ba are attached to the high rigidity positions of the vibrating table 400. Therefore, the vibrating table 400 will not highly deform to generate loud noises especially in low frequency ranges even if the vibrating table 400 is oscillated via the Z-axis rails 164Ba and 264Ba.

Hereinafter, a structure for attaching the fixing part of each of the oscillating units to the device base 500 will be described.

As shown in FIGS. 4-6, the fixing part 310 of the Z-axis oscillating unit 300 is attached to a top face of the device base 500 via a pair of supporting units 350 (Fixing part support mechanism (Also referred to as floating mechanism or elastic support mechanism.) arranged on both sides of the Z-axis oscillating unit 300 in the X-axis direction. As shown in FIG. 6, each of the supporting unit 350 comprises a movable block 358, a pair of angles (fixing blocks) 352, and a pair of linear guides 354. The movable block 358 is a supporting member attached on a side face of the fixing part 310 of the Z-axis oscillating unit. The pair of angles 352 is arranged such that the angles 352 oppose to both side faces of the movable block 358 in the Y-axis direction, respectively, and is fixed on the top face of the device base 500. Both sides of the movable block 358 in the Y-axis direction and their respective angles 352 are coupled with each other slidably in the Z-axis direction by the linear guides 354.

The linear guide 354 comprises a rail 354a and a carriage 354b that engages with the rail 354a. On both sides of the movable block 358 in the Y-axis direction, the rails 354a are attached. Also, to each of the angles 352, the carriage 354b that engages with the opposing rail 354a is attached. Also, between the movable block 358 and the device base 500, a pair of air springs 356 is arranged side by side in the Y-axis direction, and the movable block 358 is supported by the device base 500 via the pair of air springs 356.

As described above, the fixing part 310 of the Z-axis oscillating unit 300 is elastically supported in the drive direction (Z-axis direction) with respect to the device base 500 by the supporting unit 350 comprising the linear guides 354 and the air springs 356, and thus a strong reaction force (oscillating force) in the Z-axis direction that acts on the fixing part 310 when the Z-axis oscillating unit 300 is driven is not transmitted directly to the device base 500 but especially high frequency components of the reaction force are attenuated drastically by the air springs 356. Therefore, vibration noises that are transmitted to the vibration table 400 from the Z-axis oscillating unit 300 via the device base 500 and the other oscillating units 100 and 200 reduce considerably.

As shown in FIGS. 7-9, the fixing part 110 of the horizontal actuator 100A is attached on the top face of the device base 500 via a pair of supporting units 150 arranged at both sides of the X-axis oscillating unit 100 in the Y-axis direction. Each of the supporting unit 150 comprises an inverse T-shaped fixing block 152 fixed on the top face of the device base 500, a substantially rectangular movable block 158 attached to a side face of the fixing part 110 of the X-axis oscillating unit 100, and a linear guide 154 that couples the fixing block 152 and the movable block 158 together slidably in the X-axis direction.

The movable block 158 is fixed to a side face of the fixing part 110 of the horizontal actuator 100A by bolts. On both side faces of the fixing part 110 in the Y-axis direction on which the movable blocks 158 are to be attached, curved faces 110a having cylindrical face shapes with the central axes parallel to the Z-axis and that dent inwardly are provided. Also, on a face of the movable block 158 that opposes to the fixing part 110, a curved face 158a that fits into the curved face 110a is formed. When the movable block 158 is attached to the side face of the fixing part 110, the curved face 110a of the fixing part 110 and the curved face 158 of the movable block 158 fit, and the fixing part 110 becomes unable to move with respect to the movable block 158 in the Z-axis direction. Also, by this fitting, movements of the fixing part 110 in the X-axis direction and the Y-axis direction and rotations of the fixing part 110 about the X-axis, Y-axis and Z-axis are restricted, and thus the fixing part 110 is securely retained by the movable block 158. Also, since this is an engagement structure of a concave surface (curved face 158a) and a convex surface (curved face 110a), gaps between the protruded structure and the recessed structure is less likely to occur as compared to an engagement structure of an angled protrusion (protruding portion 6158a) and an angled recess (angled groove 6110a) in the sixth embodiment which will be described later, and thus vibration noises due to chattering are less likely to occur.

The linear guide 154 comprises a rail 154a extending in the X-axis direction and attached on a top face of the fixing block 152 and a pair of carriages 154b attached on a lower face of the movable block 158 and that engage with the rail 154a. Also, on a side face of the fixing block 152 in the X-axis negative direction side, an L-shaped arm 152a extending upwardly is fixed. Between the movable block 158 and the arm 152a, a spring mechanism 156 is provided.

Figure 26:
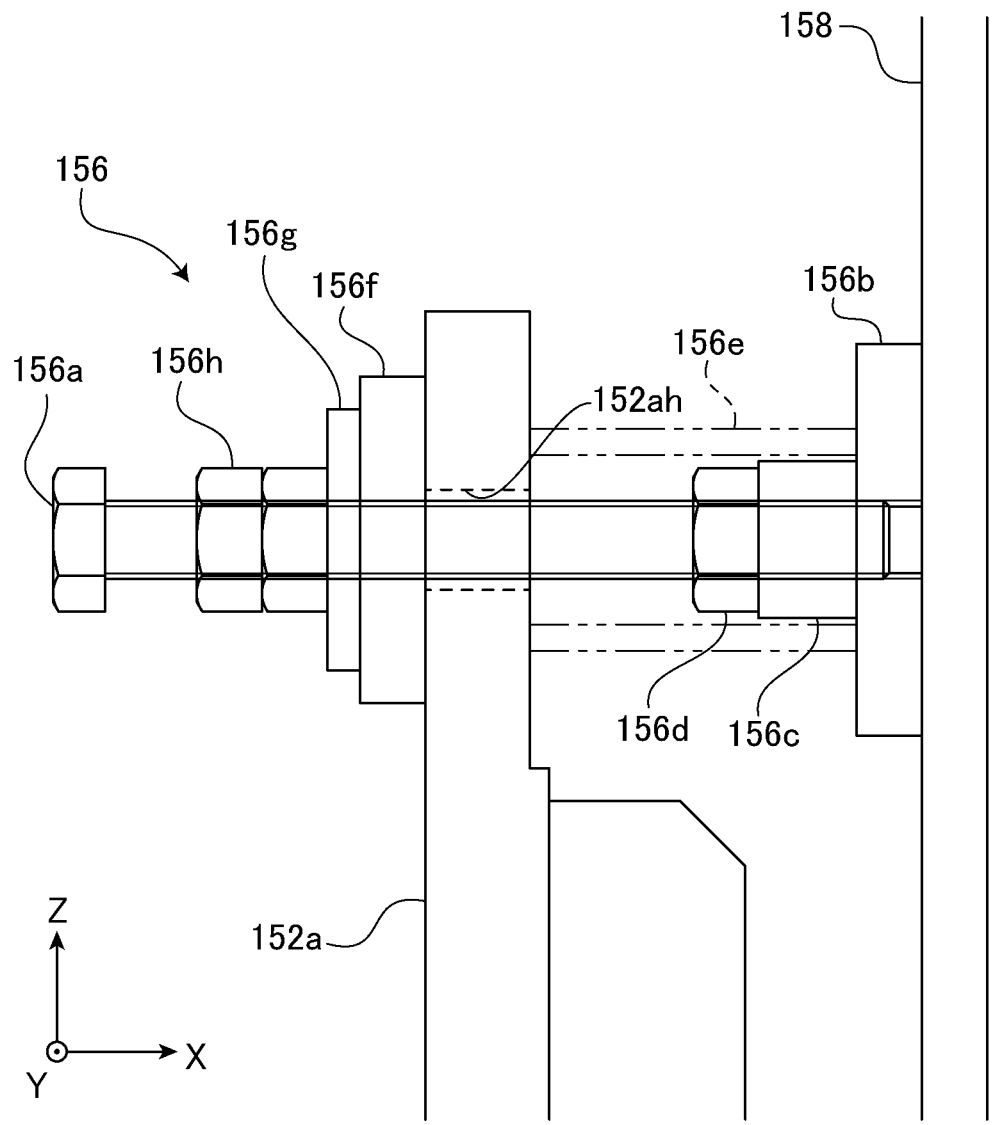
FIG. 26 is an enlarged view around a spring mechanism of a supporting unit of the X-axis oscillating unit.

FIG. 26 is an enlarged side view around the spring mechanism 156 of the supporting unit 150 (FIG. 8). The spring mechanism 156 comprises a bolt 156a, a fixing plate 156b, a ring 156c, a nut 156d, a coil spring 156e, a cushion plate 156f, a washer 156g and nuts 156h. On a top portion of the arm 152a of the fixing block 152, a through hole 152*ah* extending in the X-axis direction is provided, and the bolt 156*a* penetrates through this through hole 152*ah*. A tip of the bolt 156*a* is fixed to the movable block 158 via the fixing plate 156*b*. Also, a tip portion of the bolt 156*a* is inserted in the cylindrical ring 156*c*.

The ring 156*c* is fixed by nipping between the nut 156*d*, screwed to the bolt 156*a*, and the fixing plate 156*b*. Also, a tip side of the bolt 156*a* is inserted in the coil spring 156*e*. The coil spring 156*e* is retained by nipping between the fixing plate 156*b* and the arm 152*a*. Also, the ring 156*c* is fitted at a tip portion of the coil spring 156*e*, and the tip portion of the coil spring 156*e* is fixed to the movable block 158 via the ring 156*c*.

It is noted that the coil spring 156*e* is a cylindrical member (anti-vibration spring) in which a compression coil spring made of steel is embedded in a viscoelastic body (damper) such as acrylic resins. A coil spring may be used in place of the anti-vibration spring. Also, a separate damper (e.g., anti-vibration rubber or oil damper) may be provided serially or parallely with the coil spring.

At a head side of the bolt 156*a*, two nuts 156*h* are screwed and fixed. Also, the bolt 156*a* is inserted through through holes respectively provided to the cushion plate 156*f* and the washer 156*g*. The cushion plate 156*f* is nipped between the washer 156*g* (and two nuts 156*h*) and the arm 152*a*. The cushion plate 156*f* is, for example, formed of anti-vibration rubbers or resins such as polyurethane (i.e., rubbery elastic bodies and/or viscoelastic bodies).

A preload is applied to the coil spring 156*e*, and when no load is applied to the horizontal actuator 100A, the bolt 156*a* is pressed against the arm 152*a* (fixing block 152) via the nut 156*h*, the washer 156*g* and the cushion plate 156*f*. Therefore, the horizontal actuator 100A fixed to the movable block 158 is placed at a neutral position where restoring forces of the coil spring 156*e* and the cushion plate 156*f* balance. That is, the spring mechanism 156 is a type of neutral spring mechanism too.

When the X-axis oscillating unit 100 oscillates the vibrating table 400 in the X-axis positive direction, a reaction force is transmitted to the movable blocks 158 of the supporting units 150, and is further transmitted to the fixing blocks 152 (arms 152*a*) via the spring mechanisms 156 (coil springs 156*e*). Since the coil springs 156*e* hardly transmit vibration components other than its low resonance frequency, transmission of vibration noises from the X-axis oscillating unit 100 to the device base 500 is suppressed by the supporting units 150.

Also, when the X-axis oscillating unit 100 oscillates the vibrating table 400 in the X-axis negative direction, a reaction force is transmitted to the fixing blocks 152 (arms 152*a*) via the movable blocks 158 and the spring mechanisms 156 (cushion plates 156*f*) of the supporting units 150. Since the cushion plates 156*f* hardly transmit vibrations of high frequencies, transmission of vibration noises from the X-axis oscillating unit 100 to the device base 500 is suppressed by the supporting units 150.

It is noted that the reaction force in the X-axis positive direction is smaller than the reaction force in the X-axis negative direction. Therefore, in the present embodiment, a small and inexpensive cushion plate 156*f* is used as an elastic component that receives the reaction force in the X-axis positive direction. If the reaction force in the X-axis positive direction becomes large, a coil spring may be used in place of the cushion plate 156*f* to configure as the neutral spring mechanism 130.

Due to the above configuration, the fixing part 110 of the X-axis oscillating unit is supported softly and elastically with respect to the device base 500 in the drive direction (X-axis direction) by the supporting units 150 (fixing part support mechanism) each comprising the linear guide 154 and the spring mechanism 156, and thus a strong reaction force (oscillating force) in the X-axis direction that acts on the fixing unit 110 when the X-axis oscillating unit 100 is driven is not transmitted directly to the device base 500 but especially high frequency components of the reaction force are attenuated drastically by the spring mechanisms 156. Therefore, vibration noises that are transmitted from the X-axis oscillating unit 100 to the vibration table 400 are reduced considerably.

The Y-axis oscillating unit 200 also comprises the horizontal actuator 200A that has a configuration identical to that of the horizontal actuator 100A. The fixing part 210 of the horizontal actuator 200A is also supported elastically on the device base 500 in the Y-axis direction by a pair of supporting units 250 (FIG. 1). Since the supporting unit 250 has a configuration identical to that of the supporting unit 150 of the X-axis oscillating unit, redundant detailed descriptions thereof are herein omitted.

As described above, by adopting a configuration for elastically supporting each of the oscillating units 100, 200 and 300 with the respective supporting units 150, 250 and 350 comprising elastic components (air springs or spring mechanisms), transmission of especially high frequency components of vibrations (noises) between the oscillating units via the device base 500 is suppressed, and thus it becomes possible to oscillate with higher accuracy.

It is noted that, on the supporting unit 350 that supports the Z-axis oscillating unit, in addition to the dynamic load for oscillating the specimen and the vibrating table 400, weights (static loads) of the Z-axis oscillating unit 300, the vibrating table 400 and the specimen act. Therefore, the air spring 356 that is relatively small and capable of supporting a large load is adopted to the supporting unit 350. On the other hand, since the large static load does not act on the supporting unit 150 that supports the X-axis oscillating unit 100 and the supporting unit 250 that supports the Y-axis oscillating unit 200, a coil spring that is relatively small is adopted to the supporting unit 150 and the supporting unit 250.

Modified Examples

Figure 28:
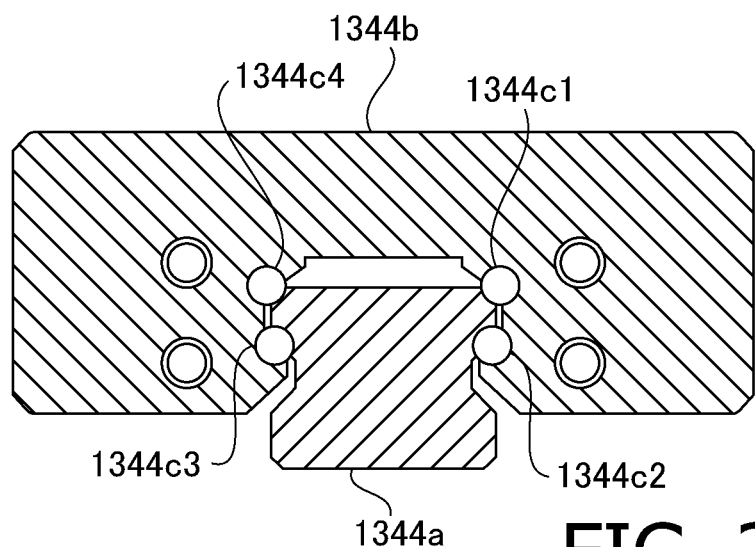
FIG. 28 is a cross sectional view of a ball bearing type linear guide.

In the above-described embodiment, a linear guide having a roller bearing mechanism that uses the rollers 344*c*2 as rolling bodies is used, but a linear guide having a roller bearing mechanism that uses other types of rolling bodies may be used. For example, as shown in the cross sectional view of FIG. 28, a linear guide 1344 having a ball bearing mechanism that uses balls 1344C1, 1344*c*2, 1344*c*3 and 1344*c*4 as rolling bodies interposed between a rail 1344*a* and a carriage 1344*b* may be used.

It is noted that, since the roller bearing mechanism in which the rolling bodies are in line contacts with the rail and the carriage has larger contact area than the ball bearing mechanism in which the rolling bodies are in point contacts with the rail and the carriage and thus provides higher rigidity, the roller bearing mechanism is distinctively advantageous in improving resonance frequencies. Therefore, it is preferable to use a roller bearing type linear guide, as with the above-described embodiment, if vibration tests are to be carried out in high frequency ranges. However, a roller bearing type linear guide need not be used to all the linear guides. For example, a roller bearing type linear guide may be used in the movable part support mechanism 340, the slide coupling mechanisms (YZ slider 160, ZX slider 260 and XY slider 360) and the like where moving amounts are relatively large, and a ball bearing type linear guide may be used in the fixing part support mechanisms (support unit 150, 250 and 350) and the like where moving amounts are relatively small. Also, if desired resonance frequency characteristics can be obtained, a ball bearing type linear guide may be used to a part or all of the linear guides.

Second Embodiment

Hereinafter, the second embodiment of the present invention will be described. The second embodiment differs from the above-described first embodiment in the configurations of the biaxial sliders (slide coupling mechanisms) and the shapes of the movable parts. In the following description of the second embodiment, differences between the first embodiment and the second embodiment will mainly be described, and descriptions of configurations that are common to those of the first embodiment are herein omitted.

Figure 29:
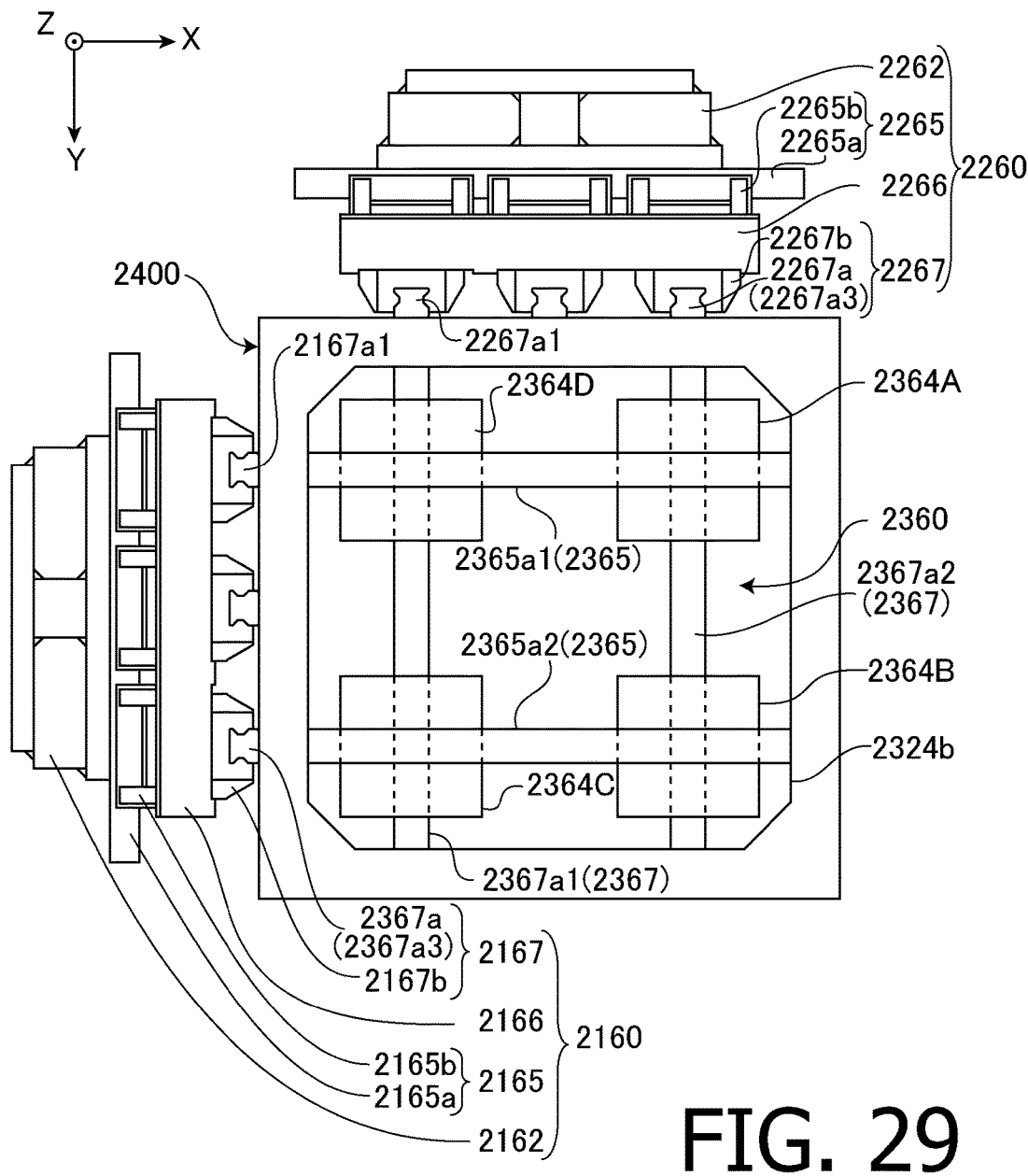
FIG. 29 is an enlarged plane view around a vibrating table of an oscillating device according to the second embodiment of the present invention.
Figure 30:
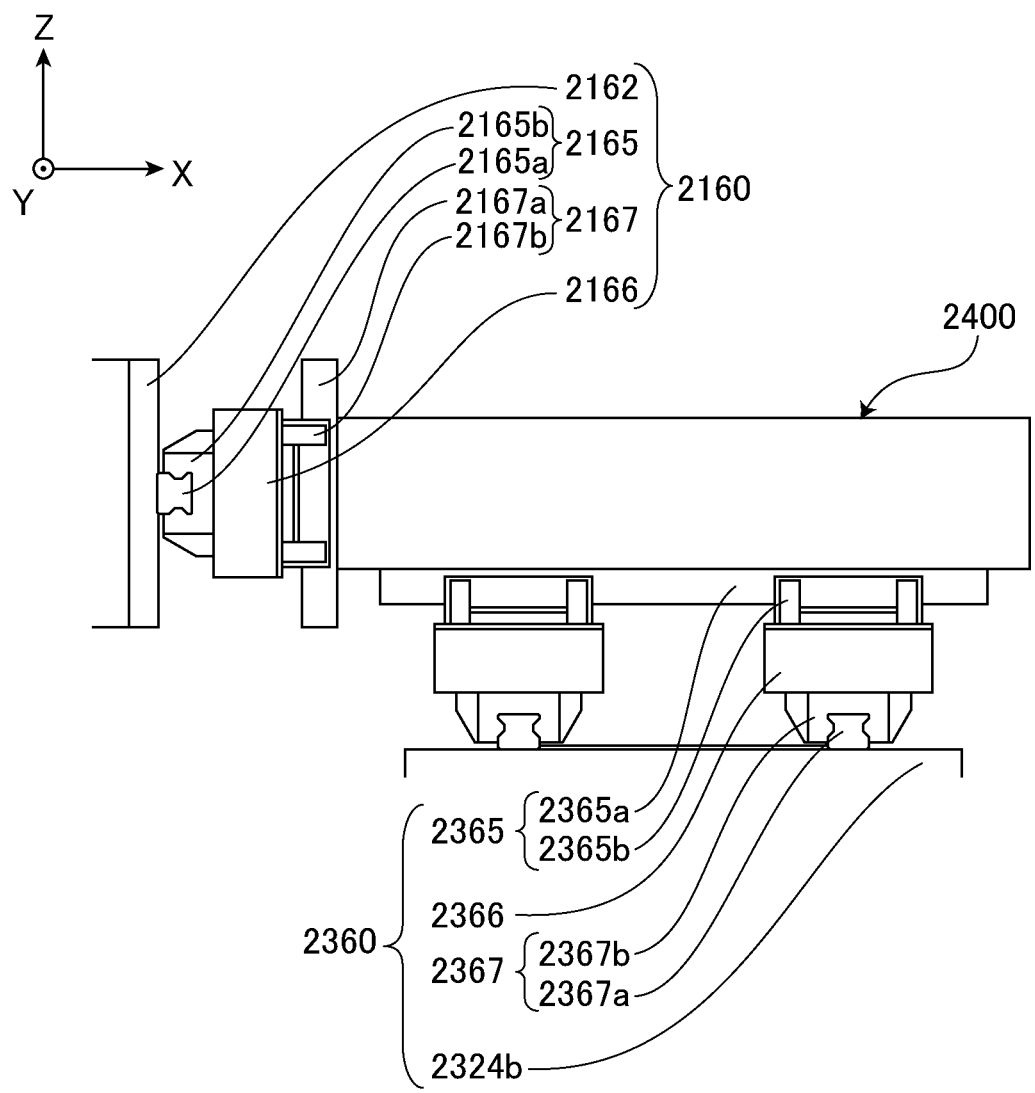
FIG. 30 is an enlarged side view around the vibrating table of the oscillating device according to the second embodiment of the present invention.

FIG. 29 and FIG. 30 are enlarged plane view and side view around the vibrating table 2400 of an oscillating device according to the second embodiment of the present invention, respectively.

In the first embodiment, the cross carriage is configured by coupling the carriage of the A-type linear guide to which the tapped attachment holes are formed and the carriage of the B-type linear guide to which the drilled attachment holes are formed only with the bolts. In contrast, in the second embodiment, a configuration in which carriages of two linear guides of which movable directions are different are coupled via a coupling plate (intermediary stage) is adopted. Since the configuration of the present embodiment has more members (coupling plate and bolts) as compared to the first embodiment, weight and assembly man-hour increase and oscillating performance decreases, but there is no need to use special linear guides (A-type and B-type linear guides) and thus commercially available general-purpose linear guides can be used.

As shown in FIG. 29 and FIG. 30, in a YZ slider 2160 of the oscillating device 2000, a Y-axis linear guide 2165 and three Z-axis linear guides 2167 are coupled via a coupling plate 2166. The Y-axis linear guide 2165 comprises one Y-axis rail 2165a that is fixed to a coupling arm 2162 and three Y-axis carriages 2165b that slidably engage with the Y-axis rail 2165a. The three Y-axis carriages 2165b are arranged at regular intervals in the Y-axis direction and fixed to the coupling plate 2166.

On the other hand, a Z-axis linear guide 2167 comprises one Z-axis rail 2167a and one Z-axis carriage 2167b. The Z-axis rails 2167a of three Z-axis linear guides 2167 are arranged at regular intervals in the Y-axis direction and fixed to a side face of the vibrating table 2400 opposing the YZ slider 2160. Also, each of the Z-axis carriages 2167b is fixed to the coupling plate 2166. The Y-axis carriages 2165b and the corresponding Z-axis carriages 2167b forming pairs are fixed at positions where they face to each other across the coupling plate 2166.

Similarly, as shown in FIG. 29, in a ZX slider 2260 of the oscillating device 2000, an X-axis linear guide 2265 and three Z-axis linear guides 2267 are coupled via a coupling plate 2266. The X-axis linear guide 2265 comprises one X-axis rail 2265a that is fixed to a coupling arm 2262 and three X-axis carriages 2265b that slidably engage with the X-axis rail 2265a. The three X-axis carriages 2265b are arranged at regular intervals in the X-axis direction and fixed to the coupling plate 2266.

On the other hand, a Z-axis linear guide 2267 comprises one Z-axis rail 2267a and one Z-axis carriage 2267b. The Z-axis rails 2267a of three Z-axis linear guides 2267 are arranged at regular intervals in the X-axis direction and fixed to a side face of the vibrating table 2400 opposing the ZX slider 2260. Also, each of the Z-axis carriages 2267b is fixed to the coupling plate 2266. The X-axis carriages 2265b and the corresponding Z-axis carriages 2267b forming pairs are fixed at positions where they face to each other across the coupling plate 2266.

Also, as shown in FIG. 29 and FIG. 30, in an XY slider 2360, two X-axis linear guides 2365 and two Y-axis linear guides 2367 are coupled via four coupling plates 2366.

Each X-axis linear guide 2365 comprises one X-axis rail 2365a that is fixed to a lower face of the vibrating table 2400 and two X-axis carriages 2365b that slidably engage with the X-axis rail 2365a.

Also, Each Y-axis linear guide 2367 comprises one Y-axis rail 2367a that is fixed on a top face of a top plate 2324b of a junction frame 2324 of the Z-axis oscillating unit and two Y-axis carriages 2367b that slidably couple with the Y-axis rail 2367a.

Each X-axis carriage 2365b is fixed to one Y-axis carriage 2367b via the coupling plate 2366. Specifically, one of the two X-axis carriages 2365b mounted to each X-axis rail 2365a couples with one of the Y-axis carriages 2367b that engages with one of the Y-axis rails 2367a, and the other of the two X-axis carriages 2365b couples with one of the Y-axis carriages 2367b that engages with the other of the Y-axis rails 2367a. That is, each X-axis rail 2365a is coupled to each Y-axis rail 2367a via the X-axis carriages 2365b and the Y-axis carriages 2367b being coupled by the coupling plate 2366. By this configuration, the vibrating table 2400 is coupled to the junction frame 2324 slidably in the X-axis direction and the Y-axis direction.

Also, as shown in FIG. 29, a Z-axis rail 2167a1 at an end of the YZ slider 2160 in the Y-axis negative direction and an X-axis rail 2365a1 at an end of the XY slider 2360 in the Y-axis negative direction are arranged on a same plane which is perpendicular to the Y-axis. Similarly, a Z-axis rail 2167a3 at an end of the YZ slider 2160 in the Y-axis positive direction and an X-axis rail 2365a2 at an end of the XY slider 2360 in the Y-axis positive direction are arranged on a same plane which is perpendicular to the Y-axis. In other words, two of the three Z-axis rails 2167a (2167a1 and 2167a3) at both ends of the YZ slider 2160 that apply forces to the vibrating table 2400 in the X-axis direction and the two X-axis rails 2365a (2365a1 and 2365a2) of the XY slider 2360 are arranged substantially on the same plane, respectively.

Since, by this configuration, torques around the Z-axis that act on each cross carriage 2364 (X-axis carriage 2365b and Y-axis carriage 2367b) of the XY slider 360 and strains that occurs on the Z-axis carriages 2167b of the YZ slider 2160 are reduced, accurate oscillation with less noises becomes possible and failure rates of the X-axis carriages 2365b, Y-axis carriages 2367b and Z-axis carriages 2167b decrease, thereby realizing an oscillating device with high durability.

Especially, in addition to making the Z-axis carriages 2167b not to be oscillated in the vertical direction by attaching the Z-axis rails 2167a at the side face of the vibrating table 2400, by arranging the Z-axis rails 2167a and the respective X-axis rails 2365a on the same plane so that the strains on the Z-axis carriages 2167b (torques around the Z-axis) do not occur, in synergy, the vibration noises reduce remarkably and failure rates of the Z-axis carriages 164b decrease considerably.

Also, the ZX slider 2260 is configured similarly to the YZ slider 2160. That is, a Z-axis rail 2267a1 at an end of the ZX slider 2260 in the X-axis negative direction and a Y-axis rail 2367a1 at an end of the XY slider 2360 in the X-axis negative direction are arranged on a same plane which is perpendicular to the X-axis. Similarly, a Z-axis rail 2267a3 at an end of the ZX slider 2260 in the X-axis positive direction and a Y-axis rail 2367a2 at an end of the XY slider 2360 in the X-axis positive direction are arranged on a same plane which is perpendicular to the X-axis.

By these configurations, a significant improvement in oscillating accuracy especially in high frequency ranges and a durability improvement are realized.

Figure 31:
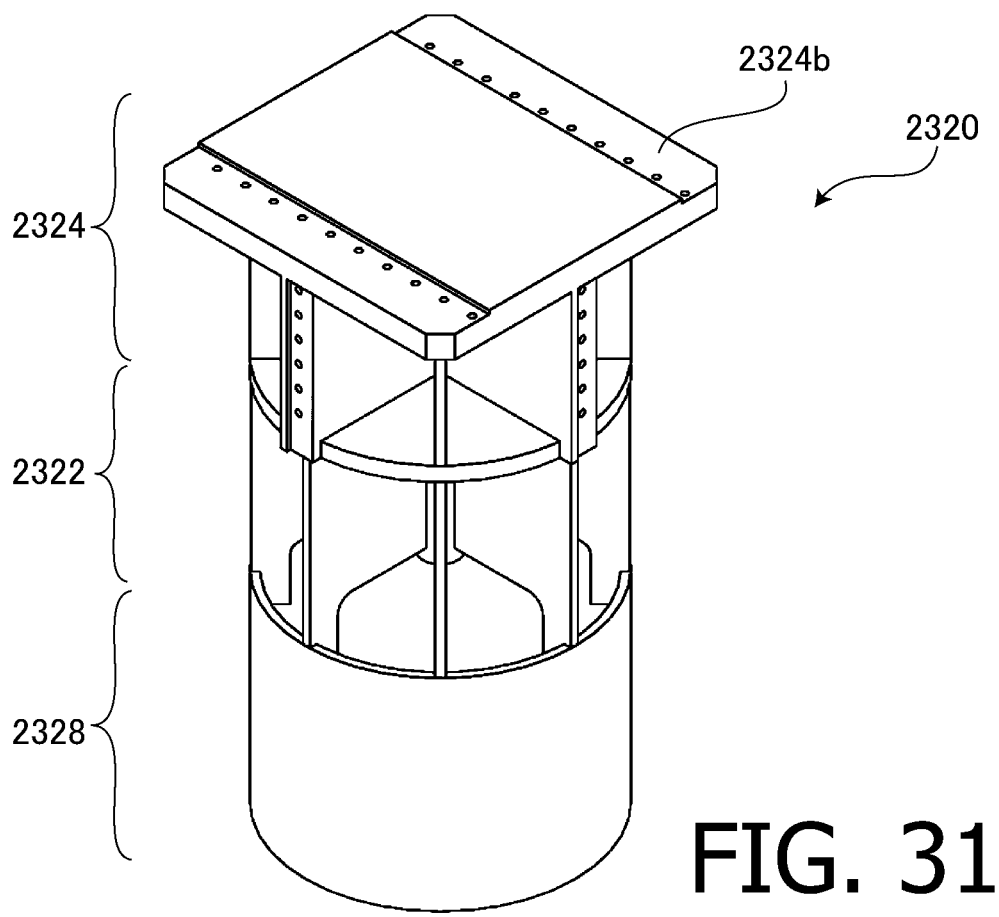
FIG. 31 is an external view of a movable part of a Z-axis oscillating unit according to the second embodiment of the present invention.
Figure 32:
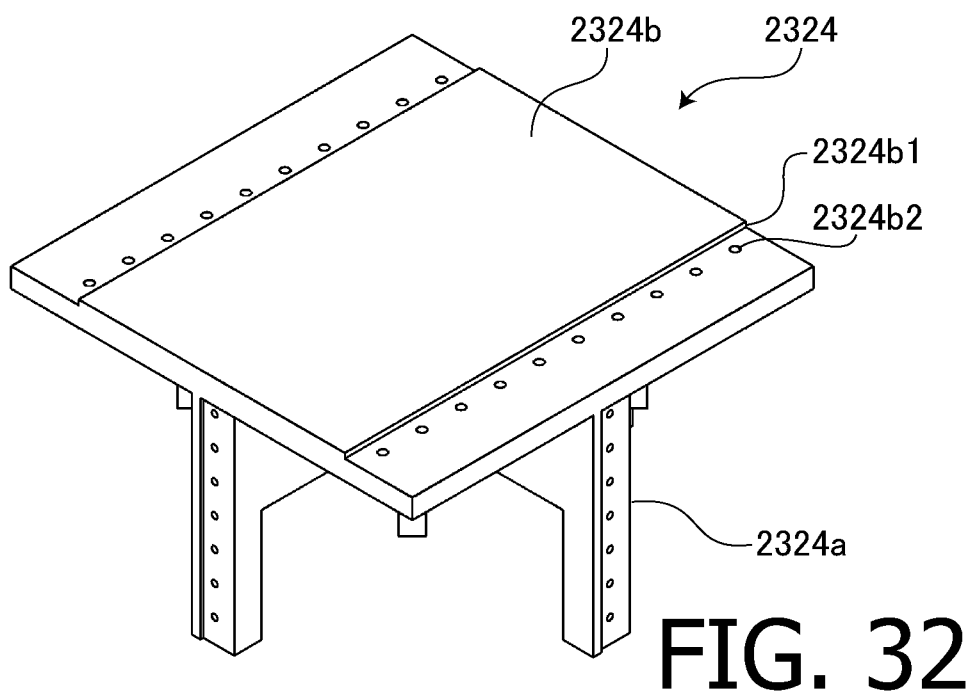
FIG. 32 is an external view of a junction frame according to the second embodiment of the present invention.

FIG. 31 is an external view of a movable part 2320 of the Z-axis oscillating unit. Also, FIG. 32 is an external view of the junction frame 2324. As shown in FIG. 32, the junction frame 2324 comprises a torso portion 2324a having substantially the same diameter as a main frame 2322 and a top plate 2324b horizontally attached to a top end of the torso portion 2324a. The top plate 2324b is a substantially rectangular plate member having a width (size in the X-axis direction) and a depth (size in the Y-axis direction) equal to or more than an outer diameter of the torso portion 2324a.

On a top face of the top plate 2324b of the junction frame 2324, a pair of steps 2324b1 extending in the Y-axis direction is formed, and a central portion in the X-axis direction of the top face of the top plate 2324b is elevated with respect to the peripheral portions. Along this pair of steps 2324b1, a pair of Y-axis rails 2367a is arranged. That is, the steps 2324b1 are positioning structures for attaching the Y-axis rails 2367a at accurate positions on the top plate 2324b. By providing the pair of steps 2324b1, it becomes possible to place the pair of Y-axis rails 2367 on the top plate 2324b with high parallelism only by simply attaching along the steps 2324b1.

Figure 33:
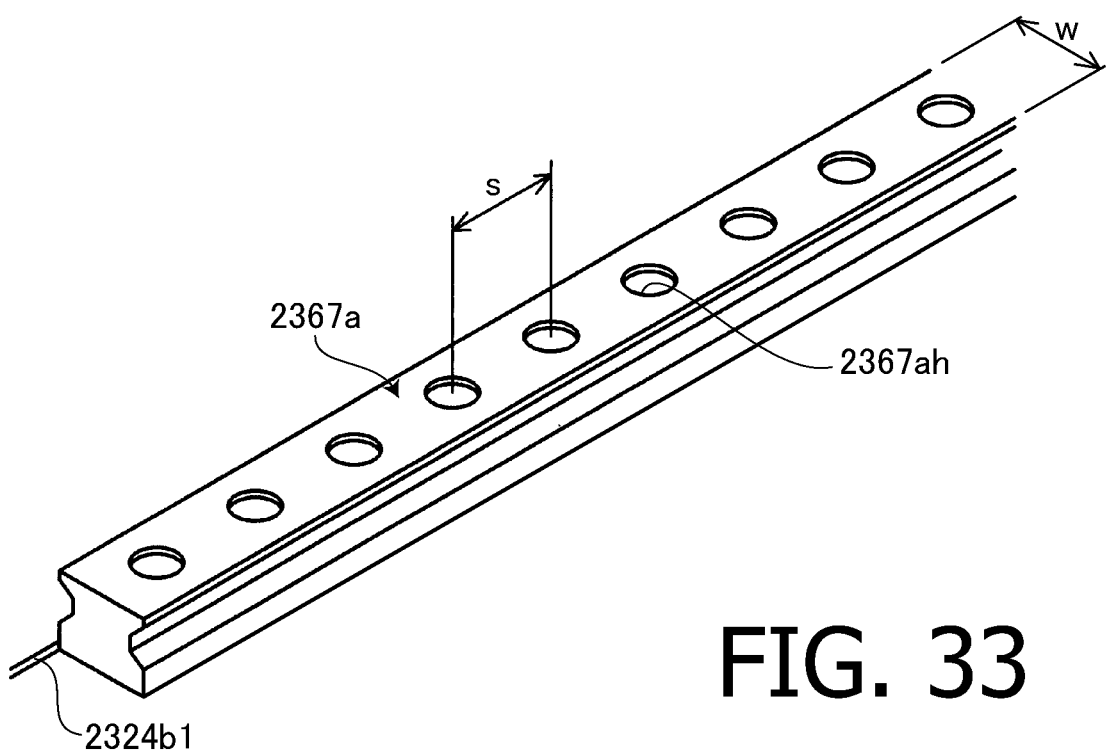
FIG. 33 is a perspective view of a Y-axis rail of an XY slider according to the second embodiment of the present invention.

FIG. 33 is a perspective view of the Y-axis rail 2367a of the XY slider 2360. As shown in FIG. 33, to the Y-axis rail 2367a, a plurality of through holes 2367ah arranged along the axis direction of the Y-axis rail 2367a are formed. The Y-axis rail 2367a is fixed to the top plate 2324b by inserting bolts to the through holes 2367ah and screwing them in tapped holes 2324b2 provided to the top plate 2324b of the junction frame 2324.

In the present embodiment, intervals s between the through holes 2367ah of the Y-axis rail 2367a (and intervals between bolt holes of the top plate) are equal to or less than twice a width W of the Y-axis rail 2367a (preferably, equal to or less than the width W; more preferably, 50-60% of the width W; and further preferably, 60-70% of the width W), which are shorter than general intervals. By shortening the Y-axis rail 2367a fixing intervals as described above, the Y-axis rail 2367a is firmly fixed to the top plate 2324b of the junction frame 2324 without warps.

It is noted that, in the above-described second embodiment, the Y-axis rails 2367a are fixed to the top plate 2324b of the junction frame 2324 and the X-axis rails 2365a are fixed to the vibrating table 2400 but, on the contrary, the cross carriage may be configured such that the Y-axis rails 2367a are fixed to the vibrating table 2400 and the X-axis rails 2365a are fixed to the movable part of the Z-axis oscillating unit.

Also, in the above-described second embodiment, the XY slider 2360 comprises two X-axis linear guides 2365 (X-axis rails 2365a) and two Y-axis linear guides 2367 (Y-axis rails 2367a), but the XY slider 2360 may be configured to comprise three or more of the X-axis rails 2365a and/or the Y-axis linear guides 2367. In this case, each X-axis rail 2365a and each Y-axis rail 2367a are coupled with each other via the cross carriages 2364 too. That is, n X-axis rails 2365a and m Y-axis rails 2367a are coupled with each other by n×m cross carriages 2364.

Third Embodiment

Hereinafter, the third embodiment of the present invention will be described. The third embodiment differs from the above-described second embodiment in the configurations of the YZ slider and the ZX slider. In the following description of the third embodiment, differences between the second embodiment and the third embodiment will mainly be described, and descriptions of configurations that are common to those of the second embodiment are herein omitted.

Figure 34:
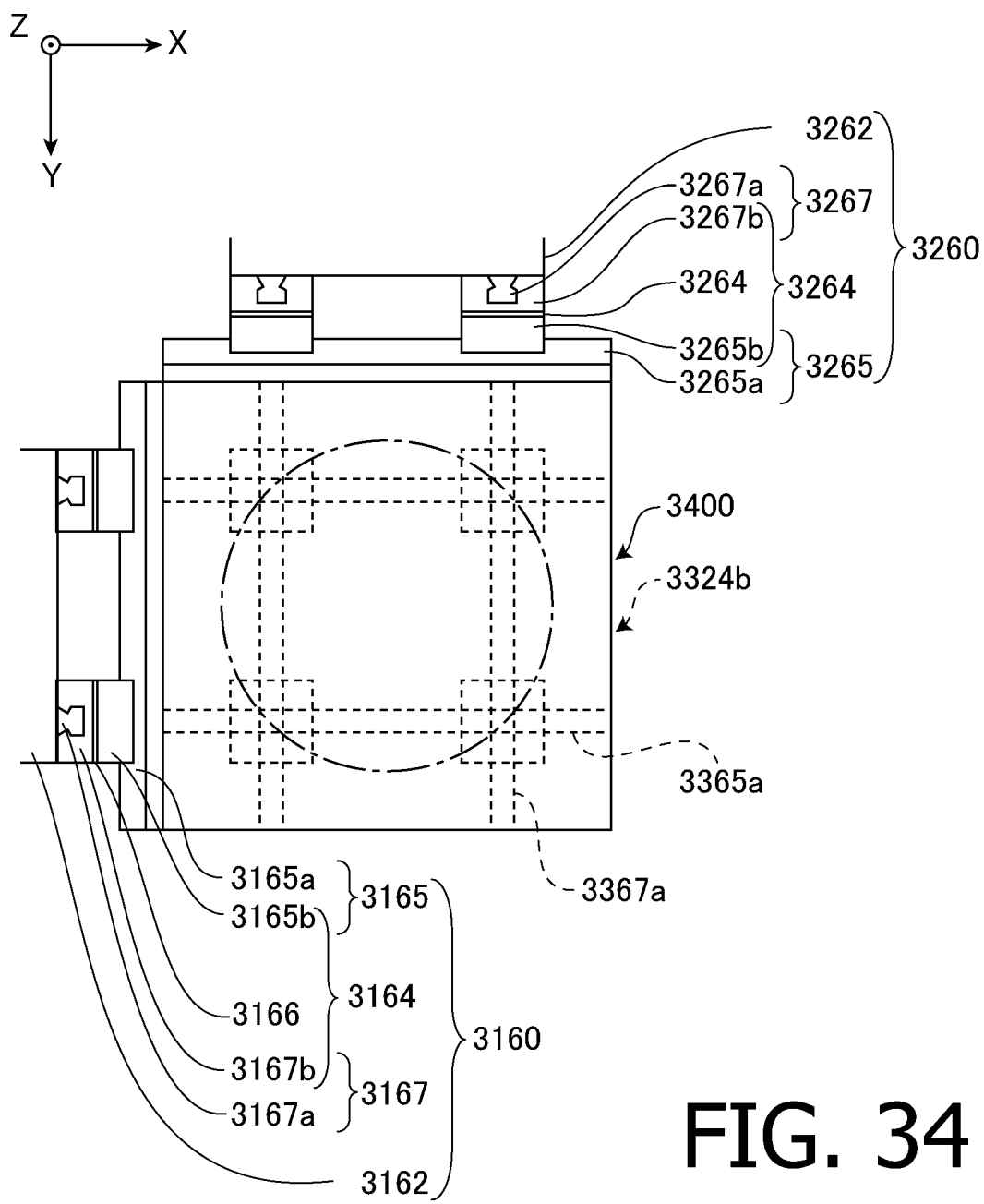
FIG. 34 is an enlarged plane view around a vibrating table of an oscillating device according to the third embodiment of the present invention.

FIG. 34 is an enlarged plane view around a vibrating table 3400 of an oscillating device according to the third embodiment of the present invention.

In the above-described second embodiment, the Z-axis rails 2167a and 2267a are fixed to the side faces of the vibrating table opposing the X-axis oscillating unit and the Y-axis oscillating unit, respectively. In contrast, in the third embodiment, Y-axis rails 3165a and X-axis rails 3265a are fixed to side faces of the vibrating table 3400 opposing the X-axis oscillating unit and the Y-axis oscillating unit, respectively. By adopting this configuration, even if a vibrating table having a thickness (size in the Z-axis direction) that is relatively thin is used, the Z-axis rails 2167 are prevented from protruding upwardly and downwardly from the top face and the lower face of the vibrating table 2400 as shown in FIG. 30, and thus flexibility for installing specimen on the vibrating table improves.

On the other hand, if, as with the second embodiment, the configuration in which the Z-axis rails 2167a and 2267a of the YZ slider 2160 and the ZX slider 2260 are attached to the vibrating table 2400 is adopted, the Z-axis carriages 2167b, the coupling plate 2166 and the X-axis carriages 2165b of the YZ slider 2160; and the Z-axis carriages 2267b, the coupling plate 2266 and the Y-axis carriages 2265b of the ZC slider 2260 will not be driven in the vertical direction, and thus vibration noises due to the vertical driving of these members will be suppressed.

Also, in the YZ slider 2160 (ZX slider 2260) of the above-described second embodiment, the plurality of Y-axis carriages 2165b (X-axis carriages 2265b) and the plurality of Z-axis carriages 2167b (2267b) are fixed to one large coupling plate 2166 (2266) to form one large-sized cross carriage 2164 (2264). In contrast, in a YZ slider 3160 (ZX slider 3260) of the third embodiment, one Y-axis carriage 3165b (X-axis carriage 3265b) and one Z-axis carriage 3167b (3267b) are fixed to one small coupling plate 3166 (3266) to form a small-sized cross carriage 3164 (3264), and Z-axis rails 3167a (3267a) and Y-axis rails 3165a (X-axis rails 3265a) are coupled with each other by a plurality of small-sized cross carriages 3164 (3264).

By downsizing and reducing weights of the cross carriages 3164 and 3264 as described above, it becomes easier to drive the cross carriages 3164 and 3264 in high speeds, and resonance frequencies of the cross carriages 3164 and 3264 can be raised to reduce vibration noises.

Also, in the third embodiment, a top plate 3324b of the movable part of the Z-axis oscillating unit is formed in substantially the same plane dimensions as (or equal to or larger than) the vibrating table 3400. Therefore, even if a length of a Y-axis rail 3367a (X-axis rail 3365a) to be attached on a top face of the top plate 3324b is extended up to a length that is substantially the same as (or equal to or more than) the entire width of the vibrating table 3400 in the Y-axis direction (X-axis direction), the Y-axis rail 3367a (X-axis rail 3365a) can be supported from below in its entire length by the top plate 3324b, and thus it is possible to always support the vibrating table 3400 with high rigidity.

Fourth Embodiment

Hereinafter, the fourth embodiment of the present invention will be described. The fourth embodiment differs from the above-described second embodiment in a YZ slider 4160 and a ZX slider 4260 being biaxial sliders (slide coupling mechanisms). In the following description of the fourth embodiment, differences between the second embodiment and the fourth embodiment will mainly be described, and descriptions of configurations that are common to those of the second embodiment are herein omitted. Also, since the ZX slider 4260 has a configuration common to that of the YZ slider 4160, specific description of the ZX slider 4260 is herein omitted.

Figure 35:
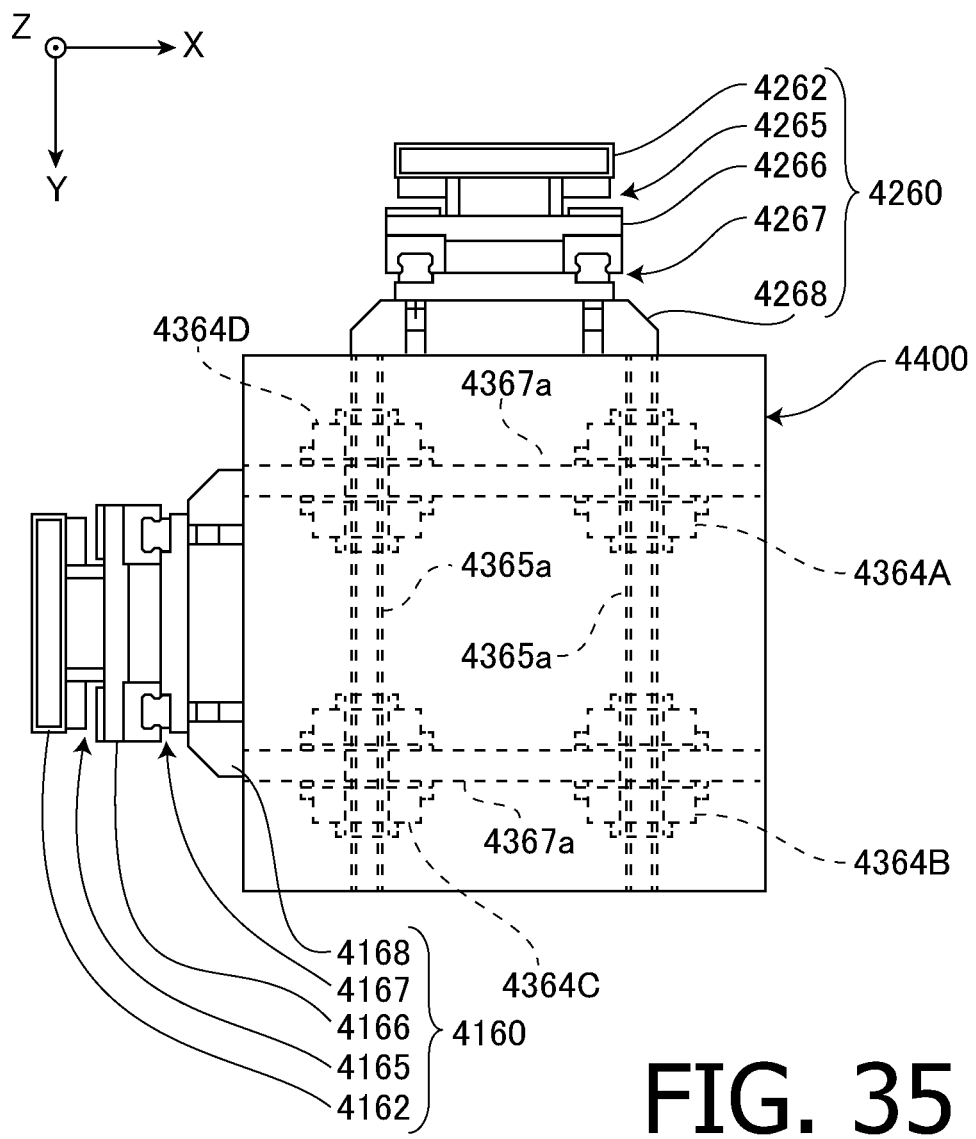
FIG. 35 is an enlarged plane view around a vibrating table of an oscillating device according to the fourth embodiment of the present invention.
Figure 36:
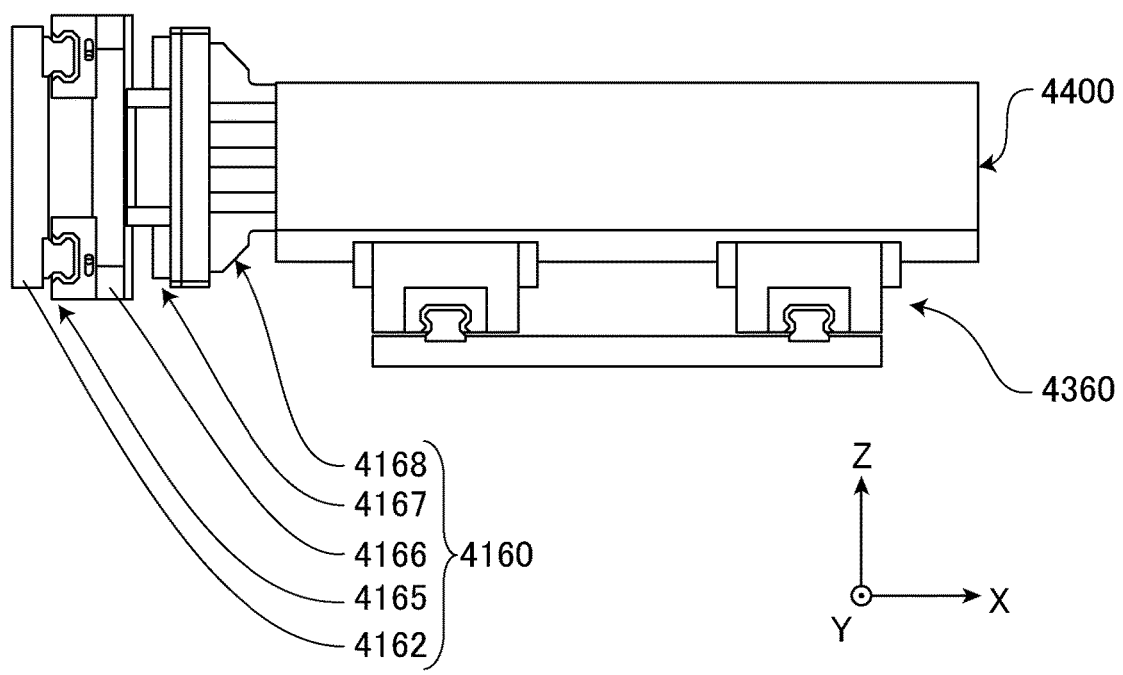
FIG. 36 is an enlarged side view around the vibrating table of the oscillating device according to the fourth embodiment of the present invention.

FIG. 35 and FIG. 36 are enlarged plane view and side view around a vibrating table 4400 of an oscillating device according to the fourth embodiment of the present invention, respectively.

The YZ slider 4160 of the fourth embodiment comprises two Y-axis linear guides 4165, two Z-axis linear guides 4167, and a coupling plate 4166 for coupling the two Y-axis linear guides 4165 and the two Z-axis linear guides 4167 together. Also, in the fourth embodiment, Z-axis rails 4167a of the YZ slider 4160 are not directly fixed to the vibrating table 4400 but are fixed to the vibrating table 4400 via a junction arm 4168.

A thickness (size in the Z-axis direction) of the junction arm 4168 is substantially the same as a thickness of the vibrating table 4400 at a vibrating table 4400 side, but is expanded to substantially the same size as a length of the Z-axis linear guides 4167 at a Z-axis linear guide 4167 side. Due to this configuration, a rail of the Z-axis linear guide 4167 is supported in its entire length by the junction arm 4168.

A width (size in Y-axis direction) of the junction arm 4168 is substantially the same size as an arrangement interval of the two Z-axis linear guides 4167 at a Z-axis linear guide 4167 side, but is extended up to substantially the same size as an arrangement interval of two X-axis rails 4367a of the XY slider. In other words, the YZ slider 4160 is downsized and reduced in weight by making the arrangement interval of the Z-axis linear guides 4167 narrower than the arrangement interval of the X-axis rails 4367a. Furthermore, by the use of the junction arm 4168, a fixed distance is kept between rails of the Z-axis linear guides 4167 and the vibrating table 4400, and thus flexibility for installing specimen on the vibrating table improves.

Fifth Embodiment

Hereinafter, the fifth embodiment of the present invention will be described. The fifth embodiment is an example of a uniaxial oscillating device comprising only one oscillating unit (Z-axis oscillating unit 5300). In the following description of the fifth embodiment, differences between the first embodiment and the fifth embodiment will mainly be described, and descriptions of configurations that are common to those of the first embodiment are herein omitted.

Figure 37:
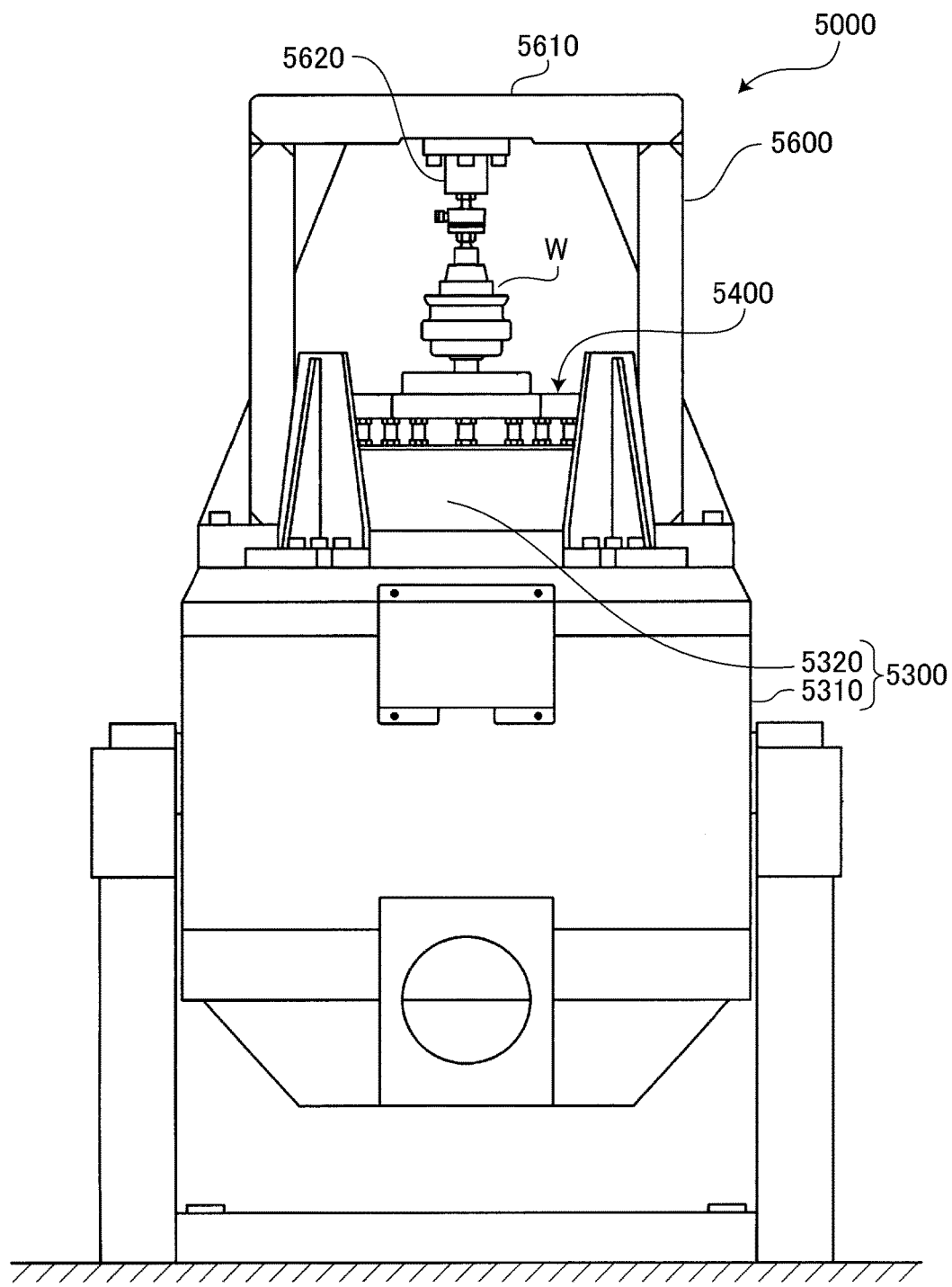
FIG. 37 is a side view of an oscillating device according to the fifth embodiment of the present invention.
Figure 38:
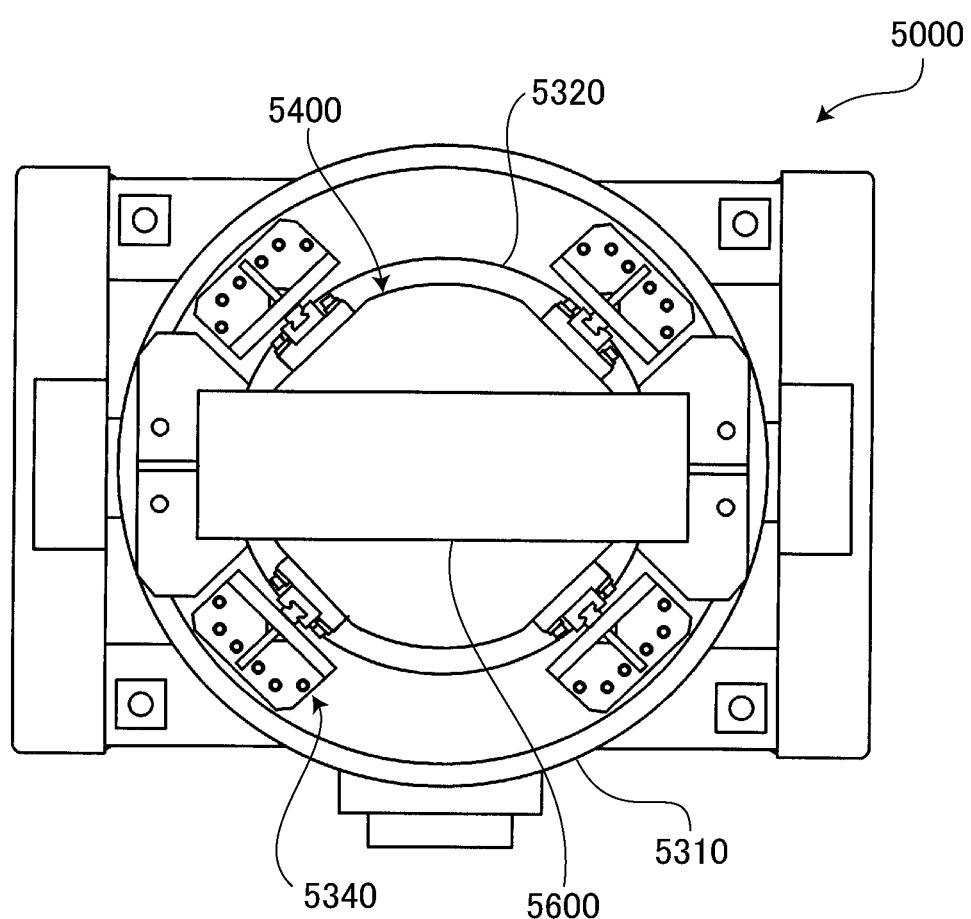
FIG. 38 is a side view of the oscillating device according to the fifth embodiment of the present invention.

FIG. 37 and FIG. 38 are side view and plane view of an oscillating device 5000 according to the fifth embodiment of the present invention, respectively.

Since the fifth embodiment oscillates only in one axis direction, a vibrating table 5400 is attached directly on a top face of a movable part 5320 of a Z-axis oscillating unit 5300 without interposing an XY slider therebetween.

Also, four movable part support mechanisms 5340 do not support the movable part 5320 of the Z-axis oscillating unit 5300 but directly support the vibrating table 5400. Therefore, vibration noises of the vibrating table in the Y-axis direction and the X-axis direction can be suppressed effectively.

Also, the oscillating device 5000 comprises a portal compressing frame 5600 for pressing a specimen W against the vibrating table 5400 from above. The compressing frame 5600 is fixed on a top face of a fixing part (cylindrical body) of the Z-axis oscillating unit 5300. Also, at a lower face of a bridge part 5610 of the compressing frame 5600, a chuck device 5620 for fixing the specimen W is provided. The chuck device 5620 comprises a load cell (or a piezoelectric load sensor) for detecting force acting on the specimen W in the Z-axis direction.

By the actuation of the air spring 356 (FIG. 12) of the Z-axis oscillating unit 5300, the specimen W is nipped between the vibrating table 5400 and the compressing frame 5600, and a predetermined static load is applied to the specimen W. That is, with the oscillating device 5000 of the fifth embodiment, it is possible to perform tests in which the specimen W is oscillated while applying a predetermined static load to the specimen W.

Sixth Embodiment

Hereinafter, the sixth embodiment of the present invention will be described. The sixth embodiment is an example of a biaxial oscillating device comprising two oscillating units (X-axis oscillating unit 6100 and Z-axis oscillating unit 6300). In the following description of the sixth embodiment, differences between the first embodiment and the sixth embodiment will mainly be described, and descriptions of configurations that are common to those of the first embodiment are herein omitted.

Figure 39:
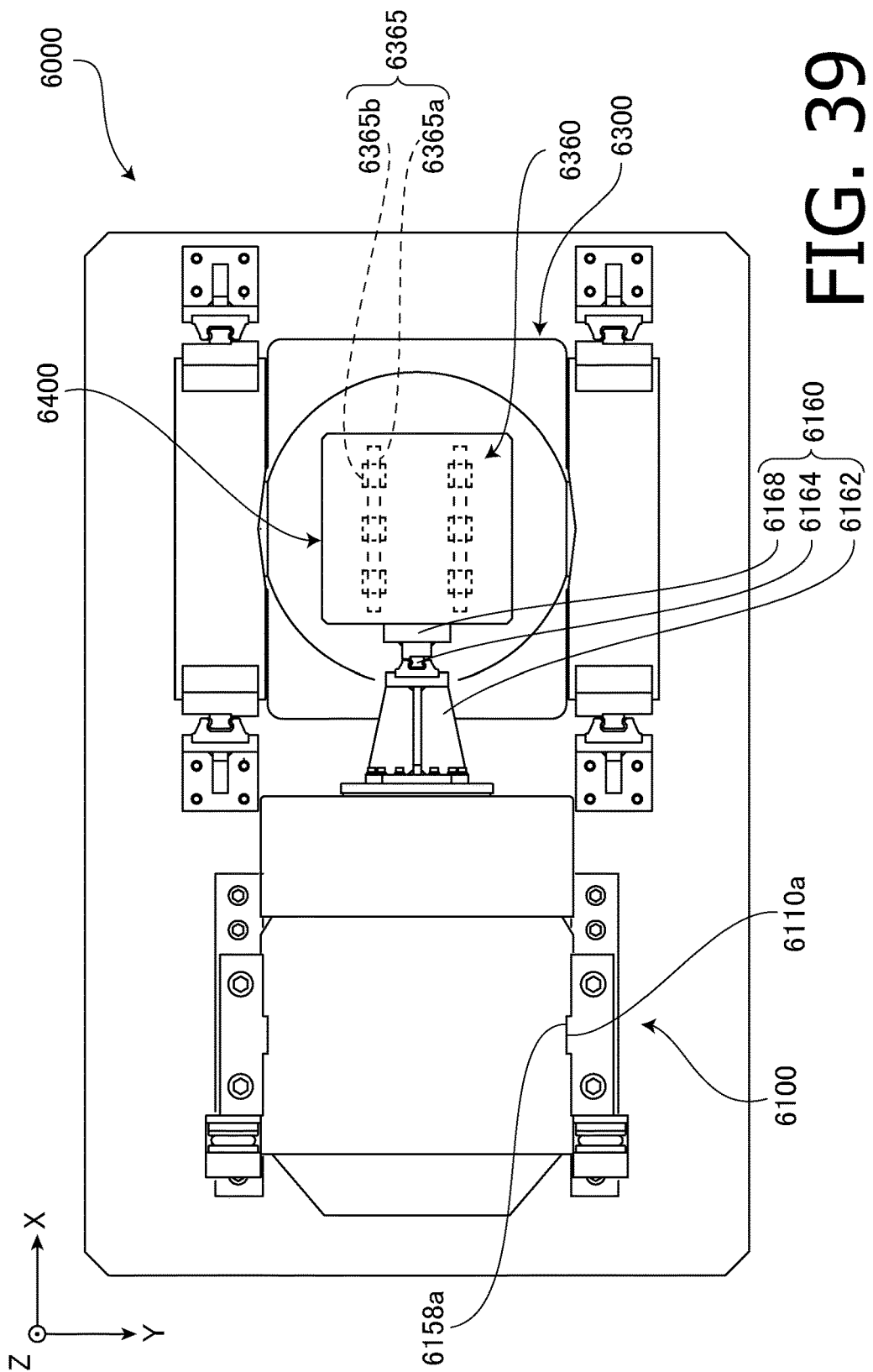
FIG. 39 is a plane view of an oscillating device according to the sixth embodiment of the present invention.

FIG. 39 and FIG. 40 are plane view and side view of an oscillating device 6000 according to the sixth embodiment of the present invention, respectively.

In the sixth embodiment, a vibrating table 6400 is oscillated in two directions (a drive direction of an oscillating unit and another direction perpendicular the drive direction). Therefore, each of the oscillating units 6100 and 6300 and the vibrating table 6400 are coupled with each other slidably in the drive directions of the other oscillating units 6300 and 6100. Specifically, the X-axis oscillating unit 6100 and the vibrating table 6400 are coupled by a Z-axis slider 6160 slidably in the Z-axis direction, and the Z-axis oscillating unit 6300 and the vibrating table 6400 are coupled by an X-axis slider 6360 slidably in the X-axis direction.

The Z-axis slider 6160 comprises a Z-axis linear guide 6164 and a coupling arm 6162 that couples the Z-axis linear guide 6164 and a movable part of the X-axis oscillating unit 6100. The Z-axis linear guide 6164 comprises one Z-axis rail to which one Z-axis carriage is mounted. Also, the Z-axis carriage is fixed to the coupling arm 6162, and the Z-axis rail is fixed to a side face of the vibrating table 6400 via a junction arm 6168.

The X-axis slider 6360 comprises two X-axis linear guides 6365. Each X-axis linear guide 6365 comprises one X-axis rail to which three X-axis carriages are mounted.

A fixing part of the X-axis oscillating unit 6100 is fixed to a device base 6500 via supporting units 6150. Also, a fixing part of the Z-axis oscillating unit 6300 is fixed to the device base 6500 via supporting units 6350.

The supporting unit 6350 has a configuration substantially identical to that of the supporting unit 350 of the first embodiment. On the other hand, differently from the supporting unit 150 of the first embodiment, the supporting unit 6150 comprises, in place of the spring mechanisms 156, two air springs 6156 arranged in the Z-axis direction.

In the X-axis oscillating unit 6100, angled grooves 6110a are formed on both side faces in the Y-axis direction of a fixing part of a horizontal actuator. Also, to a movable block of the supporting unit, a protruding portion 6158a that fits with the angled groove 6110a is formed. By the fitting of the angled grooves 6110a and the protruding portions 6158a, the fixing part of the X-axis oscillating unit 6100 is made not to move with respect to the movable blocks of the supporting units in the X-axis direction.

These are the descriptions of exemplary embodiments of the present invention. Embodiments of the present invention are not limited to the above-described embodiments, and various modifications are possible within a range of the technical ideas expressed by the descriptions in the scope of claims. For example, configurations of embodiments and the like explicitly illustrated in this specification and/or configurations in which configurations of embodiments and the like that are obvious to a person with ordinary skills in the art from this specification are combined accordingly are also included in the embodiments of this application.

Each of the above described embodiments is an example in which the present invention is applied to an electrodynamic oscillating device, but the present invention is not limited to this configuration and can be applied to oscillating devices which use other types of oscillating units (e.g., linear motion oscillating unit in which a rotary electric motor or a hydraulic rotary motor and a rotation/linear motion conversion mechanism such as a feed screw mechanism are combined, or a linear motor).

For example, the oscillating device 1 of the first embodiment is an example in which the present invention is applied to a triaxial electrodynamic oscillating device, but the present invention can naturally be applied to uniaxial and biaxial electrodynamic oscillating devices.

Also, in the first embodiment, an air spring is used as a cushion part for attenuating vibration of the supporting unit 350 (fixing part support mechanism), but configurations that use other types of springs that have vibration prevention effects (e.g., a coil spring made of steel) or elastic bodies (such as a vibration prevention rubber) are also possible.

The number of linear guides (one, two, three, four, or five or more) for each axis and their arrangements in a slide coupling mechanism are selected accordingly in accordance with a size of a vibrating table, a size and weight distribution of a specimen, test conditions (frequency and amplitude) and the like. Also, the number of cross guides 364 the XY slider 360 of the first embodiment comprises is not limited to four but five, six, seven, eight, nine or more cross guides 364 may be provided in accordance with a size of a vibrating table, a weight of a specimen, test conditions and the like.

Also, the uniaxial oscillating device of the fifth embodiment comprises the compressing frame 5600 but may be configured not to comprise the compressing frame 5600. Also, a compressing frame may be provided to biaxial and triaxial oscillating devices. In this case, the compressing frame is, for example, fixed to the device base.

What is claimed is:

1. An oscillating device, comprising:
   a vibrating table;
   an X-axis oscillating unit configured to oscillate the vibrating table in an X-axis direction;
   a Y-axis oscillating unit configured to oscillate the vibrating table in a Y-axis direction;
   a Z-axis oscillating unit configured to oscillate the vibrating table in a Z-axis direction; and
   a plurality of XY sliders configured to couple the vibrating table and the Z-axis oscillating unit slidably both in the X-axis direction and the Y-axis direction, each of the XY sliders comprising:
      a first linear guideway configured to couple the vibrating table and the Z-axis oscillating unit slidably in the X-axis direction; and
      a second linear guideway configured to couple the vibrating table and the Z-axis oscillating unit slidably in the Y-axis direction,
   wherein the first linear guideway comprises:
      a first rail extending in the X-axis direction; and
      a first carriage configured to engage with the first rail slidably in the X-axis direction,
   wherein the second linear guideway comprises:
      a second rail extending in the Y-axis direction; and
      a second carriage configured to engage with the second rail slidably in the Y-axis direction, and
   wherein two of the XY sliders being adjacent to each other are arranged while orienting their orientations in the Z-axis direction opposite to each other.

2. The oscillating device according to claim 1,
   wherein one of the two of the XY sliders being adjacent to each other is arranged while facing the first linear guideway toward the vibrating table, and
   wherein the other of the two of the XY sliders being adjacent to each other is arranged while facing the second linear guideway toward the vibrating table.

3. The oscillating device according to claim 1,
   wherein in one of the two of the XY sliders being adjacent to each other, the second linear guideway is coupled to the vibrating table via the first linear guideway, and
   wherein in the other of the two of the XY sliders being adjacent to each other, the first linear guideway is coupled to the vibrating table via the second linear guideway.

4. The oscillating device according to claim 1,
   wherein the plurality of XY sliders are arranged on a plane perpendicular to the Z-axis direction.

5. The oscillating device according to claim 1,
   comprising four XY sliders arranged at respective apexes of a rectangle being perpendicular to the Z-axis direction.

6. The oscillating device according to claim 1,
   wherein the plurality of XY sliders are arranged in two directions perpendicular to the Z-axis direction while alternatingly changing their orientations in the Z-axis direction.

7. The oscillating device according to claim 1,
   wherein the first carriage is provided with first carriage attachment holes being drilled holes,
   wherein the second carriage is provided with second carriage attachment holes being tapped holes, and wherein the first carriage is directly fixed to the second carriage by bolts being inserted to the first carriage attachment holes and screwed in the second carriage attachment holes.

8. The oscillating device according to claim 1,
wherein the first carriage is provided with four first carriage attachment holes extending in the Z-axis direction,
wherein the second carriage is provided with four second carriage attachment holes extending in the Z-axis direction, and
wherein center lines of the four first carriage attachment holes and center lines of the four second carriage attachment holes touch respective corners of a predetermined square on the XY plane.

9. The oscillating device according to claim 1,
wherein the first linear guideway comprises rollers being rolling bodies nipped between the first rail and the first carriage.

10. The oscillating device according to claim 1,
wherein U-shaped notches being notches that have U-shapes when viewed from the Z-axis direction are formed at a center in the Y-axis direction of both sides in the X-axis direction of the second carriage,
wherein L-shaped notches being notches that have L-shapes when viewed from the Z-axis direction are formed at both ends in the Y-axis direction of both sides in the X-axis direction of the second carriage,
wherein the second carriage has flange portions between the U-shaped notches and the L-shaped notches,
wherein the second carriage attachment holes are formed on the flange portions,
wherein the second carriage comprises:
a third portion which has a substantially cuboidal shape with side faces being perpendicular to the X-axis, Y-axis and Z-axis, respectively, and to which a second groove extending in the Y-axis direction and configured to engage with the second rail is formed on one of the side faces perpendicular to the Z-axis; and
a fourth portion which has a substantially rectangular plate-like shape with edges being parallel to the X-axis and the Y-axis and is fixed to the other of the side faces perpendicular to the Z-axis of the third portion,
wherein both end portions of the fourth portion in the X-axis direction protrude more outward in the X-axis direction than both side faces of the third portion in the X-axis direction to form the flange portions,
wherein both end portions of the third portion in the Y-axis direction protrude more outward in the Y-axis direction than both side faces of the fourth portion in the Y-axis direction,
wherein the U-shaped notches are formed to the fourth portion, and
wherein the L-shaped notches are formed by the flange portions and the end portions of the third portion protruding outward in the Y-axis direction.

11. The oscillating device according to claim 1,
wherein U-shaped notches being notches that have U-shapes when viewed from the Z-axis direction are formed at a center in the X-axis direction of both ends in the Y-axis direction of the first carriage.

12. The oscillating device according to claim 11,
wherein L-shaped notches being notches that have L-shapes when viewed from the Z-axis direction are formed at both ends in the X-axis direction of both ends in the Y-axis direction of the first carriage.

13. The oscillating device according to claim 12,
wherein the first carriage has flange portions between the U-shaped notches and the L-shaped notches of the first carriage at both ends in the Y-axis direction, and
wherein the first carriage attachment holes are formed on the flange portions of the first carriage.

14. The oscillating device according to claim 13,
wherein the first carriage comprises:
a first portion which has a substantially cuboidal shape with side faces being perpendicular to the X-axis, the Y-axis and the Z-axis, respectively, and to which a first groove extending in the X-axis direction and configured to engage with the first rail is formed on one of the side faces perpendicular to the Z-axis; and
a second portion which has a substantially rectangular plate-like shape with edges being parallel to the X-axis and the Y-axis and is fixed to the other of the side faces perpendicular to the Z-axis of the first portion,
wherein both end portions of the second portion in the Y-axis direction protrude more outward in the Y-axis direction than both side faces of the first portion in the Y-axis direction to form the flange portions of the first carriage,
wherein both end portions of the first portion in the X-axis direction protrude more outward in the X-axis direction than both side faces of the second portion in the X-axis direction,
wherein the U-shaped notches of the first carriage are formed on the second portion, and
wherein the L-shaped notches of the first carriage are formed by the flange portions of the first carriage and the end portions of the first portion protruding outward in the X-axis direction.

15. The oscillating device according to claim 1,
wherein the X-axis direction and the Y-axis direction are horizontal directions that are perpendicular to each other, and the Z-axis direction is a vertical direction.

16. An oscillating device, comprising:
a vibrating table;
a first oscillating unit configured to oscillate the vibrating table in a first direction; and
a plurality of first sliders configured to couple the vibrating table and the first oscillating unit slidably both in a second direction and a third direction,
wherein the first direction, the second direction and the third direction are directions that are perpendicular to each other,
wherein each of the first sliders comprises:
a second direction linear guideway configured to guide a motion of the vibrating table in the second direction; and
a third direction linear guideway configured to guide a motion of the vibrating table in the third direction,
wherein two of the first sliders being adjacent to each other are arranged while orienting their orientations in the first direction opposite to each other.

17. The oscillating device according to claim 16,
wherein one of the two of the first sliders being adjacent to each other is arranged while facing the second direction linear guideway toward the vibrating table, and
wherein the other of the two of the first sliders being adjacent to each other is arranged while facing the third direction linear guideway toward the vibrating table.

18. The oscillating device according to claim 16,
wherein in one of the two of the first sliders being adjacent to each other, the third direction linear guideway is coupled to the vibrating table via the second direction linear guideway, and
wherein in the other of the two of the first sliders being adjacent to each other, the second direction linear guideway is coupled to the vibrating table via the third direction linear guideway.

19. The oscillating device according to claim 16, wherein the plurality of first sliders are arranged on a plane perpendicular to the first direction.

20. The oscillating device according to claim 16, comprising four first sliders arranged at respective apexes of a rectangle being perpendicular to the first direction.

21. The oscillating device according to claim 16, wherein the plurality of first sliders are arranged in two directions being perpendicular to the first direction while alternatingly changing their orientations in the first direction.

* * * * *